(12) United States Patent
Okuyama et al.

(10) Patent No.: US 8,679,687 B2
(45) Date of Patent: *Mar. 25, 2014

(54) HYDROGEN GENERATING METHOD AND HYDROGEN GENERATING SYSTEM BASED ON THE METHOD

(75) Inventors: Ryoichi Okuyama, Kyoto (JP); Yoshihiro Yamamoto, Kyoto (JP); Masashi Motoi, Kyoto (JP); Katsuji Ashida, Kyoto (JP)

(73) Assignee: GS Yuasa International Ltd., Kyoto-Shi (JP)

( * ) Notice: Subject to any disclaimer, the term of this patent is extended or adjusted under 35 U.S.C. 154(b) by 1292 days.

This patent is subject to a terminal disclaimer.

(21) Appl. No.: 10/584,267

(22) PCT Filed: Dec. 21, 2004

(86) PCT No.: PCT/JP2004/019665
§ 371 (c)(1),
(2), (4) Date: Jun. 23, 2006

(87) PCT Pub. No.: WO2005/063614
PCT Pub. Date: Jul. 14, 2005

(65) Prior Publication Data
US 2007/0154748 A1      Jul. 5, 2007

(30) Foreign Application Priority Data

Dec. 26, 2003 (JP) ................. 2003-433710
Mar. 31, 2004 (JP) ................. 2004-106408
Mar. 31, 2004 (JP) ................. 2004-106409
Sep. 30, 2004 (JP) ................. 2004-289214
Sep. 30, 2004 (JP) ................. 2004-289216
Nov. 1, 2004 (JP) ................. 2004-317671

(51) Int. Cl.
*H01M 8/00* (2006.01)
*H01M 8/04* (2006.01)

(52) U.S. Cl.
USPC ............ 429/400; 429/428; 429/430; 429/432

(58) Field of Classification Search
USPC .............. 423/644, 648.1, 650, 651, 649, 657; 429/13, 400, 428, 430, 432
See application file for complete search history.

(56) References Cited

U.S. PATENT DOCUMENTS 4,840,783 A * 6/1989 Quang et al. ............... 423/648.1
(Continued)

FOREIGN PATENT DOCUMENTS

JP         H06-73583 A      3/1994
(Continued)

OTHER PUBLICATIONS

Electrochemical and Solid-State Letters, 8 (I) A52-A54 (2005); Electrochemical Reactions in a DMFC under Open-Circuit Conditions; Q. Ye, T. S. Zhao, H. Yang, and J. Prabhuram.
Electrochemical and Solid-State Letters. 8 (4) A211-A214 (2005); Electrolytic Hydrogen Evolution in DMFCs Induced by Oxygen Interruptions and Its Effect on Cell Performance; Q. Ye and T. S. Zhao.

(Continued)

Primary Examiner — Noah Wiese
(74) Attorney, Agent, or Firm — Manabu Kanesaka

(57) ABSTRACT

The present invention aims to provide a hydrogen generating method for generating hydrogen-containing gas little contaminated with nitrogen, CO, etc., by decomposing fuel containing an organic compound at low temperature while requiring the supply of no or little electric energy from an external source, and a hydrogen generating system based on the method.
A hydrogen generating system based on the method can work under multiple conditions: (a) it works under a condition where electric energy is withdrawn from the hydrogen generating cell with the fuel electrode (12) serving as a negative electrode and the oxidizing electrode (14) as a positive electrode; and (b) it works under another condition where external electric energy is provided to the hydrogen generating cell with the fuel electrode (12) serving as cathode and the oxidizing electrode (14) as anode.

2 Claims, 35 Drawing Sheets

(56) References Cited

U.S. PATENT DOCUMENTS

| | | | |
|---|---|---|---|
| 5,599,638 A * | 2/1997 | Surampudi et al. | 429/33 |
| 5,945,231 A * | 8/1999 | Narayanan et al. | 429/30 |
| 6,299,744 B1 * | 10/2001 | Narayanan et al. | 204/263 |
| 6,368,492 B1 | 4/2002 | Narayanan et al. | |
| 6,432,284 B1 | 8/2002 | Narayanan et al. | |
| 6,485,851 B1 * | 11/2002 | Narayanan et al. | 429/17 |
| 6,533,919 B1 | 3/2003 | Narayanan et al. | |
| 6,811,905 B1 * | 11/2004 | Cropley et al. | 429/13 |
| 2003/0226763 A1 | 12/2003 | Narayanan et al. | |

FOREIGN PATENT DOCUMENTS

| | | |
|---|---|---|
| JP | H11-229167 A | 8/1999 |
| JP | 2001-297779 A | 10/2001 |
| JP | 3328993 B2 | 7/2002 |
| JP | 3360349 B2 | 10/2002 |

* cited by examiner

HYDROGEN GENERATING METHOD AND HYDROGEN GENERATING SYSTEM BASED ON THE METHOD

TECHNICAL FIELD

The present invention relates to a method for decomposing fuel comprising an organic compound into a hydrogen-containing gas at a low temperature, and a hydrogen generating system based on the method.

BACKGROUND ART

Recently, people have increasingly directed their attention to the pollution of environment or the exhaustion of natural resources, and to the development of measures to cope with those problems. As one such countermeasure, the development of fuel cells have been actively pursued. Among such fuel cells, there are phosphoric acid fuel cells (PAFC) and polymer electrolyte fuel cells (PEFC). Utilizing hydrogen as fuel, those fuel cells require a conversion system capable of converting hydrocarbon or methanol which serves as a material into hydrogen, and the development of an effective conversion system has remained a particularly important technical challenge in the development efforts of those fuel cells.

Materials upon which studies have been performed to convert them into hydrogen to drive PEFCs for vehicles include, for example, methanol, dimethyl ether (DME), ethanol, natural gas, propane, gasoline, etc. Among them, the most notable advancement is observed in the conversion of methanol into hydrogen, because methanol requires the lowest temperature for its conversion. Currently, three methods have been proposed for methanol conversion: water vapor-based conversion, partial oxidization-based conversion, and combination of the two methods. See Watanabe, M., "Development of PEFC and its commercialization," pp. 141-166, May 28, 1999, Assoc. Technol. Information.

The water vapor-based conversion can be represented by the following reaction formula:

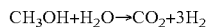
$$CH_3OH + H_2O \rightarrow CO_2 + 3H_2$$

This is an endothermic reaction occurring at 200 to 300° C.

The partial oxidization-based conversion can be represented, when air is used as oxidizing gas, by the following reaction formula:

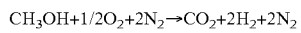
$$CH_3OH + 1/2O_2 + 2N_2 \rightarrow CO_2 + 2H_2 + 2N_2$$

This is an exothermic reaction occurring at 200 to 600° C.

The combinational conversion (representative example) can be represented, when air is used as oxidizing gas, by the following reaction formula:

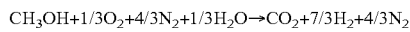
$$CH_3OH + 1/3O_2 + 4/3N_2 + 1/3H_2O \rightarrow CO_2 + 7/3H_2 + 4/3N_2$$

This is an exothermic reaction where heat is generated about one third what is generated during the partial oxidization-based conversion. The reaction occurs at 400 to 600° C.

As an alternative to the above method, an invention provides a hydrogen generating system for generating hydrogen highly efficiently utilizing, as a material, hydrocarbon fuel such as natural gas, LPG, gasoline, naphtha, kerosene, etc., and water in order to provide resulting hydrogen, for example, to a hydrogen exploiting device such as a fuel cell (see Japanese Patent Publication No. 3473900). According to the invention, the system "comprises, at least, a hydrocarbon fuel supply portion, a combustion portion, a water supply portion, a gas mixing portion where fuel and water or water vapor are mixed to produce a mixed gas to be converted, and a conversion portion filled with a conversion catalyst, and is characterized in that the gas to be converted is converted, under the catalytic action of the conversion catalyst, into gas containing hydrogen, and that combustion gas waste generated by the combustion portion is used to directly heat, only through partition walls, at least the gas mixing portion and the conversion portion." According to this system, the conversion temperature is high, that is, about 700° C. (See claim 1, and paragraphs [0001], [0017] and [0022] of the cited patent document).

As seen from the two illustrative methods presented above, for generating hydrogen conversion must occur at a high temperature not lower than 200° C., and, in addition, those conventional methods have a number of additional problems: intoxication of the conversion catalyst, admixture of CO with the conversion gas (hydrogen-containing gas) which must be removed, and admixture of air with the conversion gas which is generated by partial oxidization or by the combinational method.

On the other hand, technique has been known whereby one can obtain hydrogen-containing gas by decomposing fuel comprising an organic compound at a low temperature, and one such technique is represented by a method for generating hydrogen electrochemically and a system based on the method. A fuel cell utilizing hydrogen generated by such an electrochemical method is also known. (See Japanese Patent Publications Nos. 3328993 and 3360349, U.S. Pat. Nos. 6,299,744, 6,368,492, 6,432,284, and 6,533,919, and United States Patent Application No. 2003/0226763, and Japanese Unexamined Patent Application Publication No. 2001-297779). Japanese Patent Publication No. 3360349 cited above describes (claim 1), "a method for generating hydrogen comprising providing a pair of electrodes on the two opposite surfaces of a cation exchange membrane, contacting a fuel containing at least methanol and water with one electrode having a catalyst, applying a voltage between the pair of electrodes so that electrons are withdrawn from the electrodes thereby causing a reaction to occur on the electrodes whereby hydrogen ions are generated from methanol and water, and allowing hydrogen ions to be converted on the other electrode, being supplied with electrons, into hydrogen molecules." The same patent document discloses another method (paragraphs [0033] to [0038]) for selectively generating hydrogen using a conversion system, the method comprising supplying water or water vapor together with methanol which serves as a fuel, applying a voltage via an external circuit to cause electrons to be withdrawn from a fuel electrode, so that reaction represented by $CH_3OH + 2H_2O \rightarrow CO_2 + 6e^- + 6H^+$ occurs on the fuel electrode, and allowing hydrogen ions thus produced to pass through a cation exchange membrane to reach the opposite electrode where the hydrogen ions undergo reaction represented by $6H^+ + 6e^- \rightarrow 3H_2$. Japanese Patent Publication No. 3360349 cited above describes (paragraphs [0052] to [0056]) a fuel cell which utilizes hydrogen generated by a method as described above.

According to the inventions described in Japanese Patent Publications Nos. 3,328,993 (paragraph [0042]) and 3,360,349 (paragraph [0080]) cited above, it is possible to generate hydrogen at a low temperature. However, the methods described in those inventions are obviously different from the hydrogen generating method of the present invention and hydrogen generating system of the present invention based on the method which will be given below in following points: those methods require the application of voltage, and hydrogen is generated on the electrode opposite to the electrode (fuel electrode) to which fuel is supplied, and no oxidizing agent is supplied to the opposite electrode.

This holds true also for the inventions disclosed by U.S. Pat. No. 6,368,492 cited above similarly to Japanese Patent Publications Nos. 3,328,993 and 3,360,349 cited above. Those inventions use a system for generating hydrogen where protons generated on anode 112 serving as fuel electrode pass through partition membrane 110 to reach cathode 114 opposite to the anode, and according to the system, voltage from DC power source 120 is applied between anode (fuel electrode) and cathode (opposite electrode) to decompose organic fuel such as methanol or the like electrochemically. In addition, hydrogen is generated on the electrode opposite to the fuel electrode, and no oxidizing agent is supplied to the opposite electrode.

Japanese Unexamined Patent Application Publication No. 2001-297779 cited above discloses a fuel cell system incorporating a hydrogen generating unit. According to the disclosure (claim 1) of the invention, "Liquid fuel containing alcohol and water is supplied to porous electrode 1 (fuel electrode), air is supplied to gas diffusion electrode 2 (oxidizing agent-applied electrode) opposite to electrode 1, and a load is inserted between a terminal leading to porous electrode 1 and another terminal leading to gas diffusion electrode 2 to achieve electric connection allowing a positive voltage to be applied to porous electrode 1 via the load from gas diffusion electrode 2 which corresponds to the positive electrode of MEA2 capable of acting as a conventional fuel cell." The same patent document further adds (paragraph [0007]), "As a result, alcohol reacts with water to produce carbon dioxide gas and hydrogen ion, the hydrogen ion passes through an electrolyte membrane 5 to reach a gas diffusion electrode 6 located centrally where the hydrogen ion is converted into hydrogen gas. On the opposite surface of gas diffusion electrode 6 in contact with another electrolyte layer 7, there arises another electrode reaction where hydrogen gas is reconverted into hydrogen ion, and hydrogen ions migrate through electrolyte layer 7 to reach another gas diffusion electrode 2 where hydrogen ions react with oxygen in air to produce water." Thus, with this system, electric energy generated by a fuel cell is utilized to generate hydrogen on the hydrogen generating electrode (gas diffusion electrode 6) which is then supplied to the fuel cell. Moreover, the system is the same with those described in the patent documents cited above in that hydrogen is generated on the electrode opposite to the fuel electrode.

There are some other known methods for generating hydrogen (Japanese Unexamined Patent Application Publications Nos. 6-73582 (claims 1 to 3, paragraph [0050]) and 6-73583 (claims 1 and 8, paragraphs [0006] and [0019]). According to the inventions, a reaction system with a partition membrane is used where anode (electrode A) and cathode (electrode B) are placed opposite to each other with a proton conducting membrane (ion conductor) inserted therebetween, and where alcohol (methanol) is oxidized with or without concomitant application of voltage, or with concomitant uptake of electric energy. All those methods, however, are based on a method whereby alcohol is oxidized by means of an electrochemical cell (the reaction product includes carbonic diester, formalin, methyl formate, dimethoxymethane, etc.), and not on a method whereby alcohol is converted by reduction into hydrogen."

DISCLOSURE OF THE INVENTION

With a view to give a solution to the above problems, the present invention aims to provide a hydrogen generating method whereby one can decompose fuel containing an organic compound at a low temperature requiring no or a little volume of electric energy supplied from outside, to generate gas in which admixture of nitrogen, CO, etc., is insignificant, and a hydrogen generating system based on the hydrogen generating method.

Proposed to give a solution to the problems, the present invention can be reduced to following constitutive elements.

(1) A hydrogen generating method for generating hydrogen-containing gas by decomposing fuel containing an organic compound, the method comprising providing a fuel electrode in contact with one surface of a partition membrane, supplying fuel containing an organic compound and water to the fuel electrode, and providing an oxidizing electrode in contact with the other surface of the partition membrane, supplying an oxidizing agent to the oxidizing electrode, wherein fuel containing the organic compound is decomposed and hydrogen-containing gas is generated on the fuel electrode.

(2) A hydrogen generating method as described in paragraph (1) whereby it is possible to generate hydrogen-containing gas under open-circuit condition where no electric energy is withdrawn to outside from a hydrogen generating cell constituting a hydrogen generating system, and no electric energy is supplied from outside to the hydrogen generating cell.

(3) A hydrogen generating method as described in paragraph (1) whereby it is possible to generate hydrogen-containing gas on the fuel electrode by decomposing fuel containing an organic compound while withdrawing electric energy to outside from the hydrogen generating cell with the fuel electrode serving as a negative electrode and the oxidizing electrode as a positive electrode.

(4) A hydrogen generating method as described in paragraph (1) whereby it is possible to generate hydrogen-containing gas on the fuel electrode by decomposing fuel containing an organic compound while providing electric energy from outside to the hydrogen generating cell with the fuel electrode serving as cathode and the oxidizing electrode as anode.

(5) A hydrogen generating method as described in any one of paragraphs (1) to (4) wherein the organic compound is alcohol.

(6) A hydrogen generating method as described in paragraph (5) wherein the alcohol is methanol.

(7) A hydrogen generating method as described in any one of paragraphs (1) to (4) wherein the oxidizing agent is gas containing oxygen, or oxygen.

(8) A hydrogen generating method as described in paragraph (5) wherein the oxidizing agent is gas containing oxygen, or oxygen.

(9) A hydrogen generating method as described in any one of paragraphs (1) to (4) wherein the oxidizing agent is liquid containing hydrogen peroxide.

(10) A hydrogen generating method as described in paragraph 5 wherein the oxidizing agent is liquid containing hydrogen peroxide.

(11) A hydrogen generating system for generating hydrogen-containing gas by decomposing fuel containing an organic compound, the system comprising a partition membrane, a fuel electrode provided on one surface of the partition membrane, means for supplying fuel containing an organic compound and water to the fuel electrode, an oxidizing electrode provided on the other surface of the partition membrane, means for supplying an oxidizing agent to the oxidizing electrode, and means for generating hydrogen-containing gas on the fuel electrode to collect the gas.

(12) A hydrogen generating system as described in paragraph (11) which exists as an open circuit, having neither means for withdrawing electric energy to outside from a hydrogen generating cell constituting the hydrogen generating system, nor means for providing electric energy from outside to the hydrogen generating cell.

(13) A hydrogen generating system as described in paragraph (11) which has means for withdrawing electric energy from the hydrogen generating cell to outside with the fuel electrode serving as a negative electrode and the oxidizing electrode as a positive electrode.

(14) A hydrogen generating system as described in paragraph (11) which has means for providing electric energy from outside with the fuel electrode serving as cathode and the oxidizing electrode as anode.

(15) A hydrogen generating system as described in paragraph (11) wherein voltage between the fuel electrode and the oxidizing electrode is 200 to 1000 mV.

(16) A hydrogen generating system as described in paragraph (12) wherein voltage between the fuel electrode and the oxidizing electrode is 300 to 800 mV.

(17) A hydrogen generating system as described in paragraph (13) wherein voltage between the fuel electrode and the oxidizing electrode is 200 to 600 mV.

(18) A hydrogen generating system as described in paragraph (13) wherein voltage between the fuel electrode and the oxidizing electrode and/or the evolution volume of hydrogen-containing gas are/is adjusted by varying the volume of electric energy withdrawn from the hydrogen generating unit.

(19) A hydrogen generating system as described in paragraph (14) wherein voltage between the fuel electrode and the oxidizing electrode is 300 to 1000 mV.

(20) A hydrogen generating system as described in paragraph (14) wherein voltage between the fuel electrode and the oxidizing electrode and/or the evolution volume of hydrogen-containing gas are/is adjusted by varying the volume of electric energy provided.

(21) A hydrogen generating system as described in any one of paragraphs (11) to (20) wherein the evolution volume of hydrogen-containing gas is adjusted by varying voltage between the fuel electrode and the oxidizing electrode.

(22) A hydrogen generating system as described in any one of paragraphs (11) to (20) wherein voltage between the fuel electrode and the oxidizing electrode and/or the evolution volume of hydrogen-containing gas are/is adjusted by varying the supply volume of the oxidizing agent.

(23) A hydrogen generating system as described in any one of paragraphs (11) to (20) wherein voltage between the fuel electrode and the oxidizing electrode and/or the evolution volume of hydrogen-containing gas are/is adjusted by varying the concentration of the oxidizing agent.

(24) A hydrogen generating system as described in paragraph (22) wherein voltage between the fuel electrode and the oxidizing electrode and/or the evolution volume of hydrogen-containing gas are/is adjusted by varying the concentration of the oxidizing agent.

(25) A hydrogen generating system as described in any one of paragraphs (11) to (20) wherein voltage between the fuel electrode and the oxidizing electrode and/or the evolution volume of hydrogen-containing gas are/is adjusted by varying the supply volume of fuel containing an organic compound and water.

(26) A hydrogen generating system as described in paragraph (22) wherein voltage between the fuel electrode and the oxidizing electrode and/or the evolution volume of hydrogen-containing gas are/is adjusted by varying the supply volume of fuel containing an organic compound and water.

(27) A hydrogen generating system as described in paragraph (23) wherein voltage between the fuel electrode and the oxidizing electrode and/or the evolution volume of hydrogen-containing gas are/is adjusted by varying the supply volume of fuel containing an organic compound and water.

(28) A hydrogen generating system as described in any one of paragraphs (11) to (20) wherein voltage between the fuel electrode and the oxidizing electrode and/or the evolution volume of hydrogen-containing gas are/is adjusted by varying the concentration of fuel containing an organic compound and water.

(29) A hydrogen generating system as described in paragraph (22) wherein voltage between the fuel electrode and the oxidizing electrode and/or the evolution volume of hydrogen-containing gas are/is adjusted by varying the concentration of fuel containing an organic compound and water.

(30) A hydrogen generating system as described in paragraph (23) wherein voltage between the fuel electrode and the oxidizing electrode and/or the evolution volume of hydrogen-containing gas are/is adjusted by varying the concentration of fuel containing an organic compound and water.

(31) A hydrogen generating system as described in paragraph (25) wherein voltage between the fuel electrode and the oxidizing electrode and/or the evolution volume of hydrogen-containing gas are/is adjusted by varying the concentration of fuel containing an organic compound and water.

(32) A hydrogen generating system as described in any one of paragraphs (11) to (20) wherein the operation temperature is not higher than 100° C.

(33) A hydrogen generating system as described in paragraph (32) wherein the operation temperature is between 30 and 90° C.

(34) A hydrogen generating system as described in paragraph (21) wherein the operation temperature is not higher than 100° C.

(35) A hydrogen generating system as described in paragraph (22) wherein the operation temperature is not higher than 100° C.

(36) A hydrogen generating system as described in paragraph (23) wherein the operation temperature is not higher than 100° C.

(37) A hydrogen generating system as described in paragraph (25) wherein the operation temperature is not higher than 100° C.

(38) A hydrogen generating system as described in paragraph (28) wherein the operation temperature is not higher than 100° C.

(39) A hydrogen generating system as described in any one of paragraphs (11) to (20) wherein the partition membrane is a proton conducting solid electrolyte membrane.

(40) A hydrogen generating system as described in paragraph (39) wherein the proton conducting solid electrolyte membrane is a perfluorocarbon sulfonate-based solid electrolyte membrane.

(41) A hydrogen generating system as described in paragraph (32) wherein the partition membrane is a proton conducting solid electrolyte membrane.

(42) A hydrogen generating system as described in any one of paragraphs (33) to (38) wherein the partition membrane is a proton conducting solid electrolyte membrane.

(43) A hydrogen generating system as described in any one of paragraphs (11) to (20) wherein the catalyst applied to the fuel electrode is made of platinum-ruthenium alloy supported by carbon powder serving as a base.

(44) A hydrogen generating system as described in paragraph (32) wherein the catalyst applied to the fuel electrode is made of platinum-ruthenium alloy supported by carbon powder serving as a base.

(45) A hydrogen generating system as described in any one of paragraphs (33) to (38) wherein the catalyst applied to the fuel electrode is made of platinum-ruthenium alloy supported by carbon powder serving as a base.

(46) A hydrogen generating system as described in paragraph (39) wherein the catalyst applied to the fuel electrode is made of platinum-ruthenium alloy supported by carbon powder serving as a base.

(47) A hydrogen generating system as described in any one of paragraphs (11) to (20) wherein the catalyst applied to the oxidizing electrode is made of platinum supported by carbon powder serving as a base.

(48) A hydrogen generating system as described in paragraph (32) wherein the catalyst applied to the oxidizing electrode is made of platinum supported by carbon powder serving as a base.

(49) A hydrogen generating system as described in any one of paragraphs (33) to (38) wherein the catalyst applied to the oxidizing electrode is made of platinum supported by carbon powder serving as a base.

(50) A hydrogen generating system as described in paragraph (39) wherein the catalyst applied to the oxidizing electrode is made of platinum supported by carbon powder serving as a base.

(51) A hydrogen generating system as described in paragraph (43) wherein the catalyst applied to the oxidizing electrode is made of platinum supported by carbon powder serving as a base.

(52) A hydrogen generating system as described in any one of paragraphs (11) to (20) comprising means for circulating fuel containing an organic compound and water.

(53) A hydrogen generating system as described in paragraph (32) comprising means for circulating fuel containing an organic compound and water.

(54) A hydrogen generating system as described in any one of paragraphs (33) to (38) comprising means for circulating fuel containing an organic compound and water.

(55) A hydrogen generating system as described in any one of paragraphs (11) to (20) comprising a carbon dioxide absorbing portion for absorbing carbon dioxide contained in the hydrogen-containing gas.

(56) A hydrogen generating system as described in paragraph (32) comprising a carbon dioxide absorbing portion for absorbing carbon dioxide contained in the hydrogen-containing gas.

(57) A hydrogen generating system as described in any one of paragraphs (33) to (38) comprising a carbon dioxide absorbing portion for absorbing carbon dioxide contained in the hydrogen-containing gas.

The hydrogen generating system based on the method as described in paragraphs (2) to (4) and the hydrogen generating system as described in paragraphs (12) to (14) all comprise means for supplying fuel and oxidizing agent to their hydrogen generating unit. Suitable supply means may include a pump, blower, etc. The hydrogen generating system as described in paragraph (3) or (13) comprises discharge controlling means for withdrawing electric energy from the hydrogen generating cell. The hydrogen generating system as described in paragraph (4) or (14) comprises electrolysis means for providing electric energy to the hydrogen generating cell. The hydrogen generating system as described in paragraph (2) or (12) exists as an open circuit, having neither means for withdrawing electric energy to outside from the hydrogen generating cell, nor means for providing electric energy to the hydrogen generating cell. The hydrogen generating method as described in paragraph (1) includes the hydrogen generating method as described in any one of paragraphs (2) to (4), and the hydrogen generating system as described in paragraph (11) includes the hydrogen generating system as described in any one of paragraphs (12) to (14). The hydrogen generating system cited above is capable of monitoring the voltage (open-circuit voltage or running voltage) of its hydrogen generating cell and/or the evolution volume of hydrogen-containing gas, and adjusting, based on the monitor result, the supply volumes of fuel and oxidizing agent or their concentrations, and the magnitude of electric energy withdrawn from (paragraphs (3) and (13)) or provided to (paragraphs (4) and (14)) the hydrogen generating cell. The basic composition of a hydrogen generating cell constituting the hydrogen generating system consists of a fuel electrode provided on one surface of a partition membrane, a structure for supplying fuel to the fuel electrode, an oxidizing electrode provided to the other surface of the partition membrane, and another structure for supplying an oxidizing agent to the oxidizing electrode.

Employment of the inventive hydrogen generating method or a hydrogen generating system based on the method makes it possible to convert fuel into hydrogen at a temperature close to room temperature or 10° C. or lower which is far lower than the temperature required for conventional fuel conversion, which allows the economical use of energy necessary for running the system. Furthermore, according to the inventive method or a system based on the method, the hydrogen-containing gas generated is only marginally contaminated with nitrogen, and practically devoid of CO, and thus it is possible to obtain a comparatively high yield of hydrogen, and to dispense with a step for removing CO from the gas.

According to the inventive hydrogen generating method or to a hydrogen generating system based on the method, it is possible to evolve hydrogen without needing to provide electric energy from outside to the hydrogen generating cell, and thus hydrogen can be generated regardless of whether the system is provided with means for withdrawing electric energy from the cell or means for providing electric energy from outside to the cell.

When the system has means for withdrawing electric energy, electric energy withdrawn can be used for driving auxiliary components such as a pump, blower, etc., which will be highly advantageous from the viewpoint of efficient use of energy.

Even when the system has means for providing electric energy, and must provide electric energy to the hydrogen generating cell to allow it to generate hydrogen, the system is advantageous in that hydrogen generated exceeds in volume the hydrogen obtainable as a result of the consumption of the injected electric energy.

Furthermore, regardless of which means the system comprises, it is possible to control the process as appropriate by monitoring the voltage of the hydrogen generating cell or the evolution volume of hydrogen-containing gas, which allows the compaction of the system and the low cost running of the system.

REFERENCE NUMERALS

Figure 1:
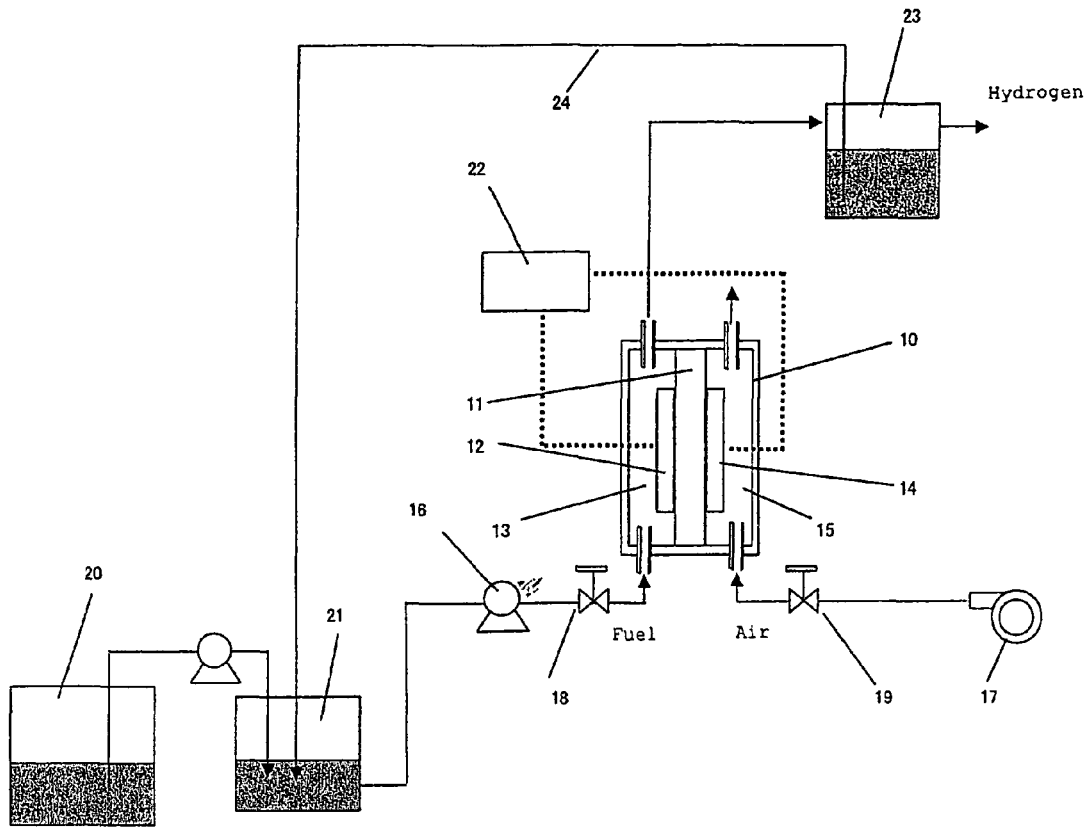
FIG. 1 is a schematic diagram for showing an illustrative embodiment representing a hydrogen generating system of the invention.

10. Hydrogen generating cell
11. Partition membrane
12. Fuel electrode
13. Feed channel through which fuel containing organic compound and water (aqueous solution of methanol) is supplied
14. Oxidizing electrode (air electrode)
15. Feed channel through which oxidizing agent (air) is supplied
16. Fuel pump
17. Air blower
18. Fuel flow control valve
19. Air flow control valve
20. Fuel tank
21. Fuel control vessel
22. Voltage controller
23. Gas/liquid separator
24. Guide tube

BEST MODE FOR CARRYING OUT THE INVENTION

The most preferred embodiments in the execution of the present invention will be illustrated below.

The hydrogen generating method of the invention and the hydrogen generating system based on the method are basically novel, and the embodiments thereof described herein are given only for the illustrative representation of the invention, and not for limiting the scope of the invention.

FIG. 1 shows an illustrative embodiment representing a hydrogen generating system of the invention. The hydrogen generating system comprises a hydrogen generating cell (10) and auxiliary components for supporting the operation of the hydrogen generating system.

Structurally, the hydrogen generating cell (10) comprises a fuel electrode (12) provided on one surface of a partition membrane (11), a feed channel (13) through which fuel containing an organic compound and water (aqueous solution of methanol) is supplied to the fuel electrode (12), an oxidizing electrode (14) provided on the other surface of partition membrane (11), and another feed channel (15) through which an oxidizing agent (air) is supplied to the oxidizing electrode (14).

Auxiliary components for supporting the operation of the hydrogen generating system comprise a fuel pump (16) for supplying the aqueous solution of methanol to fuel electrode (12) and an air blower for supplying air to oxidizing electrode (14).

The feed channel (13) to fuel electrode is connected via a guide tube running through a flow control valve (18) to fuel pump (16). The feed channel (15) to oxidizing electrode is connected via a guide tube running through a flow control valve (19) to air blower (17).

Fuel (100% methanol) is stored in a fuel tank (20). Fuel is transferred to a fuel control vessel (21) where fuel is mixed with water to give, for example, about 3% aqueous solution of methanol. The aqueous solution is then supplied to fuel electrode (12).

According to the hydrogen generating system configured as described above, when electric energy is supplied to fuel pump (16) and air blower (17) to drive them into action, and flow control valve (18) is opened, by virtue of the activated fuel pump (16), the aqueous solution of methanol is transported from fuel control vessel (21) through channel (13) to fuel electrode (12). On the other hand, when the flow control valve (19) is opened, by virtue of the activated air blower, air is transported through channel (15) to oxidizing electrode (14).

As a result of the aforementioned operation, reactions as described below will occur on the fuel electrode and on the oxidizing (air) electrode which will result in the generation of hydrogen-containing gas on the fuel electrode (12).

The evolution volume of hydrogen-containing gas is adjusted by providing a voltage controller (22) for monitoring the voltage (open-circuit voltage or running voltage) of hydrogen generating cell (10), and by controlling as appropriate the supply volume or concentration of fuel and air, or the magnitude of electric energy withdrawn from or provided to the cell based on the monitor result.

Hydrogen-containing gas is allowed to pass through a gas/liquid separator (23) so that hydrogen-containing gas is separated from unreacted aqueous solution of methanol, and part or all of the unreacted aqueous solution of methanol may be returned to fuel control vessel (21) by means of a circulating means comprising a guide tube (24). In certain cases as needed, water may be supplied from outside to the solution.

The hydrogen generating cell constituting the hydrogen generating system of the invention is basically composed of a partition membrane (11), a fuel electrode (12) provided on one surface of partition membrane (11) and an oxidizing electrode (14) provided on the other surface of partition membrane as described above. The element configured as described above may be represented by an MEA (membrane/electrode assembly) used in a direct methanol fuel cell.

The method for fabricating an MEA is not limited to any specific one, but a method similar to a conventional one may be employed wherein a fuel electrode and an oxidizing electrode (air electrode) with a partition membrane inserted therebetween are compressed at a high temperature to be assembled.

Suitable partition membranes may include a proton conducting solid electrolyte membrane which has been used as a polymer electrolyte membrane of a fuel cell. The proton conducting solid electrolyte membrane preferably includes a membrane based on perfluorocarbon sulfonate having sulfonic acid group such as Nafion provided by Dupont.

The fuel electrode or oxidizing (air) electrode is preferably an electrode which is conductive and has a catalytic activity. Production of such an electrode may be achieved by applying a catalyst paste onto a gas diffusion layer and drying the paste, wherein the paste is comprised of a catalyst obtained by blending a precious metal with carbon powder serving as a base, a binding agent such as a PTFE resin, and an ion conductivity conferring substance such as Nafion solution.

The gas diffusion layer is preferably made of a carbon paper treated to be water-repellent.

The catalyst to be applied to fuel electrode is not limited to any specific one, but is preferably a platinum-ruthenium alloy supported by carbon powder serving as a base.

The catalyst applied to air electrode is not limited to any specific one, but is preferably platinum supported by carbon powder serving as a base.

For a hydrogen generating system configured as described above, when fuel containing an organic compound such as an aqueous solution of methanol is supplied to the fuel electrode, and an oxidizing agent such as air, oxygen or hydrogen peroxide is supplied to the oxidizing (air) electrode, gas containing hydrogen evolves on the fuel electrode under specified conditions.

The hydrogen generating method of the invention and the hydrogen generating system based on the method are quite different from conventional hydrogen generating methods, and it is still difficult at present to explain the mechanism. The hypothesis which is currently thought most likely to be true will be described below, but it can not be denied that the hypothesis would be upset by new reactions which will shed new light to the phenomenon.

According to the hydrogen generating system based on the inventive hydrogen generating method, hydrogen-containing gas evolves, at a temperature as low as 30 to 90° C., from the fuel electrode which receives the supply of methanol and water as will be described below. When no electric energy is supplied from outside to the hydrogen generating cell, gas containing hydrogen at 70 to 80% evolves, while when electric energy is supplied from outside to the cell, gas containing hydrogen at 80% or higher evolves. The evolution of gas depends on the open circuit voltage or running voltage between the two electrodes. Base on these results, the most likely explanation of the mechanism underlying the evolution of hydrogen is as follows. For brevity, description will be given below on the premise that the cell is kept under circuit-open condition.

Let's assume for example that methanol is applied, as fuel, to a hydrogen generating system based on the hydrogen generating method of the invention. Firstly proton is likely to be generated on the fuel electrode by virtue of a catalyst, as is the case with a DMFC.

$$CH_3OH + H_2O \rightarrow CO_2 + 6H^+ + 6e^- \quad (1)$$

When Pt—Ru is used as a catalyst, methanol is adsorbed to the surface of Pt, and undergoes a series of electrochemical oxidization reactions as described below, resulting in the production of chemical species firmly adhered to the surface of the catalyst ultimately leading to reaction (1) described above, so it is contended ("Handbook of Electric Cell," Feb. 20, 2001, p. 406, Maruzen, 3rd edition).

$$CH_3OH + Pt \rightarrow Pt—(CH_3OH)ads \rightarrow Pt—(CH_2OH)ads + H^+ + e^-$$

$$Pt—(CH_2OH)ads \rightarrow Pt—(CHOH)ads + H^+ + e^-$$

$$Pt—(CHOH)ads \rightarrow Pt—(COH)ads + H^+ + e^-$$

$$Pt—(COH)ads \rightarrow Pt—(CO)ads + H^+ + e^-$$

To further oxidize Pt—(CO)ads, it is necessary to prepare (OH)ads from water.

$$Ru + H_2O \rightarrow Ru—(H_2O)ads \rightarrow Ru—(OH)ads + H^+ + e^-$$

$$Ru—(OH)ads + Pt—(CO)ads \rightarrow Ru + Pt + CO_2 + H^+ + e^-$$

For a DMFC, $H^+$ (proton) generated on the fuel electrode as a result of the reaction represented by formula (1) migrates through a proton conducting solid electrolyte membrane to reach the oxidizing electrode where it reacts with oxygen-containing gas or oxygen supplied to the oxidizing electrode as represented by the following reaction formula.

$$3/2O_2 + 6H^+ + 6e^- \rightarrow 3H_2O \quad (2)$$

Since the hydrogen generating system based on the hydrogen generating method of the invention works under open-circuit condition, $e^-$ generated as a result of the reaction represented by formula (1) can not be supplied through an external circuit to the oxidizing electrode. Therefore, for the reaction represented by formula (2) to occur, it is necessary to supply $e^-$ to the oxidizing electrode from a different reaction.

By the way, with regard to a DMFC using a proton conducting solid electrolyte membrane such as Nafion, there has been known a phenomenon called methanol crossover, that is, the crossover of methanol from the fuel electrode to the oxidizing electrode. Thus, it is possible that crossed methanol undergoes electrolytic oxidation represented by the following formula on the oxidizing electrode.

$$CH_3OH + H_2O \rightarrow CO_2 + 6H^+ + 6e^- \quad (3)$$

If the reaction represented by formula (3) occurs, $e^-$ produced as a result of the reaction is supplied to allow the reaction represented by formula (2) to occur there.

The $H^+$ (proton) produced as a result of the reaction represented by formula (3) migrates through the proton conducting solid electrolyte membrane to reach the fuel electrode to undergo there a reaction represented by the following formula to produce hydrogen.

$$6H^+ + 6e^- \rightarrow 3H_2 \quad (4)$$

In this sequence of reactions, the transfer of $H^+$ and $e^-$ produced as a result of the reaction represented by formula (1) on the fuel electrode to the oxidizing electrode and the transfer of $H^+$ and $e^-$ produced as a result of the reaction represented by formula (3) on the oxidizing electrode to the fuel electrode are likely to be apparently canceled out by each other.

Then, on the oxidizing electrode there arises reaction as represented by formula (2) based on $H^+$ and $e^-$ produced as a result of the reaction represented by formula (3), while on the fuel electrode there arises reaction as represented by formula (4) based on $H^+$ and $e^-$ produced as a result of the reaction represented by formula (1).

Assumed that reactions represented by formulas (1) and (4) occur on the fuel electrode while reactions represented by formulas (2) and (3) occur on the oxidizing electrode, the net balance of chemical reactions is likely to be expressed by the following formula (5).

$$2CH_3OH + 2H_2O + 3/2O_2 \rightarrow 2CO_2 + 3H_2O + 3H_2 \quad (5)$$

The theoretical efficiency of this reaction is 59% (calorific value of 3 mol. hydrogen/calorific value of 2 mol. methanol).

The standard electrode potential E0 of the reaction represented by formula (1) is E0=0.046 V, while the standard electrode potential E0 of the reaction represented by formula (4) is E0=0.0 V. Thus, if the two reactions are combined to form a cell, the electrode where the reaction of formula (1) will occur will serve as a positive electrode while the electrode where the reaction of formula (4) will occur will serve as a negative electrode. The reaction of formula (1) will proceed in the direction opposite to the arrow represented direction. Similarly, the reaction of formula (4) will also proceed in the direction opposite to the arrow represented direction. Thus, the cell will not generate hydrogen.

For the cell to generate hydrogen, it is necessary to make both the reactions of formulas (1) and (4) proceed in the direction represented by the arrow. For this purpose, it is absolutely necessary to make the reaction of formula (1) occur on a negative electrode and the reaction of formula (4) on a positive electrode. If it is assumed that the entire area of fuel electrode is uniformly at a constant level, it is necessary to shift the methanol oxidizing potential to a lower level or to shift the hydrogen generating potential to a higher level.

However, if the entire area of fuel electrode is not at a constant potential level, reaction on the fuel electrode where methanol and water react to produce $H^+$ according to formula (1) and reaction on the oxidizing electrode where $H^+$ and $e^-$ react to produce hydrogen according to formula (4) are likely to proceed simultaneously.

As will be described later in relation to Example, a reaction system exposed to a higher temperature is more apt to generate hydrogen, and thus endothermic reactions (1) and (3) are likely to proceed in the arrow-indicated direction, being supplied heat from outside via other exothermic reactions.

Methanol not only undergoes reactions as represented by formulas (1) and (3), but is also subject, as a result of crossover, to the subsidiary reaction where methanol permeating from the fuel electrode is oxidized by oxygen on the surface of catalyst coated on the air electrode as represented by the following formula.

$$CH_3OH + 3/2O_2 \rightarrow CO_2 + 2H_2O \qquad (6)$$

Since the reaction of formula (6) is an exothermic reaction, heat generated by this reaction is most likely to be used to allow reactions represented by formulas (1) and (3) to occur.

With regard to a hydrogen generating method of the first aspect of the invention, and a hydrogen generating system of the second aspect of the invention (open-circuit condition hereinafter), as apparent in relation to Example described later, supply of oxygen (air) is decreased, and when the open-circuit voltage is 300 to 800 mV, hydrogen evolves. However, this is probably because the oxidation of methanol permeated to air electrode as represented by formula (6) is suppressed, evolution reaction of $H^+$ as represented by formula (3) becomes dominant, and the $H^+$ undergoes reaction represented by formula (4) to produce hydrogen.

With regard to a hydrogen generating method of the third aspect of the invention, and a hydrogen generating system of the fourth aspect the invention (discharging condition hereinafter), hydrogen is likely to be generated depending on the same mechanism as in the open-circuit condition. However, in contrast with the open-circuit condition, it is necessary with this system for $H^+$ corresponding in volume to discharge current to migrate from the fuel electrode to the oxidizing electrode in order to establish the neutralized electrical condition of the cell. Therefore, it is likely that reaction of formula (1) rather than reaction of formula (4) will occur on the fuel electrode while reaction of formula (2) rather than reaction of formula (3) will occur on the oxidizing electrode.

If discharge current becomes large (because of a large volume of $e^-$ being supplied to the oxidizing electrode), and if discharge voltage is lower than 200 mV, hydrogen will not evolve as will be described later in relation to Example. This is probably because the voltage is not so high as to permit the aqueous solution of methanol to be electrolyzed.

If a large volume of oxygen (air) is supplied or discharge voltage is higher than 600 mV, hydrogen will not evolve either. This is probably because methanol permeated to the air electrode is oxidized there according to the reaction shown in formula (6), instead of the $H^+$ evolution reaction shown in formula (3).

On the contrary, if supply of oxygen (air) is marginal, the discharge current will be reduced, and if discharge voltage (running voltage) becomes 200 to 600 mV, hydrogen will still evolve. However, this is probably because the oxidation of methanol permeated to the air electrode as represented by formula (6) is suppressed, evolution reaction of $H^+$ as represented by formula (3) becomes dominant, and the $H^+$ undergoes reaction represented by formula (4) to produce hydrogen.

With regard to a hydrogen generating method of the fifth aspect of the invention, and a hydrogen generating system of the sixth aspect of the invention (charging condition hereinafter), hydrogen is likely to be generated depending on the same mechanism as in the open-circuit condition. However, in contrast with the open-circuit condition, it is necessary with this system for $H^+$ corresponding in volume to electrolysis current to migrate from the oxidizing electrode to the fuel electrode in order to establish the neutralized electrical condition of the cell. Therefore, it is likely that reaction of formula (4) rather than reaction of formula (1) will occur on the fuel electrode while reaction of formula (3) rather than reaction of formula (2) will occur on the oxidizing electrode.

To put it more specifically, with regard to the charging condition where the fuel electrode serves as cathode while the oxidizing electrode serves as anode, electric energy is supplied from outside ($e^-$ is supplied from outside to the fuel electrode). Then, basically electrolysis occurs in the system. As electric energy supplied (voltage applied) is increased, more hydrogen will be produced. This is probably because as more $e^-$ is supplied from outside to the fuel electrode, oxidization of methanol represented by formula (3) and reaction represented by formula (4) ($6H^+ + 6e^- \rightarrow 3H_2$) will be more enhanced as will become apparent from the description given below in relation to Example.

However, as will be described later, the energy efficiency of the system becomes high when applied voltage (running voltage) is at a low range of 400 to 600 mV. This is probably because the oxidation of methanol permeated to air electrode as represented by formula (6) is suppressed, evolution reaction of $H^+$ as represented by formula (3) becomes dominant, and the $H^+$ undergoes reaction represented by formula (4) to produce hydrogen in the same manner as described above even in the case of open-circuit condition or discharging condition where electric energy is not provided from outside. Evolution of hydrogen in the charging condition is likely to be generated depending on the same mechanism as in the open-circuit condition and discharging condition as well as on the electric energy supplied from outside.

The meaning of the potential of the cell will be described here. Generally, the voltage of a cell having two electrodes with an electrolyte membrane inserted therebetween is determined by the difference between the two electrodes of chemical potentials of ions which serve as conductors in electrolyte.

If polarizations at the two electrodes are ignored, the voltage in question indicates the difference between the two electrodes of chemical potentials of hydrogen, in other words, partial pressures of hydrogen, since this cell uses a proton (hydrogen ion) conducting solid electrolyte membrane.

According to the invention, as will be described later in relation to Example, if there is voltage between the fuel and oxidizing electrodes that is in a certain range, this indicates the evolution of hydrogen on the fuel electrode. Thus, if the difference of chemical potentials of hydrogen between the two electrodes falls within a certain range, reactions as represented by formulas (1) to (6) cited above will proceed which will result in the production of hydrogen.

According to the hydrogen generating method of the invention and a hydrogen generating system based on the method, it is possible to adjust the evolution volume of hydrogen by varying the voltage (open-circuit voltage or running voltage) between the fuel electrode and oxidizing (air) electrode, regardless of whether electric energy is withdrawn to outside from the hydrogen generating cell of the system or whether electric energy is supplied from outside to the hydrogen generating cell.

As will be described below in relation of Example, the open-circuit condition evolves hydrogen at the open-circuit voltage of 300 to 800 mV; the discharging condition evolves hydrogen at the discharge voltage (running voltage) of 200 to 600 mV; and the charging condition evolves hydrogen at the applied voltage (running voltage) of 300 to 1000 mV (energy efficiency is high at 400 to 600 mV). Thus, it is possible to adjust the evolution volume of hydrogen-containing gas by varying open-circuit voltage or running voltage in accordance with the voltage range cited above.

As will be described below in relation of Example, it is possible to adjust the open-circuit voltage or running voltage and/or the evolution volume (rate of hydrogen evolution) of hydrogen-containing gas by varying the supply volume of an oxidizing agent (oxygen-containing gas or oxygen, or hydrogen peroxide-containing liquid), or the concentration of an oxidizing agent (oxygen concentration of oxygen-containing gas), or the supply volume of compound-containing fuel, or the concentration of organic compound-containing fuel.

It is also possible to adjust the running voltage and/or the evolution volume of hydrogen-containing gas by varying, for the discharging condition, electric energy withdrawn to outside, (varying current withdrawn to outside, or varying the voltage withdrawn to outside using a constant-voltage controllable power source, for example, so-called potentiostat), or, for the charging condition, electric energy supplied to the system (or current supplied to the system, or by varying the voltage of the system using a constant-voltage power source, for example, so-called potentiostat).

Since according to the hydrogen generating method of the invention or to a hydrogen generating system based on the method, it is possible to decompose organic compound-containing gas at 100° C. or lower, the temperature at which the system can be operated is made 100° C. or lower. The operation temperature is preferably 30 to 90° C. This is because, when the operation temperature is adjusted to be between 30 and 90° C., it will become possible to adjust the open-circuit voltage or running voltage, and/or the evolution volume of hydrogen-containing gas as will be described later in relation to Example.

Incidentally, for a hydrogen generating cell based on conventional fuel conversion technology, the operation temperature should be kept at 100° C. or higher. At this temperature range, water will become vapor and organic compound-containing fuel become gas, and even when hydrogen evolves under this condition, it is necessary to provide means specifically adapted for separating hydrogen. The system of the present invention is also advantageous in this point.

Indeed, there will arise a problem as described above, when organic compound-containing fuel is decomposed at 100° C. or higher. But a hydrogen generating system of the invention may be operated at a temperature slightly above 100° C. if there be need to do so.

As long as based on the putative principle, the organic compound-containing fuel may be liquid or gaseous fuel capable of producing proton as a result of electrochemical oxidization that can pass through a proton conductive partition membrane, and liquid fuel containing alcohol such as methanol is preferred. Since the organic compound-containing fuel is supplied with water, an aqueous solution of alcohol, particularly aqueous solution of methanol is preferred. The aqueous solution of methanol cited above as a preferred example of fuel is an aqueous solution containing at least methanol, and its concentration of methanol at a region where hydrogen-containing gas evolves may be arbitrarily determined as needed.

Suitable oxidizing agents may include gaseous or liquid oxidizing agents. Suitable gaseous oxidizing agents may include oxygen-containing gas or oxygen. The concentration of oxygen in oxygen-containing gas is preferably chosen to be 10% or higher. Suitable liquid oxidizing agents may include hydrogen peroxide-containing liquid.

For a hydrogen generating system of the invention, since the fraction of fuel converted into hydrogen is rather small, it is desirable to provide fuel circulating means to improve thereby the fraction of fuel to be converted into hydrogen.

The hydrogen generating system of the invention has means for withdrawing hydrogen-containing gas provided on the fuel electrode. The means is preferably so constructed as to be able to recover carbon dioxide as well as hydrogen. Since the system operates at a temperature as low as 100° C. or lower, it is possible to attach a carbon dioxide absorbing portion for absorbing carbon dioxide contained in hydrogen-containing gas to the system by simple means.

Next, illustrative examples (examples of hydrogen generation) of the present invention will be presented. However, the fractions of catalysts, PTFE, Nafion, etc., and the thickness of catalyst layer, gas diffusion layer and electrolyte membrane are not limited to the values cited in the examples, but may take any appropriate values.

EXAMPLE 1

Illustrative examples of generating hydrogen based on the hydrogen generating method of the first aspect of the invention and hydrogen generating system (open-circuit condition) of the second aspect of the invention will be presented below.

HYDROGEN GENERATION EXAMPLE 1-1

Hydrogen generating cells described in Example 1 (generation examples 1-1 to 1-10) have the same structure as that of representative DMFCs.

Figure 2:
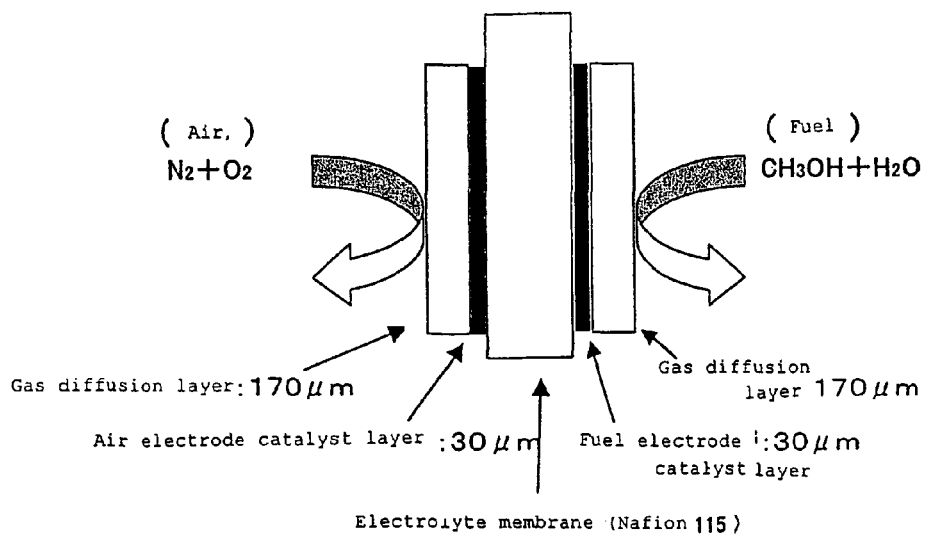
FIG. 2 is a schematic diagram of a hydrogen generating cell (requiring no supply of electric energy from outside) described in Example 1.

The structure of the hydrogen generating cell is outlined in FIG. 2.

The electrolyte membrane consists of a proton conducting electrolyte membrane provided by Dupont (Nafion 115); and the air electrode is obtained by immersing carbon paper (Toray) in a solution where polytetrafluoroethylene is dispersed at 5%, and baking the paper at 360° C. to make it water-repellent, and coating, on one surface of the paper, air electrode catalyst paste comprised of air electrode catalyst (carbon-supported platinum, Tanaka Precious Metal), fine powder of PTFE, and 5% Nafion solution (Aldrich). Thus, the air electrode exists as a gas diffusion layer with air electrode catalyst. In the preparation of the air electrode catalyst paste, the percent contents by weight of air electrode catalyst, PTFE, and Nafion were made 65%, 15% and 20%, respectively. The loading level of catalyst of the air electrode prepared as above was 1 mg/cm$^2$ in terms of the weight of platinum per unit area.

Another carbon paper was similarly treated to be made water-repellent. One surface of the paper was coated with fuel electrode catalyst paste comprised of fuel electrode catalyst (carbon-supported platinum-ruthenium, Tanaka Precious Metal), fine powder of PTFE, and 5% Nafion solution. Thus, the fuel electrode exists as a gas diffusion layer with fuel electrode catalyst. In the preparation of the fuel electrode catalyst paste, the percent contents by weight of fuel electrode catalyst, PTFE, and Nafion were made 55%, 15% and 30%, respectively. The loading level of catalyst of the fuel electrode prepared as above was 1 mg/cm$^2$ in terms of the weight of platinum-ruthenium per unit area.

The electrolyte membrane, gas diffusion layer with air electrode catalyst and gas diffusion layer with fuel electrode catalyst were laid one over another to be hot-pressed at 140° C. under a pressure of 100 kg/cm$^2$ so that they were assembled to form an MEA. The MEA prepared as above had an active electrode area of 60.8 cm$^2$. The thicknesses of air and fuel electrode catalyst layers were practically the same about 30 μm, and the thicknesses of air and fuel electrode gas diffusion layers were similarly the same about 170 μm.

The MEA was further provided on its both surfaces with flow passages through which air can flow and fuel can flow, and was enclosed from outside with an air electrode separator and a fuel electrode separator respectively both made of graphite into which phenol resin is impregnated, in order to prevent the leak of gas from the MEA. To further ensure the seal of MEA against the leak of fuel and air, MEA was surrounded with silicon-rubber made packing.

The hydrogen generating cell prepared as above was placed in an electric furnace where hot air was circulated. The temperature (operation temperature) of the cell was kept at 30 to 70° C., air was flowed at a rate of 0 to 400 ml/min to the air electrode, and 0.5 to 2M aqueous solution of methanol (fuel) was flowed at a rate of 2 to 15 ml/min to the fuel electrode. Then, the voltage difference between the fuel electrode and the air electrode (open voltage), the volume of gas evolved on the fuel electrode and the composition of the gas were monitored and analyzed.

First, the flow rate of aqueous solution of methanol (fuel) to the cell was kept 8 ml/min, and the temperature of air was kept at 30, 50, or 70° C., thereby altering the flow rate of air, and the volume of gas evolving from the fuel electrode was measured. The evolution volume of gas was determined by underwater conversion. The concentration of hydrogen in the evolved gas was determined by gas chromatography, and the rate of hydrogen evolution was determined based on the result.

Figure 3:
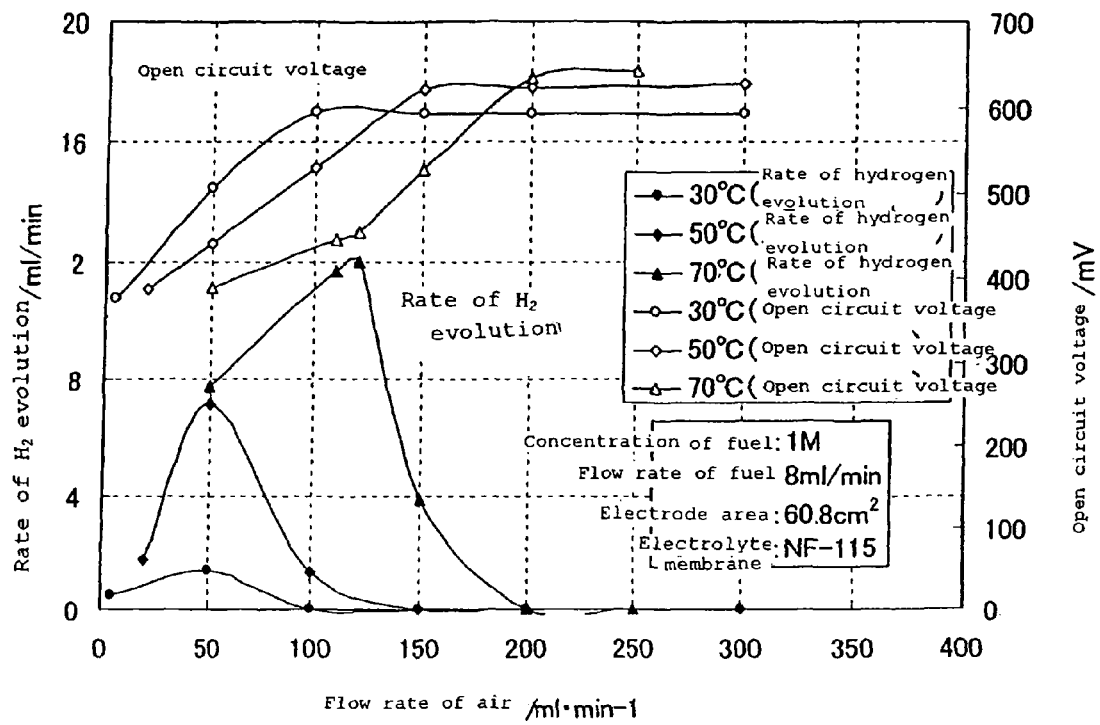
FIG. 3 shows a graph for indicating relationship between the flow rate of air and the rate of hydrogen evolution when temperature is varied (30 to 70° C.) (hydrogen generation example 1-1).

The results are shown in FIG. 3.

Evolution of hydrogen from the fuel electrode of the cell was confirmed with reduction of the flow rate of air for all the temperatures tested. The rate of hydrogen evolution becomes high as the temperature is raised. Studies of relation of the open-circuit voltage (open voltage) with the flow rate of air indicate that as the flow rate of air becomes low, the open-circuit voltage of the cell tends to decline.

Figure 4:
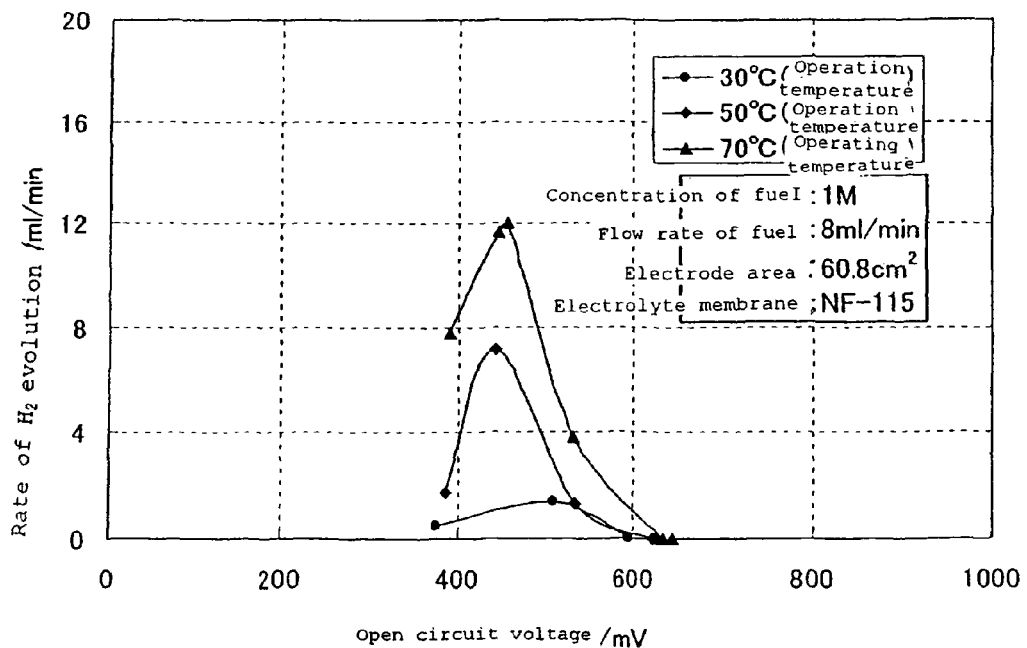
FIG. 4 shows a graph for indicating relationship between the open-circuit voltage and the rate of hydrogen evolution when temperature is varied (30 to 70° C.) (hydrogen generation example 1-1).

FIG. 4 shows a graph for indicating relationship between the open-circuit voltage and the rate of hydrogen evolution, both adapted from the results of FIG. 3.

From this it was found that the rate of hydrogen evolution (volume of hydrogen evolution) tends to depend on the open-circuit voltage, and that hydrogen evolves when the open-circuit voltage is in the range of 400 to 600 mV. The rate of hydrogen evolution is the highest around 450 mV for all the temperatures tested.

Next, fuel was flowed at 8 ml/min and air at 120 ml/min at 70° C. to allow gas to evolve, and the concentration of hydrogen in the gas was determined by gas chromatography.

As a result, it was found that the gas contains hydrogen at about 70%, and carbon dioxide at about 15%. CO was not detected.

HYDROGEN GENERATION EXAMPLE 1-2

The same hydrogen generating cell as that of hydrogen generation example 1-1 was used. The temperature of the cell was kept at 70° C., and 1M aqueous solution of methanol (fuel) was applied at the flow rate of 2, 8, or 15 ml/min. Then, relations of the flow rate of fuel, the flow rate of air, the rate of hydrogen evolution and open-circuit voltage with the flow rate of air were shown in FIG. 5.

From the graph it was found that as the flow rate of fuel decreases, the rate of hydrogen evolution becomes larger.

Figure 5:
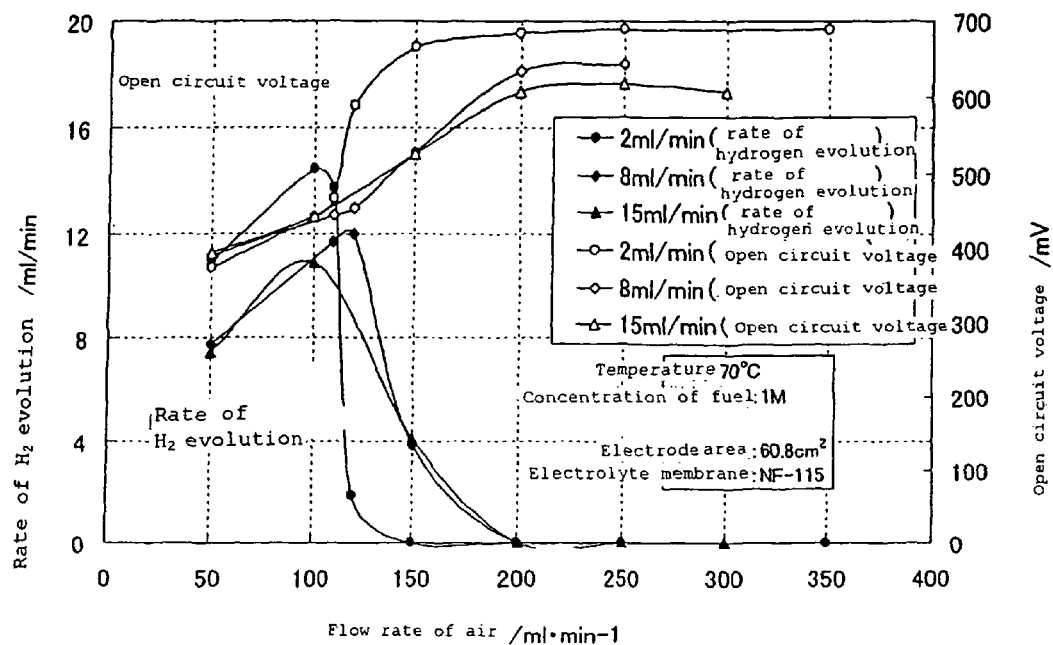
FIG. 5 shows a graph for indicating relations of the rate of hydrogen evolution and open-circuit voltage with the flow rate of air when the flow rate of fuel is varied (temperature being kept at 70° C.) (hydrogen generation example 1-2).
Figure 6:
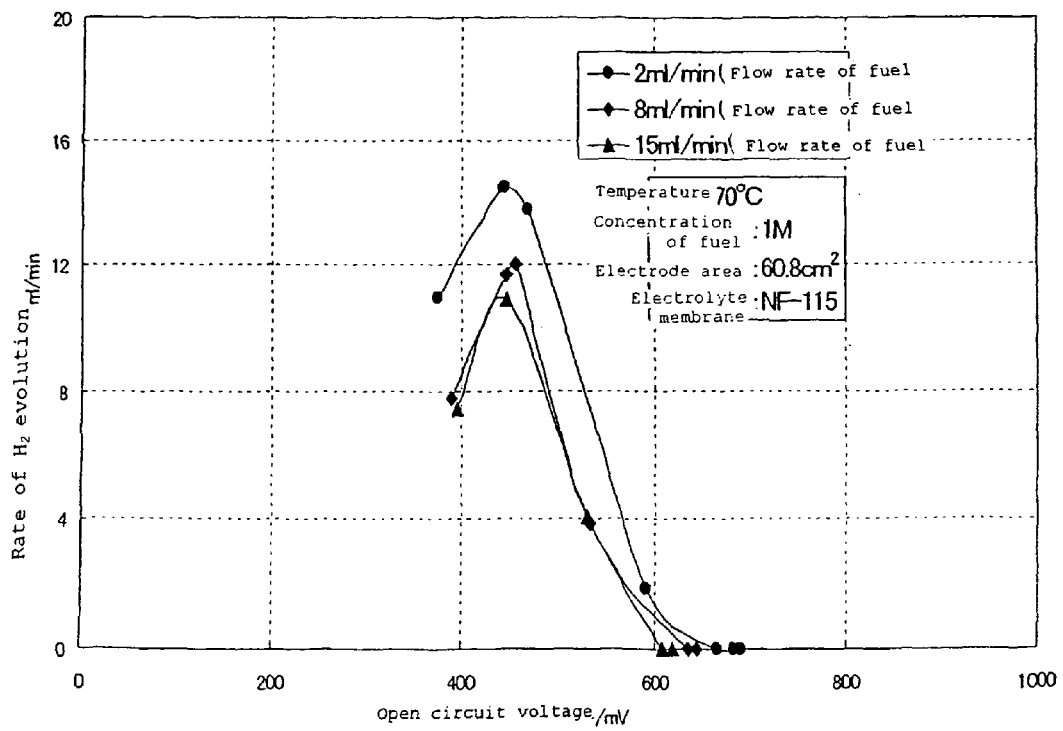
FIG. 6 shows a graph for indicating relation of the rate of hydrogen evolution with the open-circuit voltage when the flow rate of fuel is varied (hydrogen generation example 1-2).

FIG. 6 shows a graph for indicating relationship between the open-circuit voltage and the rate of hydrogen evolution, both adapted from the results of FIG. 5.

From this it was found that the rate of hydrogen evolution depends on the open-circuit voltage, and is the highest around 450 mV for all the fuel flows tested as in hydrogen generation example 1-1.

In this generation example, the highest rate of hydrogen evolution 14.48 ml/min was obtained at the open-circuit voltage of 442 mV (operation temperature: 70° C.; concentration of fuel: 1M; flow rate of fuel: 2 ml/min; and flow rate of air: 100 ml/min). The concentration of hydrogen in the evolved gas was determined by gas chromatography as in example 1-1, and found to be about 70%.

HYDROGEN GENERATION EXAMPLE 1-3

The same hydrogen generating cell as that of hydrogen generation example 1-1 was used. The temperature of the cell was kept at 70° C., and aqueous solution of methanol (fuel) at a fuel concentration of 0.5, 1 or 2M was applied at a constant flow rate of 8 ml/min. Then, relations of the flow rate of fuel, the flow rate of air, the rate of hydrogen evolution and open-circuit voltage with the flow rate of air were shown in FIG. 7.

From the graph it was found that as the concentration of fuel decreases, the rate of hydrogen evolution becomes larger.

Figure 7:
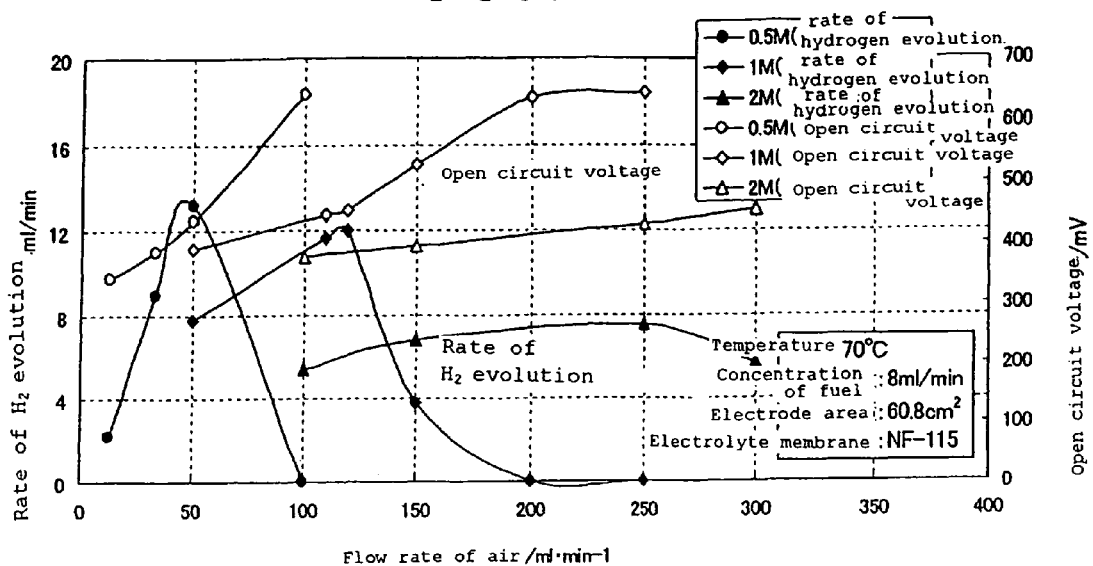
FIG. 7 shows a graph for indicating relations of the rate of hydrogen evolution and open-circuit voltage with the flow rate of air when the concentration of fuel is varied (temperature being kept at 70° C.) (hydrogen generation example 1-3).
Figure 8:
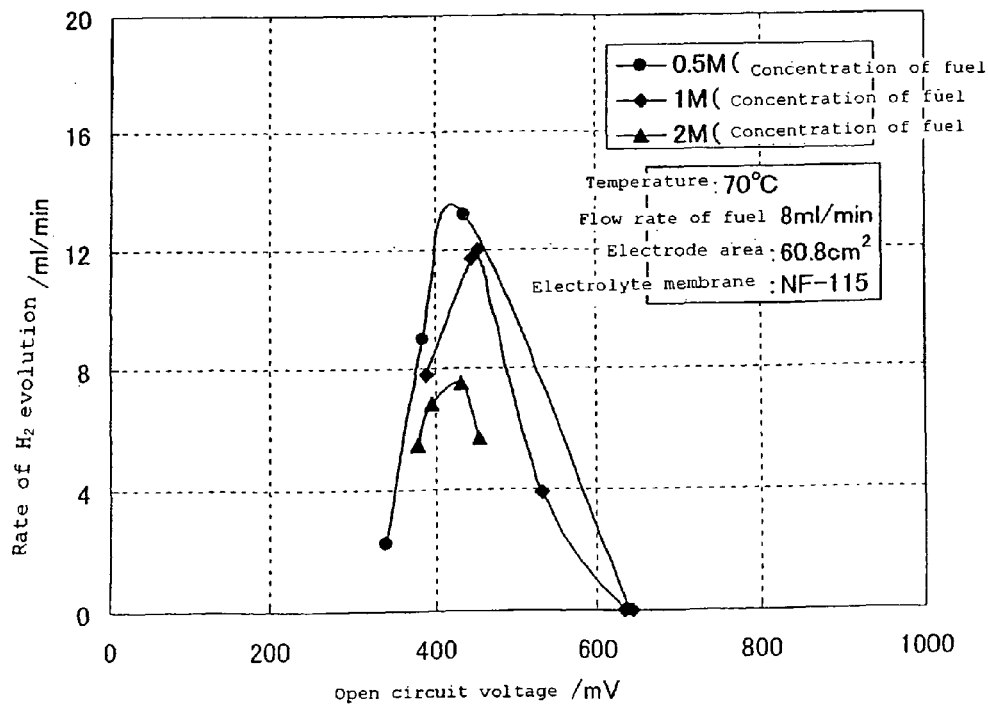
FIG. 8 shows a graph for indicating relation of the rate of hydrogen evolution with the open-circuit voltage when the concentration of fuel is varied (hydrogen generation example 1-3).

FIG. 8 shows a graph for indicating relationship between the open-circuit voltage and the rate of hydrogen evolution, both adapted from the results of FIG. 7.

From this it was found that the rate of hydrogen evolution depends on the open-circuit voltage, and that hydrogen evolves when the open-circuit voltage is in the range of 300 to 600 mV. The rate of hydrogen evolution is the highest around 450 mV for all the fuel concentrations tested as in hydrogen generation example 1-1.

HYDROGEN GENERATION EXAMPLE 1-4

Next, effect of the thickness of electrolyte membrane on the evolution volume of gas was studied.

The hydrogen generating cell was constructed similarly to the above examples, using a Nafion 112 (Dupont) having a thickness of 50 μm, instead of Nafion 115 (Dupont) having a thickness of 130 μm as used in the above examples 1-1 to 1-3. The cell was operated: temperature at 70° C.; concentration of fuel at 1M; and rate of fuel flow at 8 ml/min, and relations of the flow rate of fuel, the flow rate of air and the rate of hydrogen evolution with the flow rate of air were studied.

Both Nafion 115 and 112 membranes are made of the same material as a single difference in their thickness. Thus, only the thickness of electrolyte membranes serves as a parameter to be studied in the experiment. The study results are summarized in FIG. 9.

Figure 9:
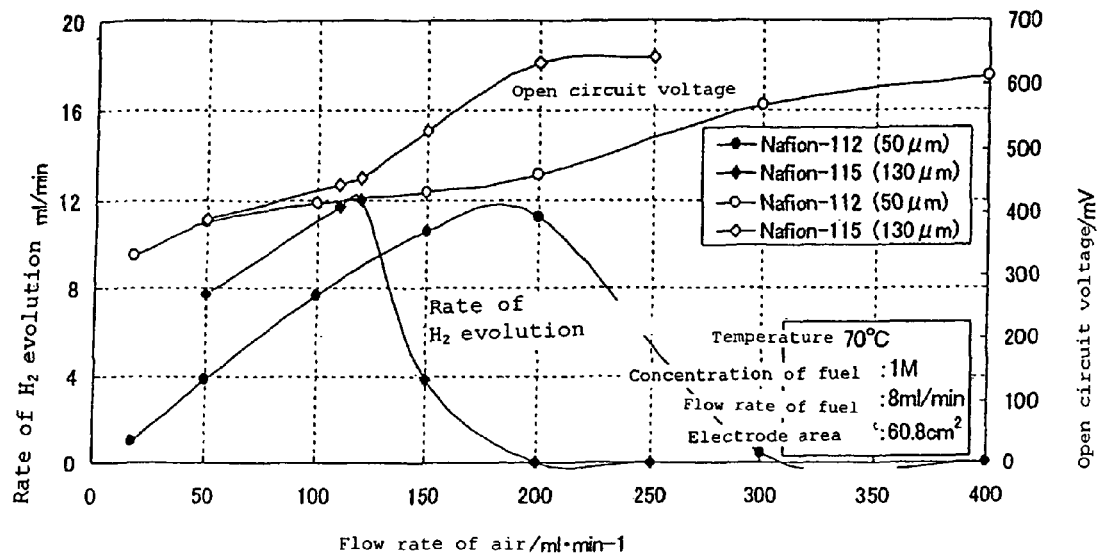
FIG. 9 shows a graph for indicating relations of the rate of hydrogen evolution and open-circuit voltage with the flow rate of air when the thickness of electrolyte membrane is varied (hydrogen generation example 1-4).
Figure 10:
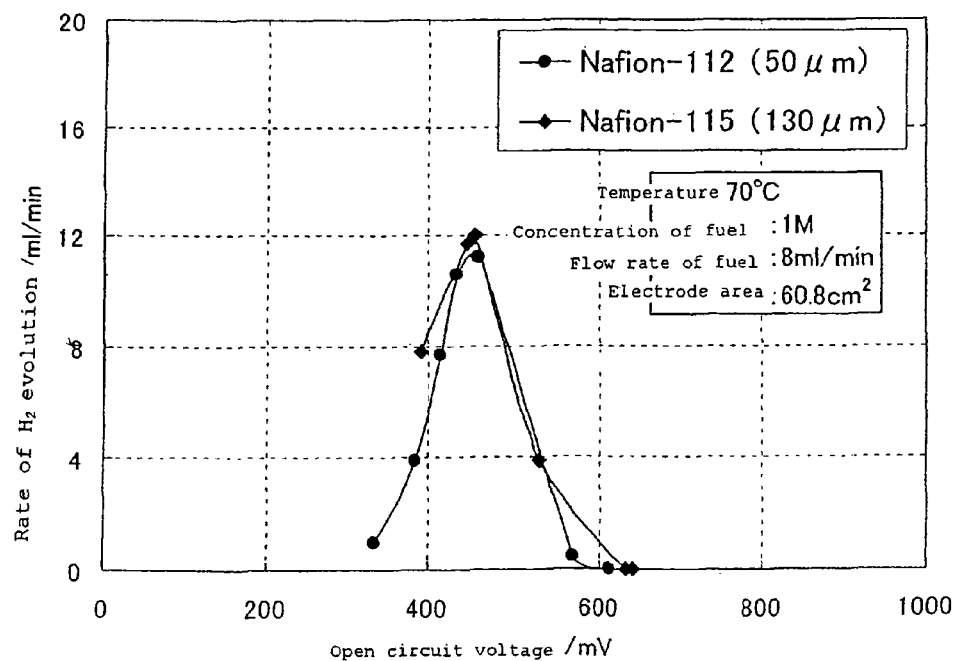
FIG. 10 shows a graph for indicating relation of the rate of hydrogen evolution with the open-circuit voltage when the thickness of electrolyte membrane is varied (hydrogen generation example 1-4).

FIG. 10 shows a graph for indicating relationship between the open-circuit voltage and the rate of hydrogen evolution, both adapted from the results of FIG. 9.

From this it was found that the rate of hydrogen evolution was similar regardless of the thickness of electrolyte membrane. As seen from the figure, the rate of hydrogen evolution depends on the open-circuit voltage, and is the highest around 450 mV.

HYDROGEN GENERATION EXAMPLE 1-5

A hydrogen generating cell constructed as in hydrogen generation example 1-1 was placed in an electric furnace where hot air was circulated. The temperature of the cell was kept at 30, 50, 70, or 90° C., air was flowed at a rate of 0 to 250 ml/min to the air electrode, and 1M aqueous solution of methanol was flowed at a rate of 5 ml/min to the fuel electrode. Then, the open-circuit voltage, and the rate of hydrogen evolution from the fuel electrode were monitored and analyzed.

Figure 11:
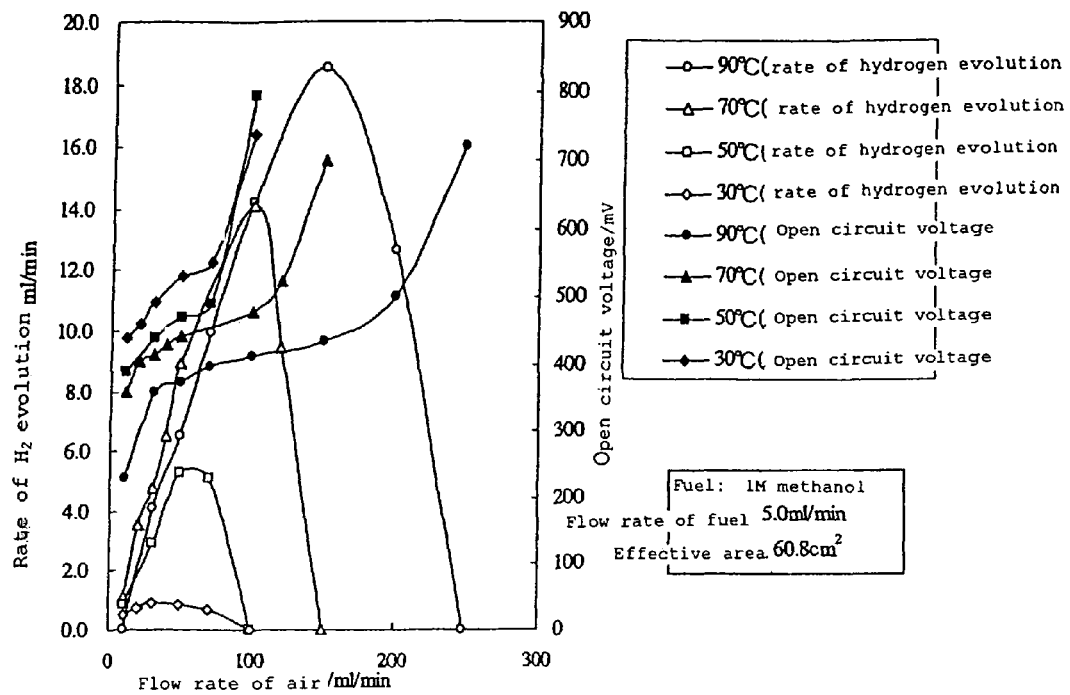
FIG. 11 shows a graph for indicating relations of the rate of hydrogen evolution and open-circuit voltage with the flow rate of air when the temperature is varied (30 to 90° C.) (hydrogen generation example 1-5).

Relation of the rate of hydrogen evolution with the flow rate of air is represented in FIG. 11.

Similarly to example 1-1, the evolution of hydrogen from the fuel electrode was confirmed with reduction of the flow rate of air for all the temperatures tested. The rate of hydrogen evolution becomes high as the temperature is raised. Studies of relation of the open-circuit voltage (open voltage) with the flow rate of air indicate that as the flow rate of air becomes low, the open-circuit voltage of the cell tends to decline.

Figure 12:
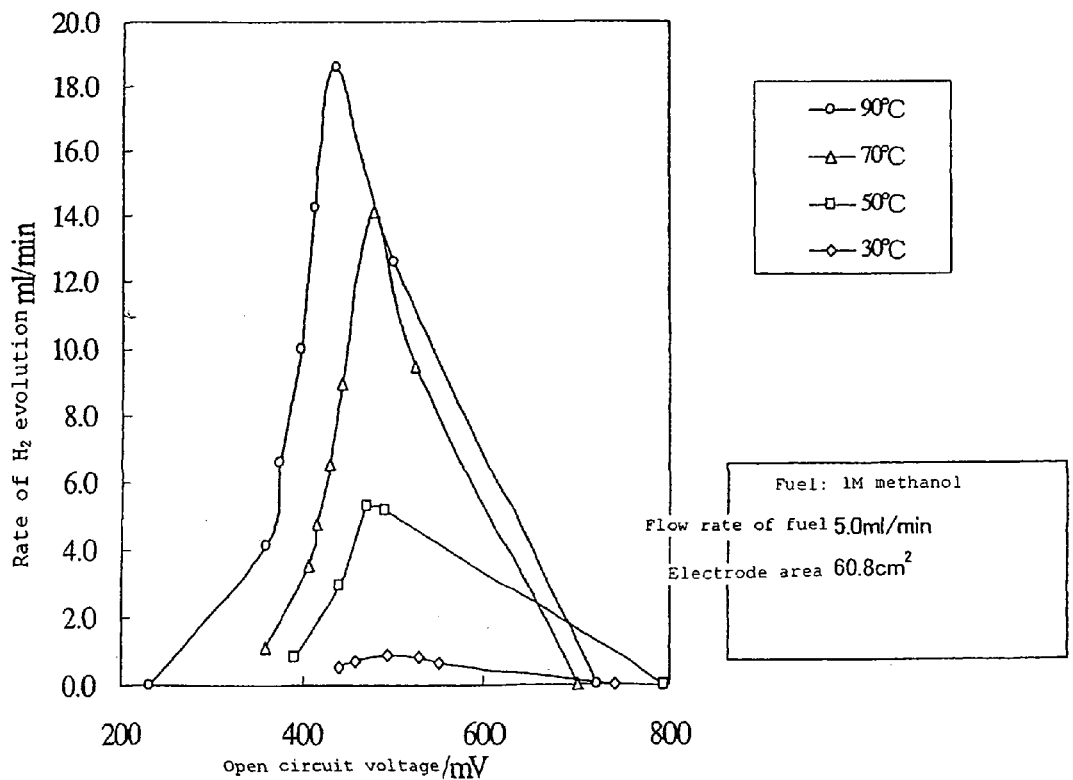
FIG. 12 shows a graph for indicating relation of the rate of hydrogen evolution with the open-circuit voltage when the temperature is varied (30 to 90° C.)(hydrogen generation example 1-5).

FIG. 12 shows a graph for indicating relationship between the open-circuit voltage and the rate of hydrogen evolution, both adapted from the results of FIG. 11.

From this it was found that the rate of hydrogen evolution depends on the open-circuit voltage, and hydrogen evolves when the open-circuit voltage is in the range of 300 to 700 mV. The rate of hydrogen evolution is the highest around 470 to 480 mV when the temperature is kept at 30 to 70° C., while the peak is shifted to 440 mV when the temperature is raised to 90° C.

HYDROGEN GENERATING EXAMPLE 1-6

The same hydrogen generating cell as that of hydrogen generation example 1-1 was used. The temperature of cell was kept at 50° C., and fuel was applied at the flow rate of 1.5, 2.5, 5.0, 7.5, or 10.0 ml/min. Then, relations of the flow rate of fuel, the flow rate of air and the rate of hydrogen evolution, with the flow rate of air were shown in FIG. 13.

From this it was found that in contrast with example 1-2 where the temperature was kept at 70° C. as the flow rate of fuel increases, the rate of hydrogen evolution becomes larger.

Figure 13:
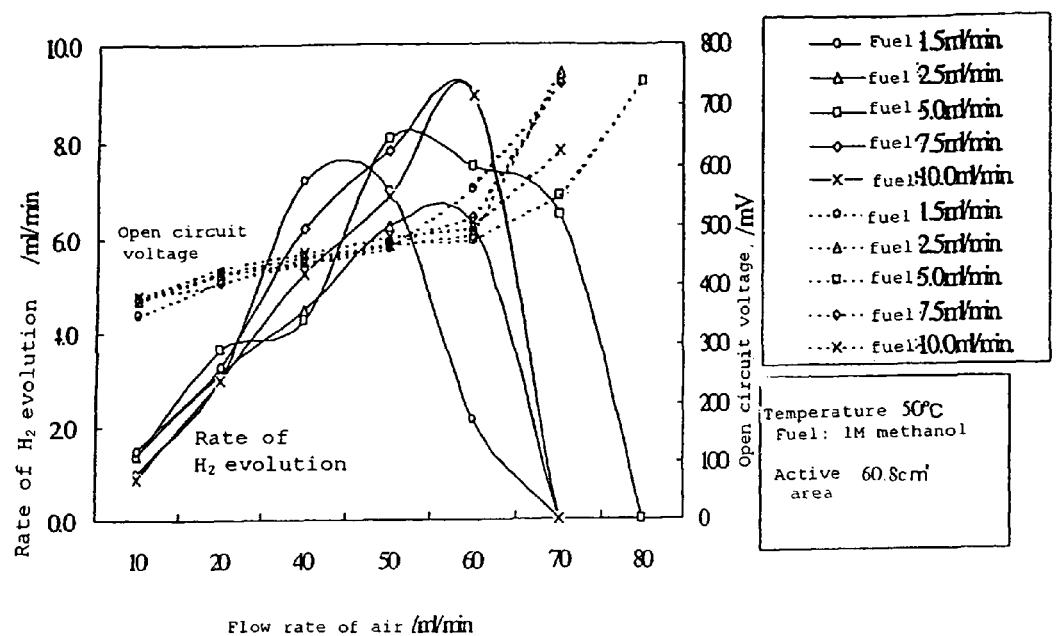
FIG. 13 shows a graph for indicating relations of the rate of hydrogen evolution and open-circuit voltage with the flow rate of air when the flow rate of fuel is varied (temperature: 50° C.) (hydrogen generation example 1-6).
Figure 14:
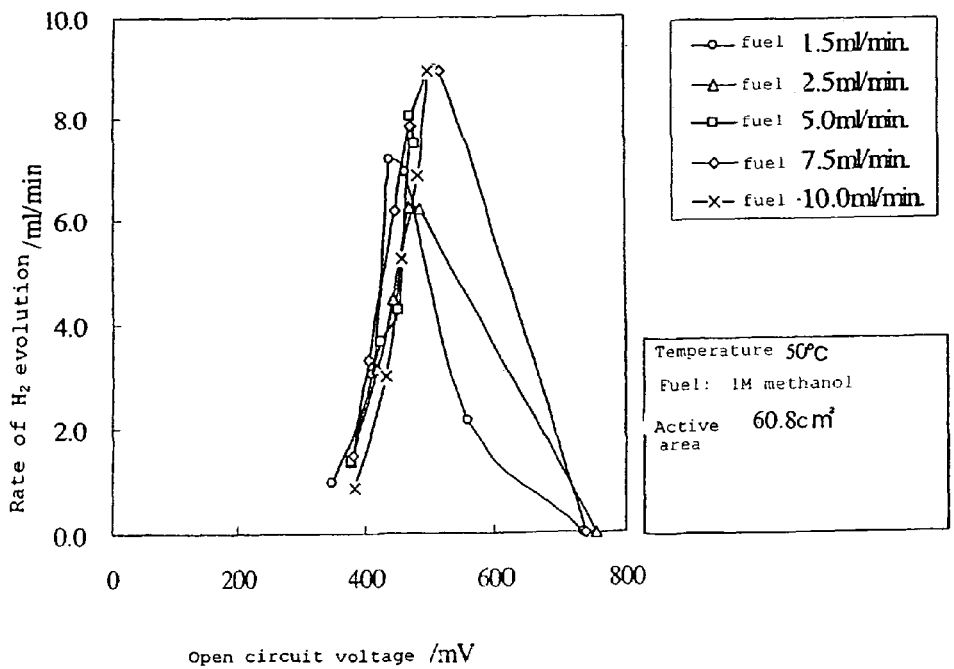
FIG. 14 shows a graph for indicating relation of the rate of hydrogen evolution with the open-circuit voltage when the flow rate of fuel is varied (temperature: 50° C.)(hydrogen generation example 1-6).

FIG. 14 shows a graph for indicating relationship between the open-circuit voltage and the rate of hydrogen evolution, both adapted from the results of FIG. 13.

From this it was found that the rate of hydrogen evolution depends on the open-circuit voltage, and hydrogen evolves when the open-circuit voltage is in the range of 300 to 700 mV. The rate of hydrogen evolution is the highest around 450 to 500 mV.

After determining the consumption of methanol in fuel and the rate of hydrogen evolution when the flow rate of fuel is varied, the energy efficiency under open-circuit condition was determined by calculation in accordance with the equation described below (which is different from the equation used for determining the energy efficiency of a charging condition). As a result it was found that, under open-circuit condition, the energy efficiency was 17% when fuel flows at 5.0 ml/min, and 22% when fuel flows at 2.5 ml/min.

Efficiency (%) of a hydrogen generating system under open-circuit condition=(change of the standardized enthalpy of hydrogen evolved/change of enthalpy of methanol consumed)×100

HYDROGEN GENERATING EXAMPLE 1-7

The same hydrogen generating cell as that of hydrogen generation example 1-1 was used. The temperature of cell was kept at 50° C., and aqueous solution of methanol (fuel) was applied at a constant flow rate of 5 ml/min while the concentration of fuel was varied to 0.5, 1, 2, 3M. Then, relations of the flow rate of air and the rate of hydrogen evolution with the flow rate of air were shown in FIG. 15.

From this it was found that as the concentration of fuel decreases, the peak of the rate of hydrogen evolution is observed with reduction of the flow rate of air.

Figure 15:
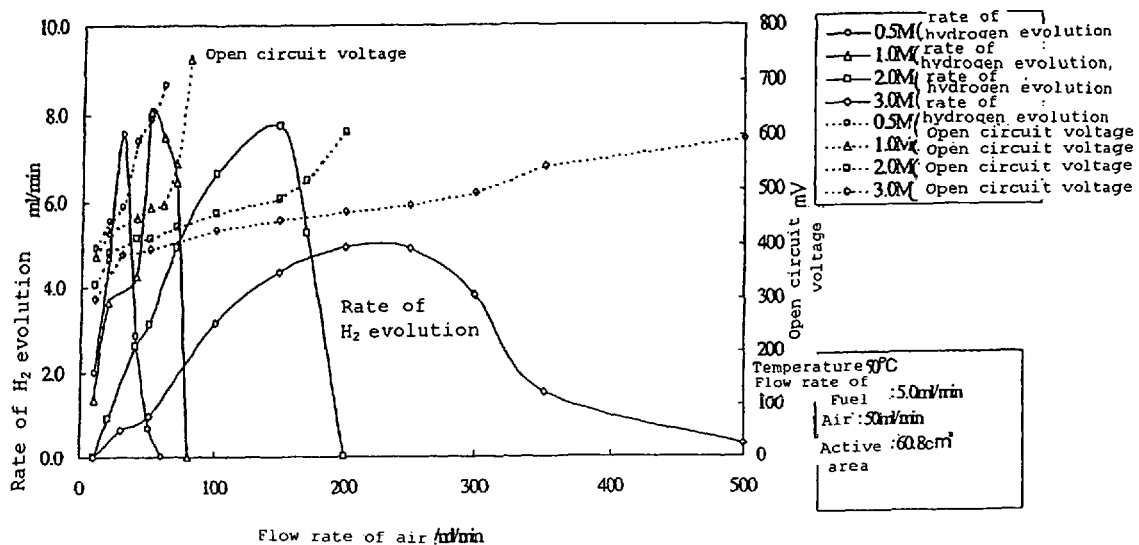
FIG. 15 shows a graph for indicating relations of the rate of hydrogen evolution and open-circuit voltage with the flow rate of air when the concentration of fuel is varied (temperature: 50° C.) (hydrogen generation example 1-7).
Figure 16:
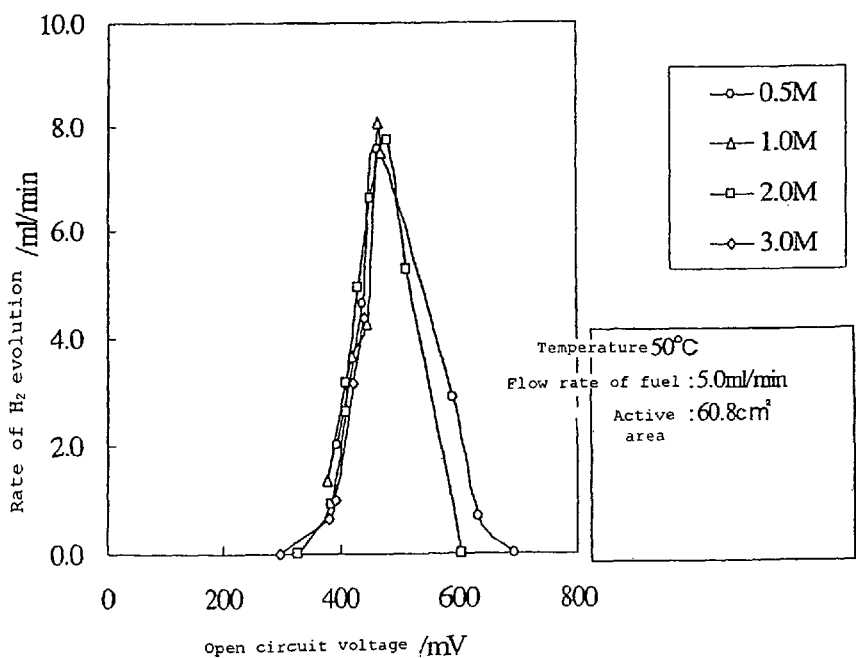
FIG. 16 shows a graph for indicating relation of the rate of hydrogen evolution with the open-circuit voltage when the concentration of fuel is varied (temperature: 50° C.) (hydrogen generation example 1-7).

FIG. 16 shows a graph for indicating relationship between the open-circuit voltage and the rate of hydrogen evolution, both adapted from the results of FIG. 15.

From this it was found that the rate of hydrogen evolution depends on the open-circuit voltage, and hydrogen evolves when the open-circuit voltage is in the range of 300 to 700 mV. The rate of hydrogen evolution is the highest around 470 mV for all the concentrations of fuel tested.

HYDROGEN GENERATING EXAMPLE 1-8

Figure 17:
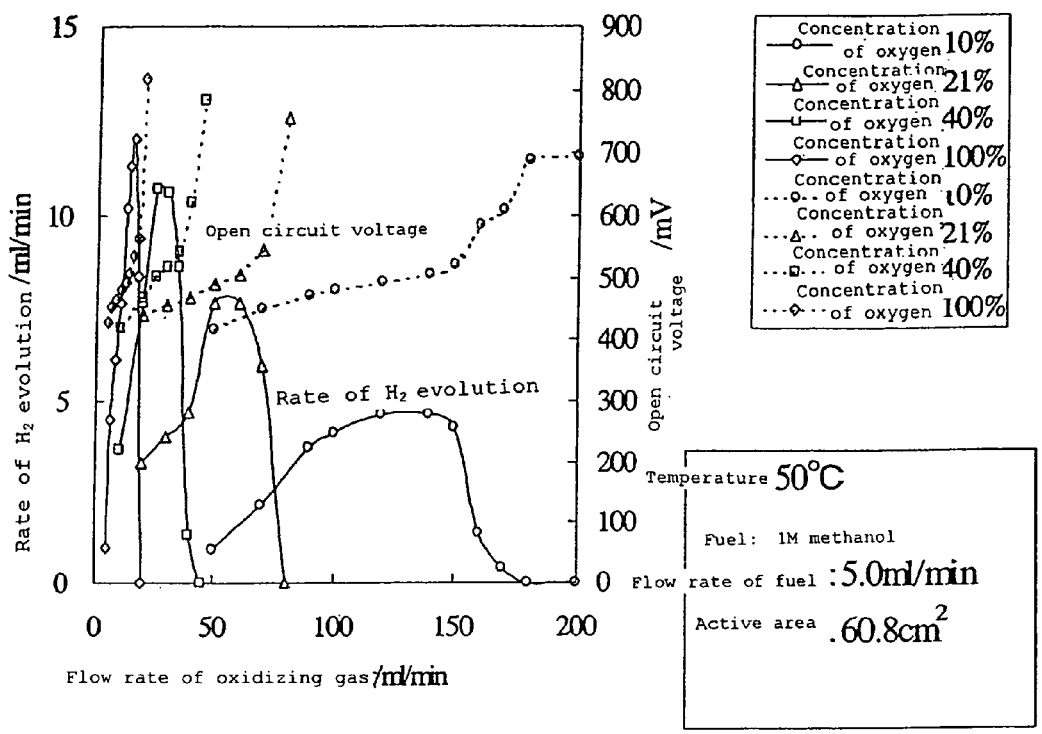
FIG. 17 shows a graph for indicating relations of the rate of hydrogen evolution and open-circuit voltage with the flow rate of oxidizing gas when the concentration of oxygen is varied (temperature: 50° C.) (hydrogen generation example 1-8).

The same hydrogen generating cell as that of hydrogen generation example 1-1 was used (except that the air electrode consisted of an oxidizing electrode to which oxidizing gas was flowed). The cell was operated: temperature at 50° C.; concentration of fuel at 1M; and rate of fuel flow at 5 ml/min, while the concentration of oxygen being varied to 10, 21, 40, or 100% and relations of the open-circuit voltage and the rate of hydrogen evolution with the flow rate of oxidizing gas were studied. The results are shown in FIG. 17. The oxidizing gas containing 21% oxygen was represented by air, and the oxidizing gas containing 10% oxygen was obtained by mixing air with nitrogen. The oxidizing gas containing 40% oxygen was obtained by adding oxygen (100% oxygen) to air.

From this it was found that as the concentration of oxygen increases, the flow rate of oxidizing gas becomes smaller.

Figure 18:
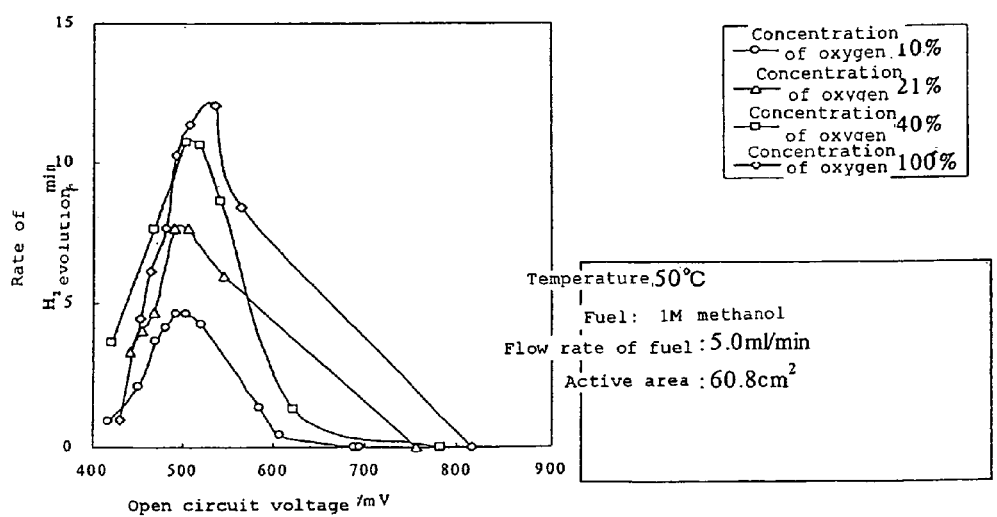
FIG. 18 shows a graph for indicating relation of the rate of hydrogen evolution with the open-circuit voltage when the concentration of oxygen is varied (temperature: 50° C.) (hydrogen generation example 1-8).

FIG. 18 shows a graph for indicating relationship between the open-circuit voltage and the rate of hydrogen evolution, both adapted from the results of FIG. 17.

From this it was found that the rate of hydrogen evolution depends on the open-circuit voltage, and hydrogen evolves when the open-circuit voltage is in the range of 400 to 800 mV. The rate of hydrogen evolution is the highest at 490 to 530 mV.

HYDROGEN GENERATING EXAMPLE 1-9

The same hydrogen generating cell as that of hydrogen generation example 1-1 was used. The cell was operated at 50° C. with the flow of air to the air electrode kept at 60 ml/min and the flow of aqueous solution of methanol (fuel) to the fuel electrode kept at 2.6 ml/min to cause gas to evolve. A 200 cc of sample was collected from the gas, and the concentration of CO of the gas was determined by gas chromatography. No CO was detected in the gas (1 ppm or lower). Under the measurement condition the open-circuit voltage of the cell was 477 mV and the rate of hydrogen evolution was 10 ml/min.

HYDROGEN GENERATING EXAMPLE 1-10

The same hydrogen generating cell with that of Example 1-1 was used (except that the air electrode consisted of an oxidizing electrode to which liquid hydrogen peroxide was flowed). The cell was placed in an electric furnace where hot air was circulated. The cell was operated while the temperature being kept at 30, 50, 70, or 90° C. with the flow of 1M $H_2O_2$ (hydrogen peroxide) to the oxidizing electrode kept at 1-8 ml/min and the flow of 1M aqueous solution of methanol (fuel) to the fuel electrode kept at 5 ml/min. Relations of the open-circuit voltage and the rate of hydrogen evolution with the flow rate of hydrogen peroxide were studied.

Figure 19:
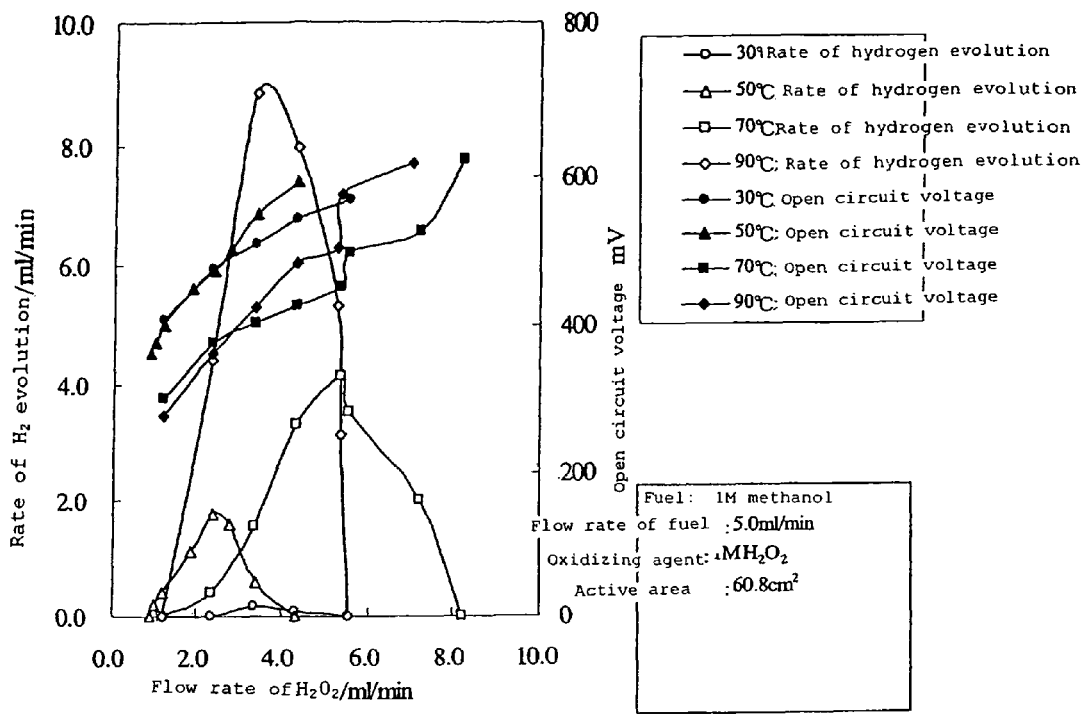
FIG. 19 shows a graph for indicating relations of the rate of hydrogen evolution and open-circuit voltage with the flow rate of $H_2O_2$ when the temperature is varied (30 to 90° C.) (hydrogen generation example 1-10).

Relation of the rate of hydrogen evolution with the flow rate of $H_2O_2$ is represented in FIG. 19.

Similarly to hydrogen generation example 1-1, the evolution of hydrogen from the fuel electrode of the cell was confirmed with reduction of the flow rate of $H_2O_2$ for all the temperatures tested. The rate of hydrogen evolution becomes high as the temperature is raised. Studies of relation of the open-circuit voltage with the flow rate of $H_2O_2$ indicate that as the flow rate of $H_2O_2$ becomes low, the open-circuit voltage of the cell tends to decline.

Figure 20:
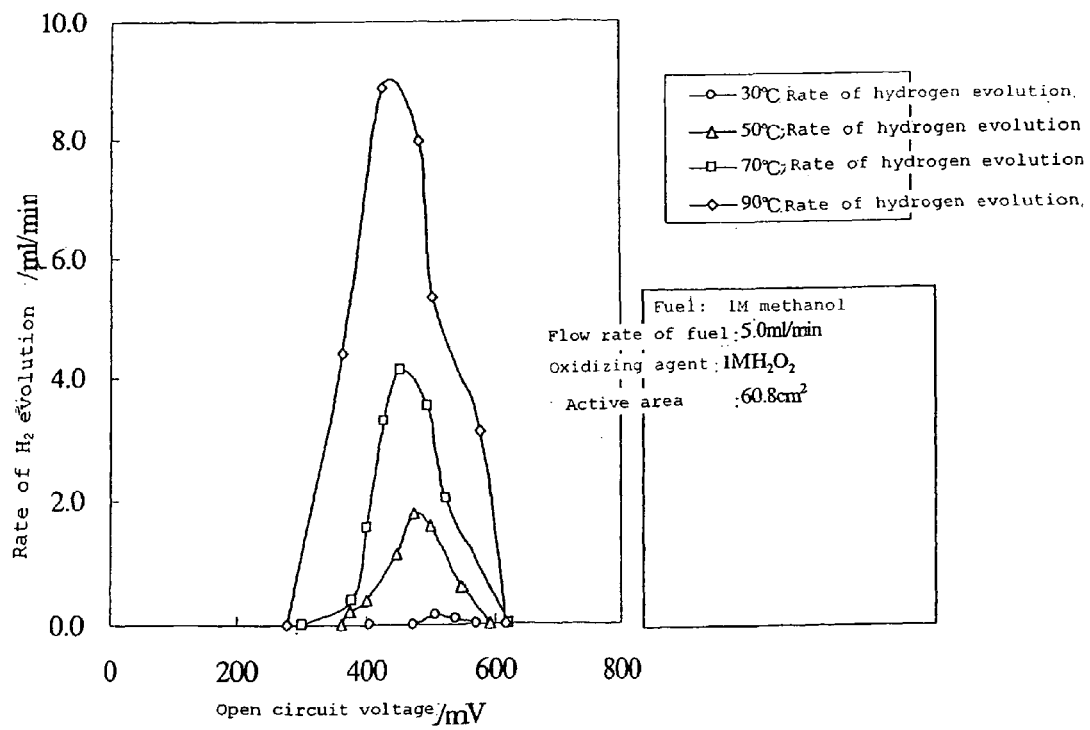
FIG. 20 shows a graph for indicating relation of the rate of hydrogen evolution (oxidizing agent: $H_2O_2$) with the open-circuit voltage when the temperature is varied (30 to 90° C.)(hydrogen generation example 1-10).

FIG. 20 shows a graph for indicating relationship between the open-circuit voltage and the rate of hydrogen evolution, both adapted from the results of FIG. 19.

From this it was found that the rate of hydrogen evolution depends on the open-circuit voltage, and hydrogen evolves when the open-circuit voltage is in the range of 300 to 600 mV. The rate of hydrogen evolution is the highest around 500 mV when the temperature is kept at 30 to 50° C., while the peak is shifted to 450 mV when the temperature is raised to 70 to 90° C.

What is important here is that no current or voltage was applied from outside to the hydrogen generating cells of Example 1. The cell was only connected to an electrometer for monitoring the open-circuit voltage which has an internal impedance of 1 GΩ or higher, while the cell was supplied with fuel and oxidizing agent.

In other words, the hydrogen generating cell of Example 1 converted part of fuel into hydrogen receiving no external energy except for fuel and oxidizing agent.

In addition, conversion of fuel into hydrogen occurred at a surprisingly low temperature of 30 to 90° C. In view of these facts, the hydrogen generating method of the invention and hydrogen generating system based on the method are likely to be novel ones that have never been observed before.

EXAMPLE 2

Illustrative examples of the hydrogen generating method of the third aspect of the invention and hydrogen generating system (discharging condition) of the fourth aspect of the invention based on the method will be presented below.

HYDROGEN GENERATING EXAMPLE 2-1

Figure 21:
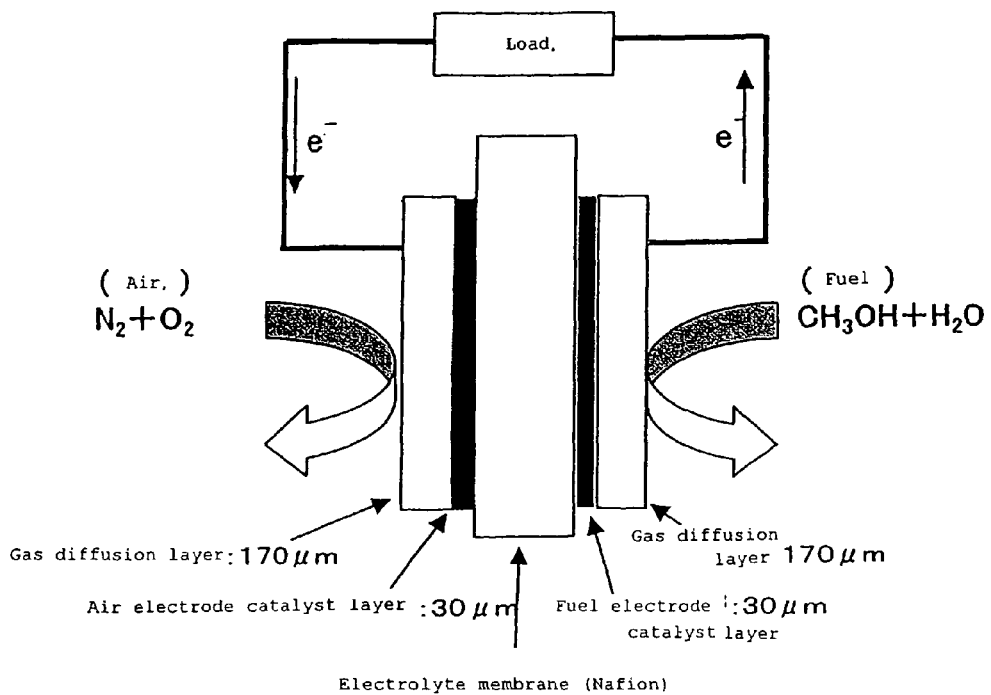
FIG. 21 is a schematic diagram of a hydrogen generating cell (with means for withdrawing electric energy) described in Example 2.

The structure of hydrogen generating cells described in Example 2 (illustrative examples 2-1 to 2-8) with means for withdrawing electric energy is outlined in FIG. 21.

The hydrogen generating cells of Example 2 are the same in structure as those of hydrogen generation example 1-1 except that the cell comprises a fuel electrode as a negative electrode and an air electrode as a positive electrode with means for withdrawing electric energy.

The hydrogen generating cell was placed in an electric furnace where hot air was circulated. The cell was operated while the temperature (running temperature) being kept at 50° C. with the flow rate of air to the air electrode kept at 10 to 100 ml/min and the flow of 1M aqueous solution of methanol (fuel) to the fuel electrode kept at 5 ml/min to cause gas to evolve. Then, while the external current flowing between the air electrode and the fuel electrode being varied, the running voltage between the fuel electrode and the air electrode, the volume of gas evolved from the fuel electrode and gas composition were monitored and analyzed. The concentration of hydrogen in the generated gas was determined by gas chromatography.

Figure 22:
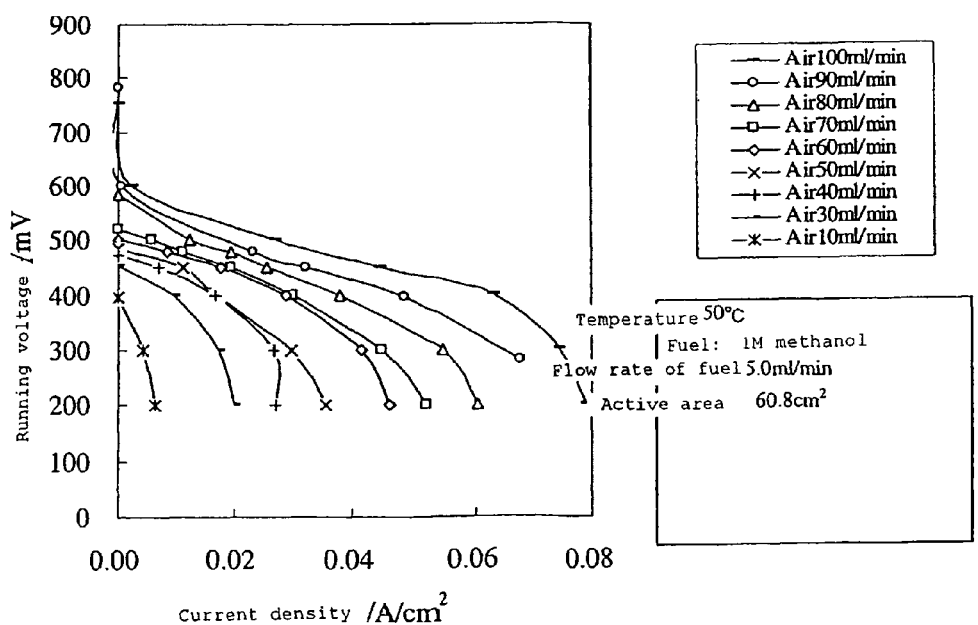
FIG. 22 shows a graph for indicating relation of the running voltage (discharging: temperature at 50° C.) with the current density withdrawn when the flow rate of air is varied (hydrogen generation example 2-1).

Relation of the running voltage with the current density withdrawn revealed in the test is shown in FIG. 22.

It was found that as the flow rate of air is reduced, the dischargeable limit current density becomes smaller with the reduction of the running voltage.

Figure 23:
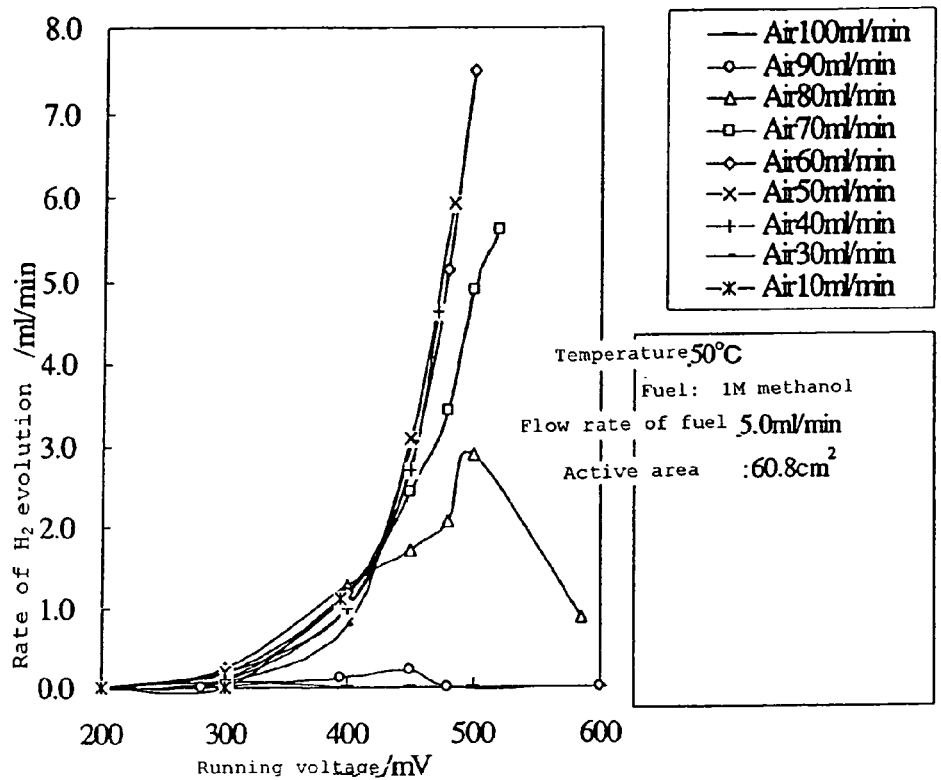
FIG. 23 shows a graph for indicating relation of the rate of hydrogen evolution (discharging: temperature at 50° C.) with the running voltage when the flow rate of air is varied (hydrogen generation example 2-1).

FIG. 23 shows a graph for indicating relationship between the rate of hydrogen evolution and the running voltage, both adapted from the results of FIG. 22.

From this it was found that the rate of hydrogen evolution (volume of hydrogen evolution) depends on the running voltage, and gas evolves when the running voltage is in the range of 300 to 600 mV. Moreover, when the flow rate of air is in the range of 50 to 60 ml/min, hydrogen evolves most readily: when the flow rate of air is excessively large as 100 ml/min, no evolution of hydrogen is detected.

Next, the cell was operated: temperature at 50° C.; rate of fuel flow at 5 ml/min; rate of air flow at 60 ml/min; and current density at 8.4 mA/cm² to cause gas to evolve. The concentration of hydrogen in the gas was determined by gas chromatography.

As a result, it was found that the gas contained hydrogen at about 74%, and hydrogen evolved at a rate of 5.1 ml/min. No CO was detected.

HYDROGEN GENERATING EXAMPLE 2-2

The same hydrogen generating cell as that of hydrogen generation example 2-1 was used. The cell was operated while the temperature being kept at 30° C. with the flow rate of air to the air electrode kept at 30-100 ml/min and the flow of 1M aqueous solution of methanol (fuel) to the fuel electrode kept at 5 ml/min. Then, while the current flowing between the air electrode and the fuel electrode being varied, the running voltage between the fuel electrode and the air electrode, and the rate of hydrogen evolution occurring from the fuel electrode were monitored and analyzed.

Figure 24:
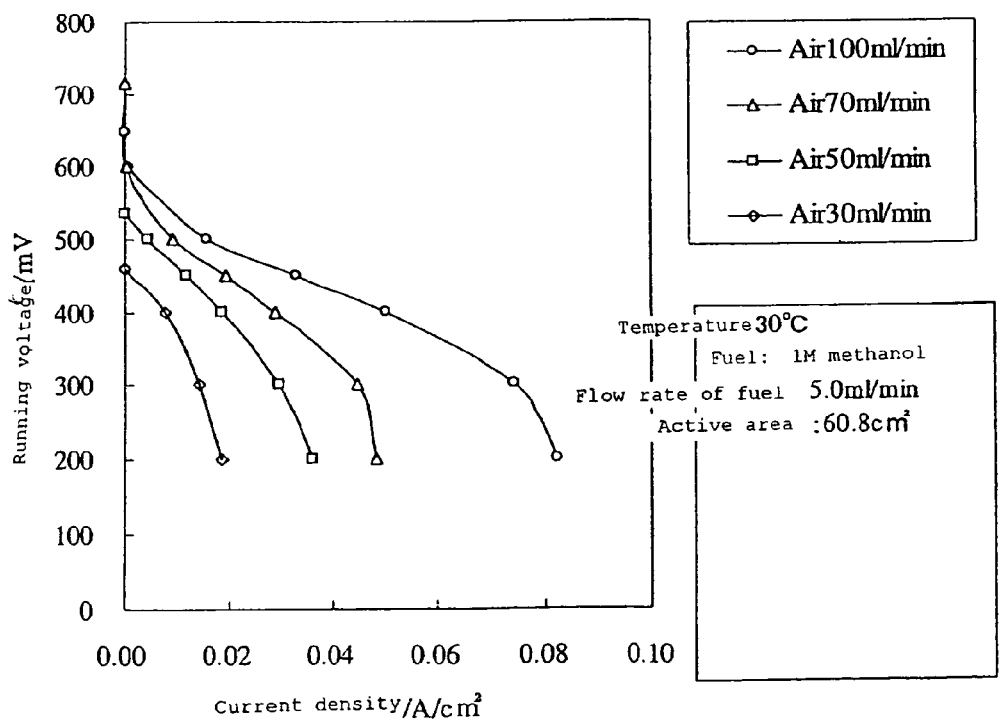
FIG. 24 shows a graph for indicating relation of the running voltage (discharging: temperature at 30° C.) with the current density withdrawn when the flow rate of air is varied (hydrogen generation example 2-2).

Relation of the running voltage with the current density withdrawn revealed in the test is shown in FIG. 24.

It was found that as the flow rate of air is reduced, the dischargeable limit current density becomes smaller with the reduction of running voltage.

Figure 25:
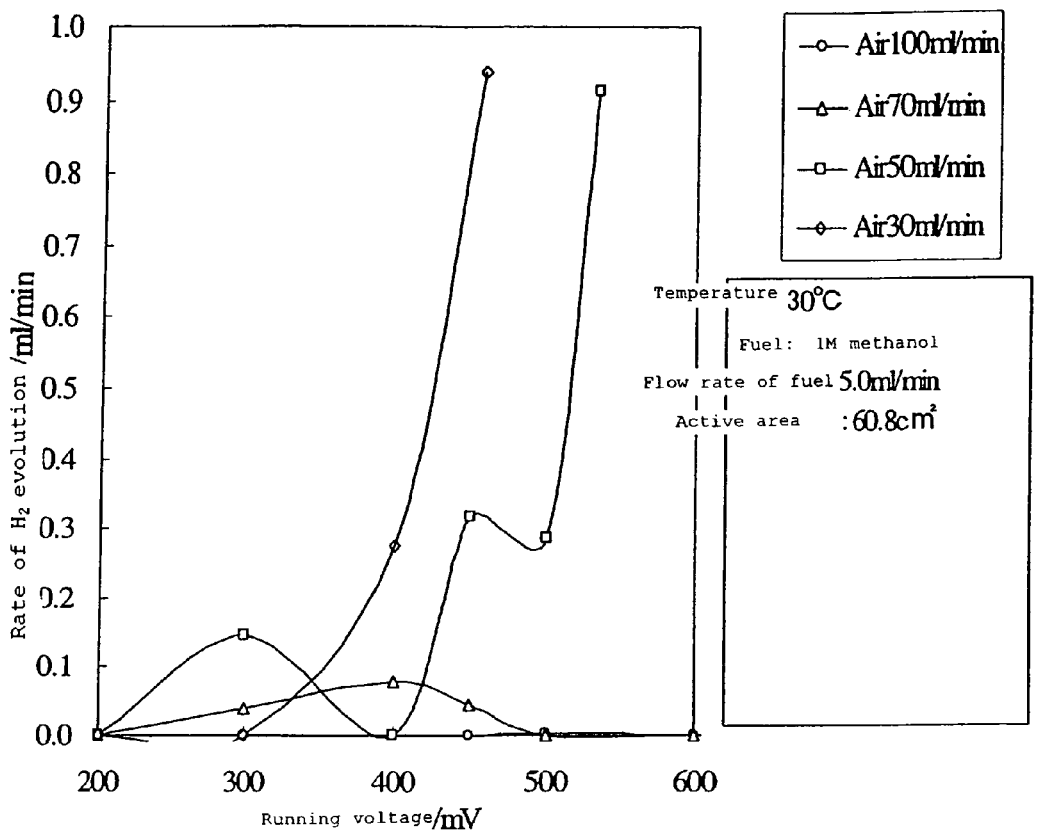
FIG. 25 shows a graph for indicating relation of the rate of hydrogen evolution (discharging: temperature at 30° C.) with the running voltage when the flow rate of air is varied (hydrogen generation example 2-2).

FIG. 25 shows a graph for indicating relationship between the rate of hydrogen evolution and the running voltage, both adapted from the results of FIG. 24.

From this it was found that the rate of hydrogen evolution depends on the running voltage, and hydrogen evolves when the running voltage is in the range of 200 to 540 mV. Hydrogen evolves when the flow rate of air is in the range of 30 to 70 ml/min. When the flow rate of air is 100 ml/min, scarcely any evolution of hydrogen is detected.

HYDROGEN GENERATING EXAMPLE 2-3

The same hydrogen generating cell as that of hydrogen generation example 2-1 was used. The cell was operated while the temperature being kept at 70° C. with the flow rate of air to the air electrode kept at 50-200 ml/min and the flow of 1M aqueous solution of methanol (fuel) to the fuel electrode kept at 5 ml/min. Then, while the current flowing between the air electrode and the fuel electrode being varied, the running voltage between the fuel electrode and the air electrode, and the rate of hydrogen evolution occurring from the fuel electrode were monitored and analyzed.

Figure 26:
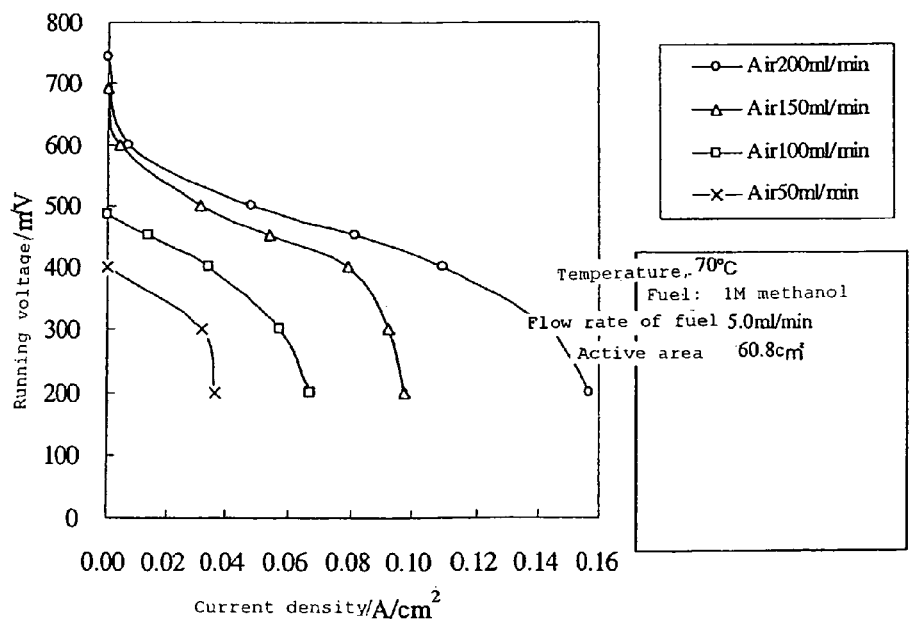
FIG. 26 shows a graph for indicating relation of the running voltage (discharging: temperature at 70° C.) with the current density withdrawn when the flow rate of air is varied (hydrogen generation example 2-3).

Relation of the running voltage with the current density withdrawn revealed in the test is shown in FIG. 26.

It was found that as the flow rate of air is reduced, the dischargeable limit current density becomes smaller with the reduction of the running voltage.

Figure 27:
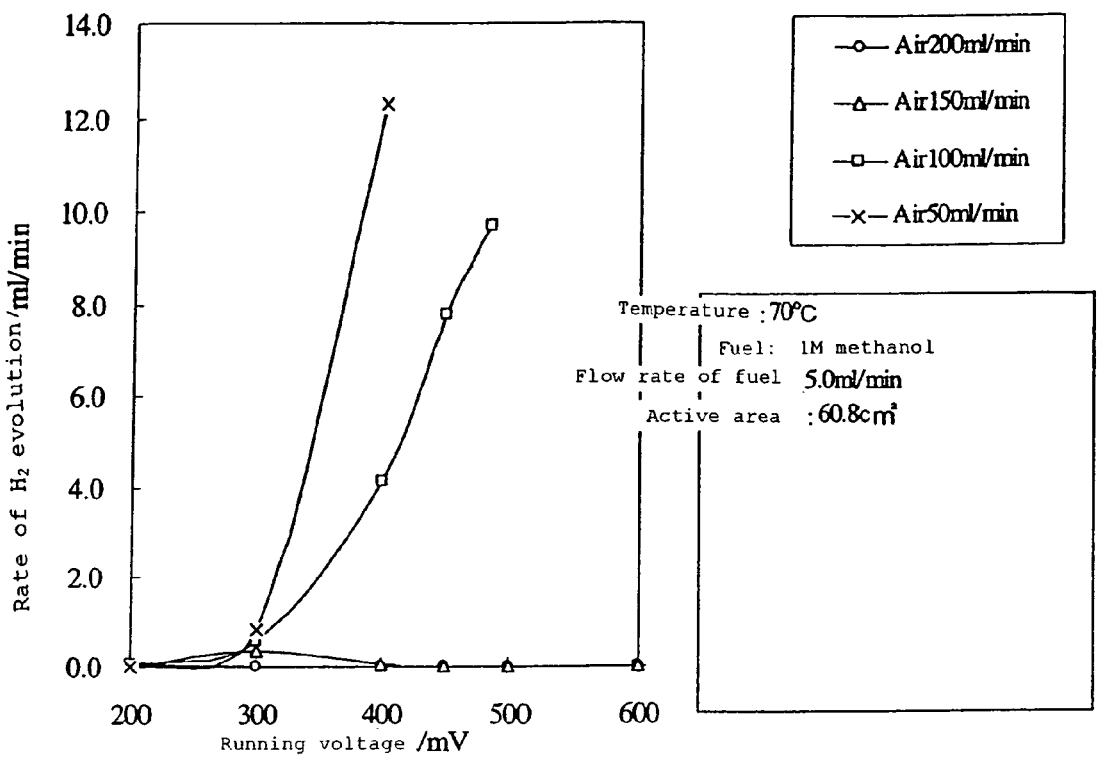
FIG. 27 shows a graph for indicating relation of the rate of hydrogen evolution (discharging: temperature at 70° C.) with the running voltage when the flow rate of air is varied (hydrogen generation example 2-3).

FIG. 27 shows a graph for indicating relationship between the rate of hydrogen evolution and the running voltage, both adapted from the results of FIG. 26.

From this it was found that the rate of hydrogen evolution depends on the running voltage, and hydrogen evolves when the running voltage is in the range of 200 to 500 mV. Hydrogen is ready to evolve when the flow rate of air is in the range of 50 to 100 ml/min. When the flow rate of air is excessively large as 150 to 200 ml/min, scarcely any evolution of hydrogen is detected.

HYDROGEN GENERATING EXAMPLE 2-4

The same hydrogen generating cell as that of hydrogen generation example 2-1 was used. The cell was operated while the temperature being kept at 90° C. with the flow of air to the air electrode kept at 50-250 ml/min and the flow of 1M aqueous solution of methanol (fuel) to the fuel electrode kept at 5 ml/min. Then, while the current flowing between the air electrode and the fuel electrode being varied, the running voltage between the fuel electrode and the air electrode, and the rate of hydrogen evolution occurring from the fuel electrode were monitored and analyzed.

Figure 28:
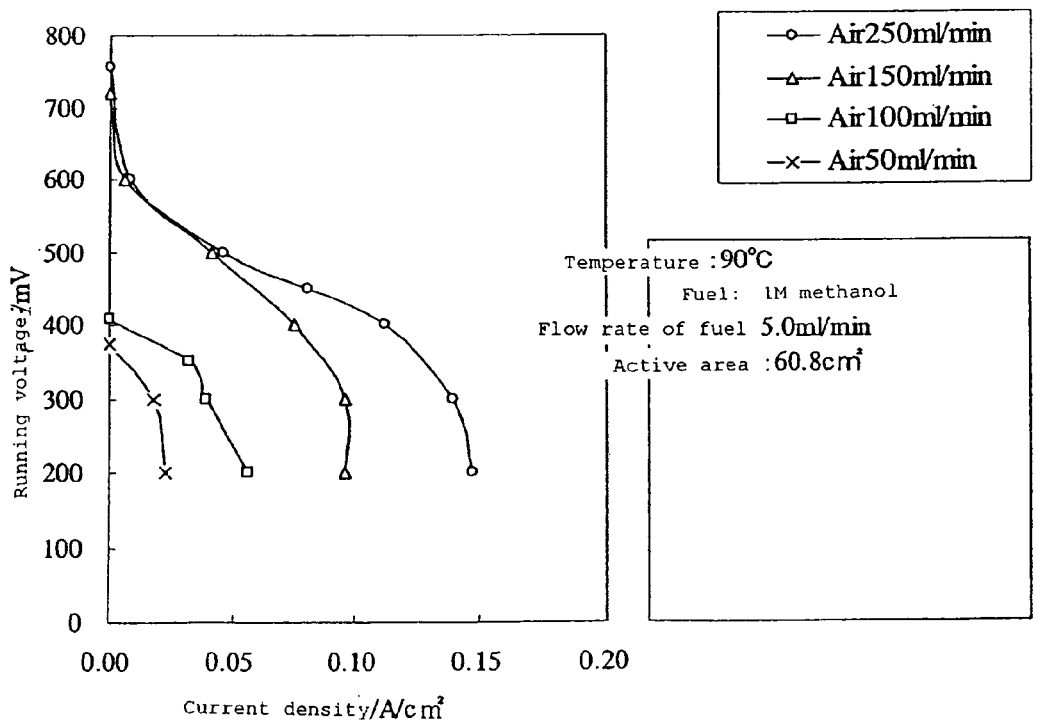
FIG. 28 shows a graph for indicating relation of the running voltage (discharging: temperature at 90° C.) with the current density withdrawn when the flow rate of air is varied (hydrogen generation example 2-4).

Relation of the running voltage with the current density withdrawn revealed in the test is shown in FIG. 28.

It was found that as the flow rate of air is reduced, the dischargeable limit current density becomes smaller with the reduction of the running voltage.

Figure 29:
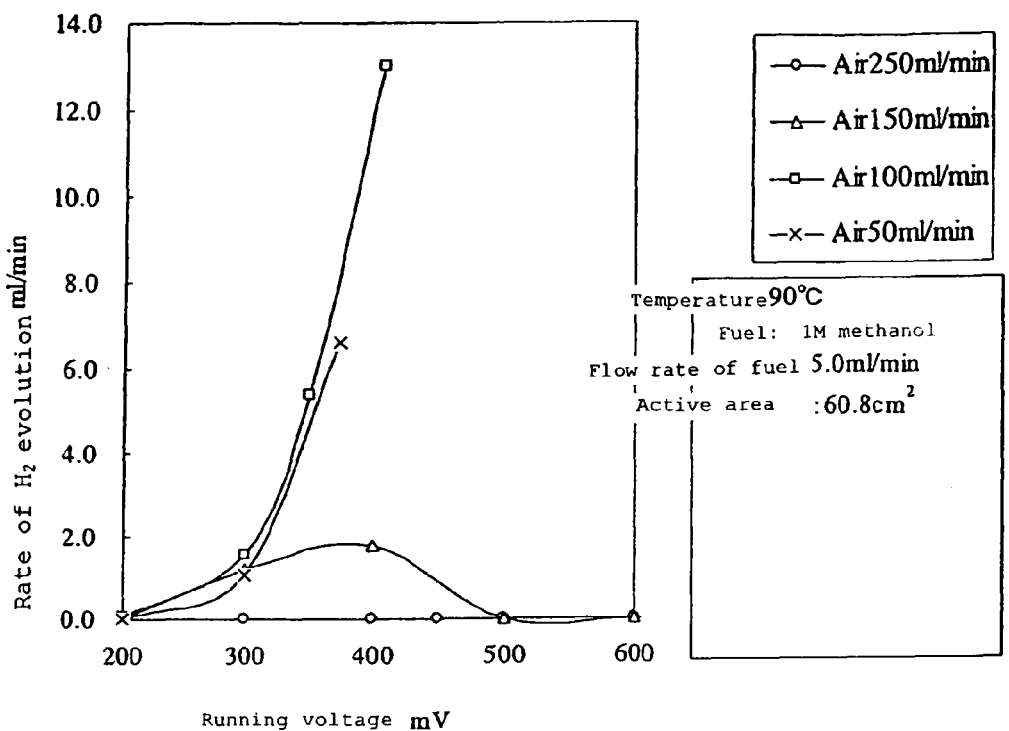
FIG. 29 shows a graph for indicating relation of the rate of hydrogen evolution (discharging: temperature at 90° C.) with the running voltage when the flow rate of air is varied (hydrogen generation example 2-4).

FIG. 29 shows a graph for indicating relationship between the rate of hydrogen evolution and the running voltage, both adapted from the results of FIG. 28.

From this it was found that the rate of hydrogen evolution tends to depend on the running voltage, and hydrogen evolves when the running voltage is in the range of 200 to 500 mV. Hydrogen is ready to evolve when the flow rate of air is in the range of 50 to 100 ml/min. When the flow rate of air is at 250 ml/min, scarcely any evolution of hydrogen is detected.

Figure 30:
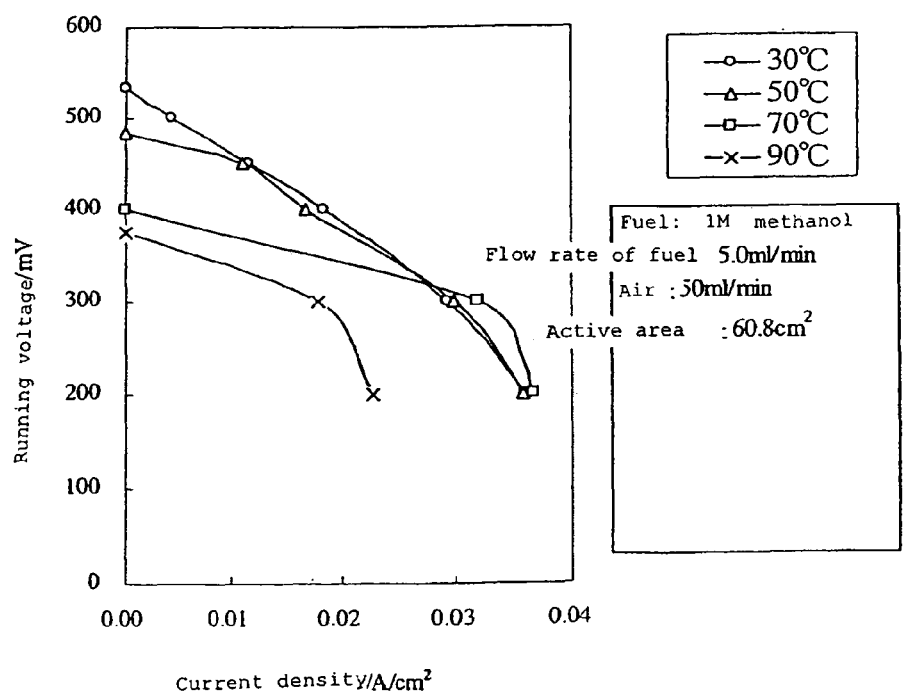
FIG. 30 shows a graph for indicating relation of the running voltage (discharging: flow rate of air at 50 ml/min) with the current density withdrawn when the temperature is varied.
Figure 31:
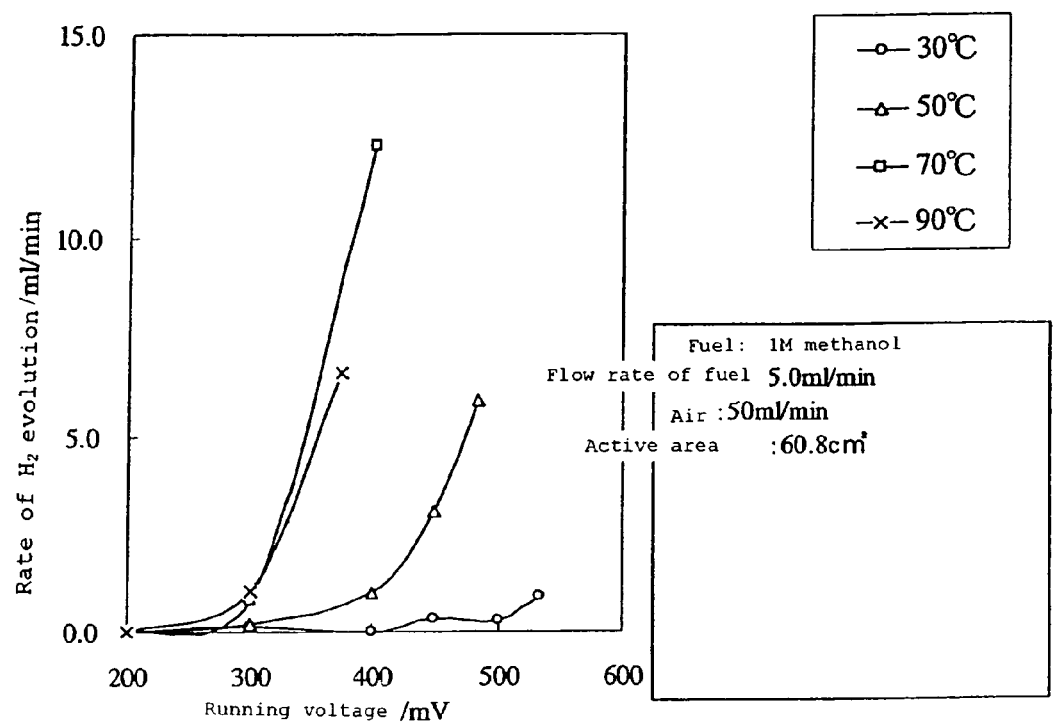
FIG. 31 shows a graph for indicating relation of the rate of hydrogen evolution (discharging: flow rate of air at 50 ml/min) with the running voltage when the temperature is varied.

Next, when the cell is operated with the flow of air being kept at 50 ml/min while respective temperatures are varied as in hydrogen generation examples 2-1 to 2-4, FIG. 30 shows relation of the current density withdrawn with the running voltage while FIG. 31 shows relation of the rate of hydrogen evolution with the running voltage.

From this it was found that the rate of hydrogen evolution tends to depend on the running voltage, and as the temperature becomes higher, hydrogen evolves at a lower running voltage and the evolution volume becomes larger.

Figure 32:
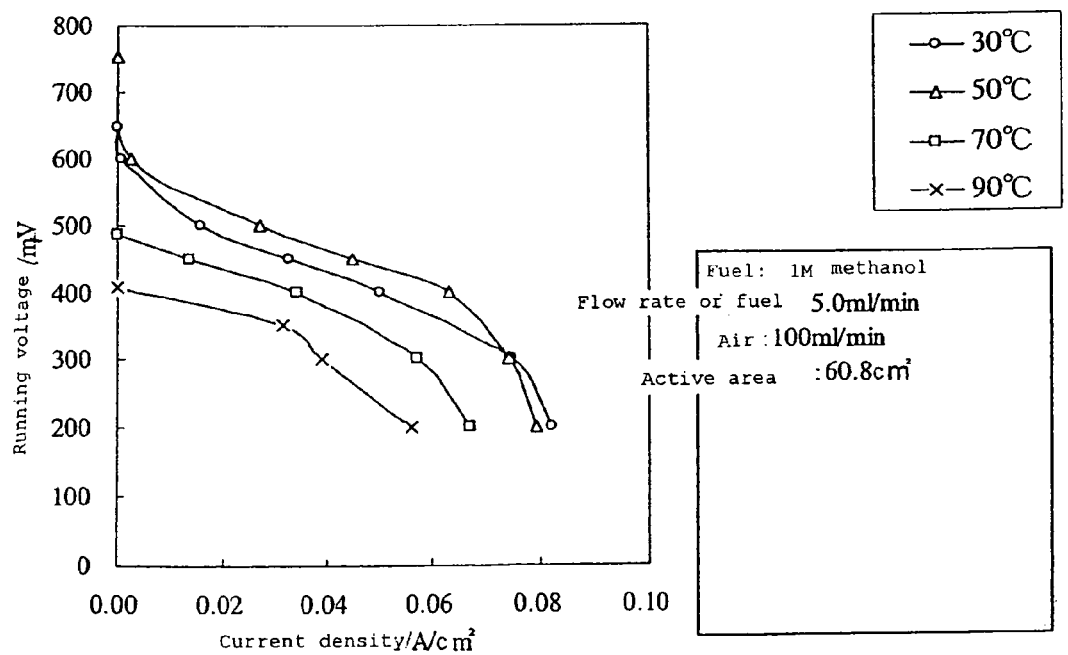
FIG. 32 shows a graph for indicating relation of the running voltage (discharging: flow rate of air at 100 ml/min) with the current density withdrawn when the temperature is varied.
Figure 33:
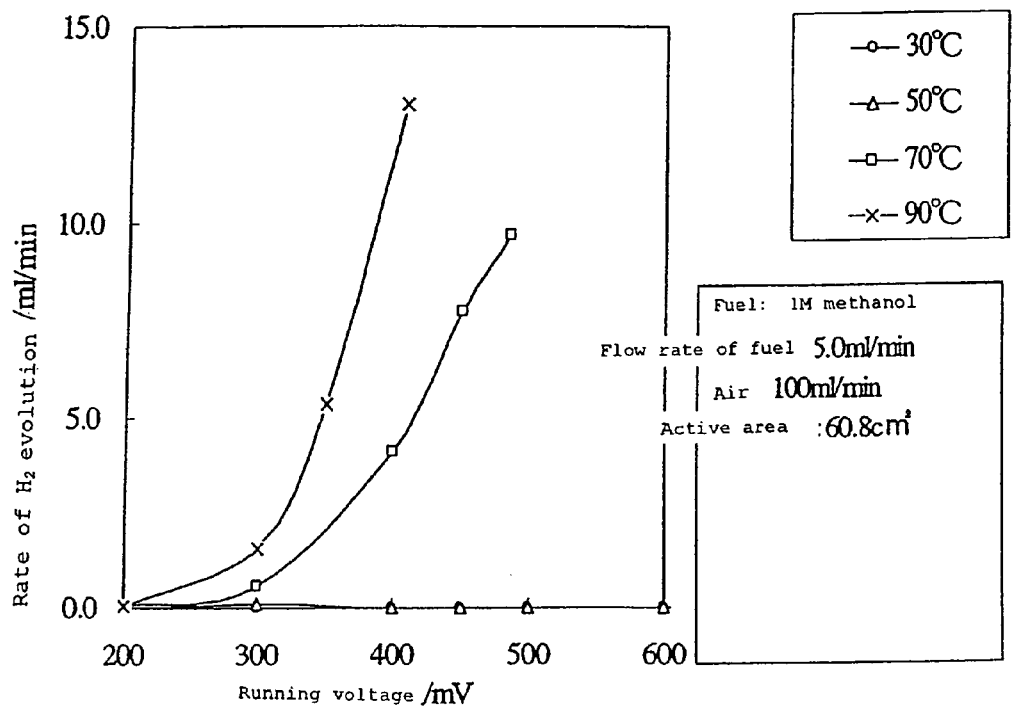
FIG. 33 shows a graph for indicating relation of the rate of hydrogen evolution (discharging: flow rate of air at 100 ml/min) with the running voltage when the temperature is varied.

Further, when the cell is operated with the flow of air being kept at 100 ml/min while respective temperatures are varied as in hydrogen generation examples 2-1 to 2-4, FIG. 32 shows relation of the current density withdrawn with the running voltage while FIG. 33 shows relation of the rate of hydrogen evolution with the running voltage.

From this it was found that the rate of hydrogen evolution tends to depend on the running voltage, and as the temperature becomes higher, hydrogen evolves at a lower running voltage and the evolution volume becomes larger. It was also found that when the flow rate of air is excessively large as 100 ml/min, scarcely any evolution of hydrogen is detected when the temperature is kept as low as 30 or 50° C.

HYDROGEN GENERATING EXAMPLE 2-5

The same hydrogen generating cell as that of hydrogen generation example 2-1 was used. The cell was operated while the temperature being kept at 50° C. with the flow of air to the air electrode kept at 50 ml/min and the flow of fuel to the fuel electrode varied to 1.5, 2.5, 5.0, 7.5, or 10.0 ml/min. Then, while the current flowing between the air electrode and the fuel electrode being varied, the running voltage between the fuel electrode and the air electrode, and the rate of hydrogen evolution occurring from the fuel electrode were monitored and analyzed.

Figure 34:
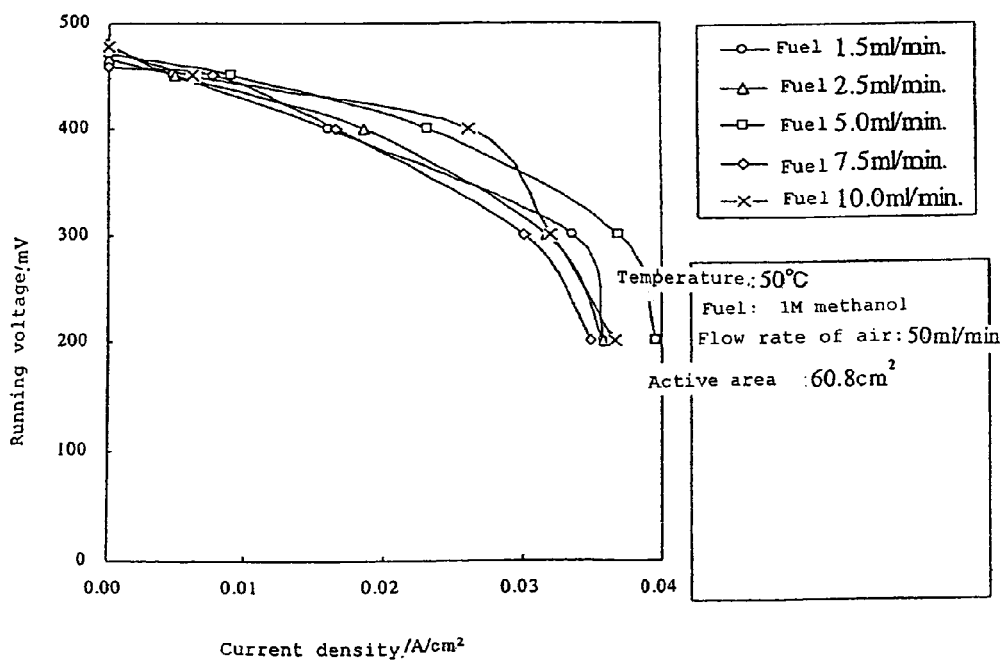
FIG. 34 shows a graph for indicating relation of the running voltage (discharging: temperature at 50° C.) with the current density withdrawn when the flow rate of fuel is varied (hydrogen generating example 2-5).

Relation of the running voltage with the current density withdrawn revealed in the test is shown in FIG. 34.

It was found that the dischargeable limit current density hardly changes even when the flow of fuel is varied.

Figure 35:
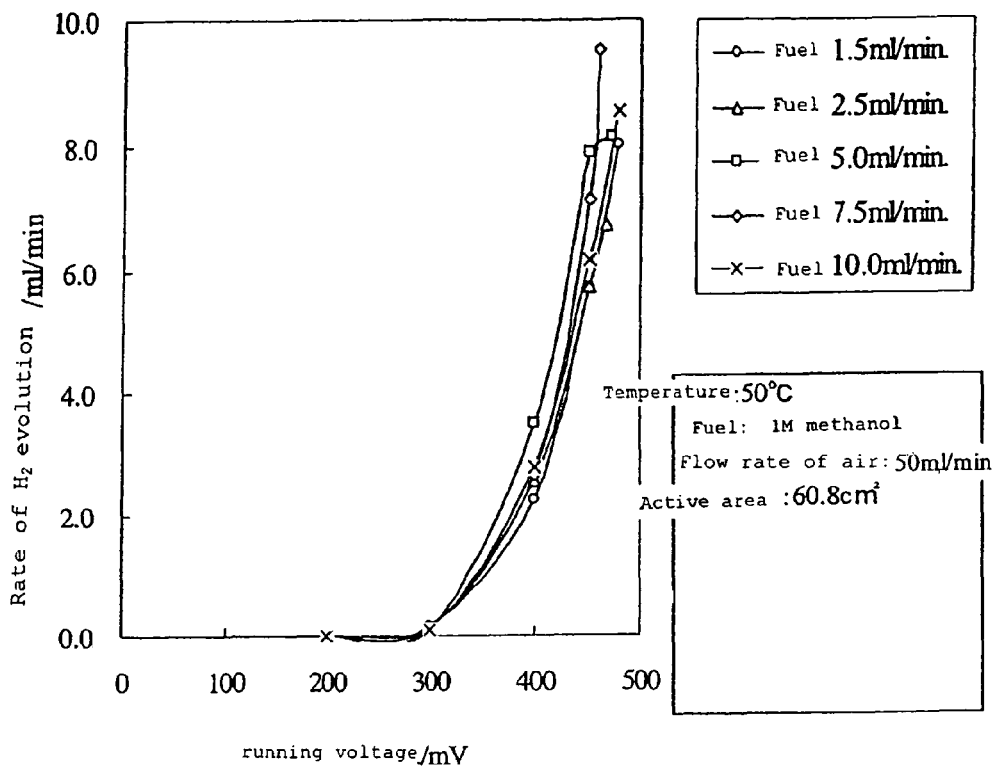
FIG. 35 shows a graph for indicating relation of the rate of hydrogen evolution (discharging: temperature at 50° C.) with the running voltage when the flow rate of fuel is varied (hydrogen generating example 2-5).

FIG. 35 shows a graph for indicating relationship between the rate of hydrogen evolution and the running voltage, both adapted from the results of FIG. 34.

From this it was found that the rate of hydrogen evolution depends on the running voltage, and hydrogen evolves when the running voltage is in the range of 300 to 500 mV. The rate of hydrogen evolution is high when the running voltage is in the range of 450 to 500 ml/min.

It was found that the rate of hydrogen evolution is hardly affected by the flow rate of fuel.

HYDROGEN GENERATING EXAMPLE 2-6

The same hydrogen generating cell as that of hydrogen generation example 2-1 was used. The cell was operated while the temperature being kept at 50° C. with the flow of air to the air electrode kept at 50 ml/min and the constant flow of fuel to the fuel electrode kept at 5 ml/min while fuel concentration being varied to 0.5, 1, 2, or 3M. Then, while the current flowing between the air electrode and the fuel electrode being varied, the running voltage between the fuel electrode and the air electrode, and the rate of hydrogen evolution occurring from the fuel electrode were monitored and analyzed.

Figure 36:
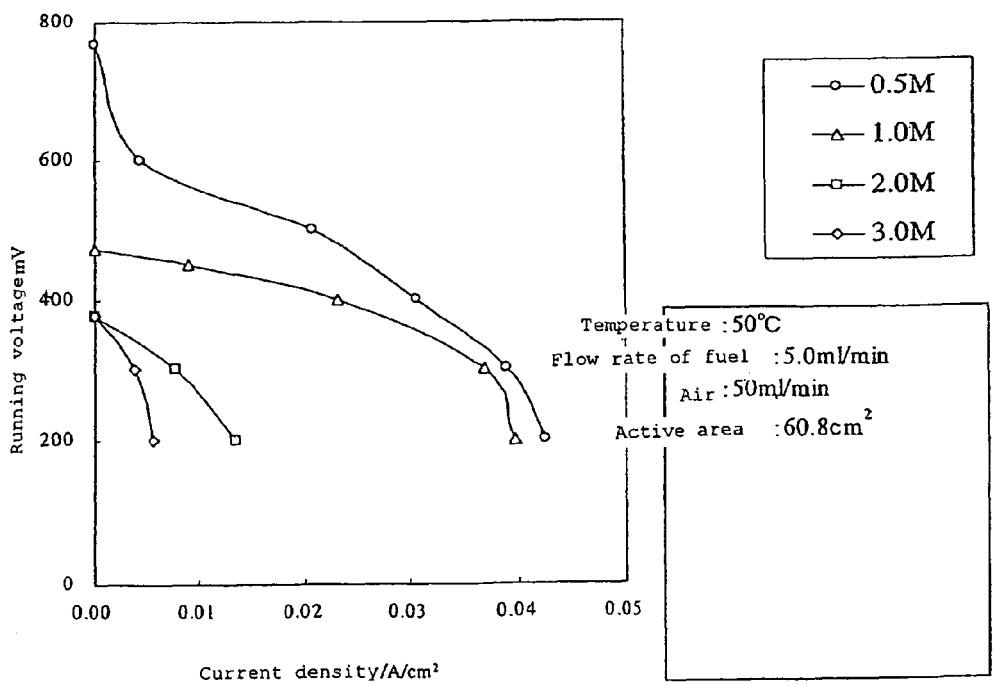
FIG. 36 shows a graph for indicating relation of the running voltage (discharging: temperature at 50° C.) with the current density withdrawn when the concentration of fuel is varied (hydrogen generating example 2-6).

Relation of the running voltage with the current density withdrawn revealed in the test is shown in FIG. 36.

It was found that the dischargeable limit current density declines as the concentration of fuel becomes higher with the reduction of running voltage.

Figure 37:
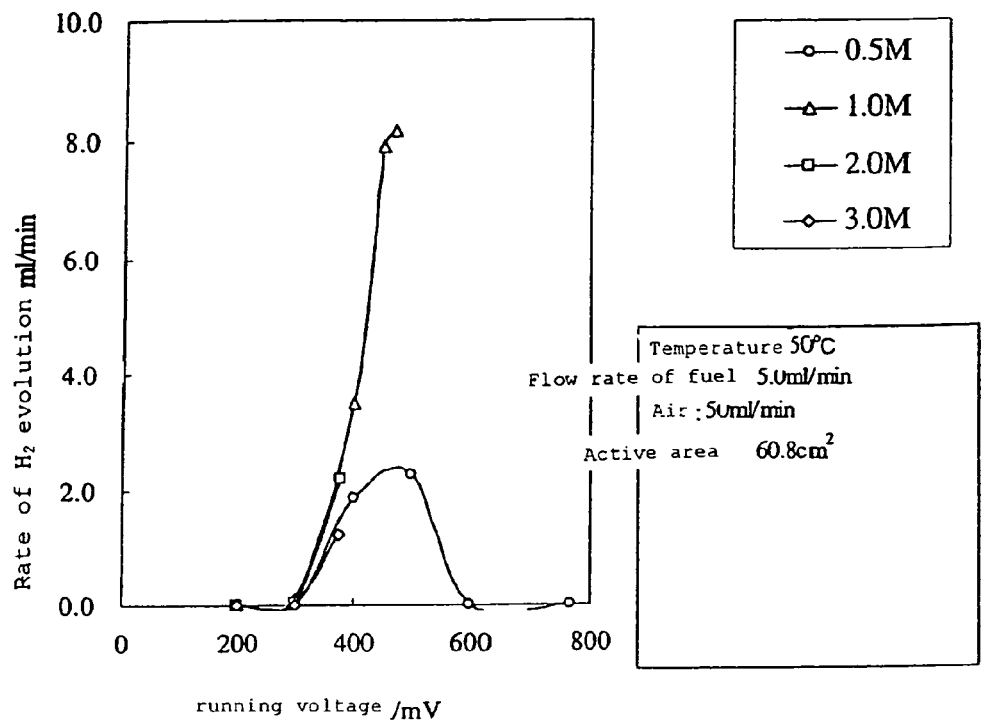
FIG. 37 shows a graph for indicating relation of the rate of hydrogen evolution (discharging: temperature at 50° C.) with the running voltage when the concentration of fuel is varied (hydrogen generating example 2-6).

FIG. 37 shows a graph for indicating relationship between the rate of hydrogen evolution and the running voltage, both adapted from the results of FIG. 36.

From this it was found that the rate of hydrogen evolution depends on the running voltage, and hydrogen evolves when the running voltage is in the range of 300 to 600 mV.

Hydrogen evolves most vigorously when the concentration of fuel is 1M.

HYDROGEN GENERATING EXAMPLE 2-7

The same hydrogen generating cell as that of hydrogen generation example 2-1 was used (except that the air electrode consisted of an oxidizing electrode to which oxygen was flowed). The cell was operated while the temperature being kept at 50° C. with the flow of oxidizing gas to the oxidizing electrode kept at 14.0 ml/min and the constant flow of 1M fuel concentration to the fuel electrode kept at 5 ml/min, while the concentration of oxygen being varied to 10, 21, 40, or 100%. Then, while the current flowing between the oxidizing electrode and the fuel electrode being varied, the running voltage between the fuel electrode and the oxidizing electrode, and the rate of hydrogen evolution occurring from the fuel electrode were monitored and analyzed. The oxidizing gas containing 21% oxygen was represented by air, and the oxidizing gas containing 10% oxygen was obtained by mixing air with nitrogen. The oxidizing gas containing 40% oxygen was obtained by adding oxygen (100% oxygen concentration) to air.

Figure 38:
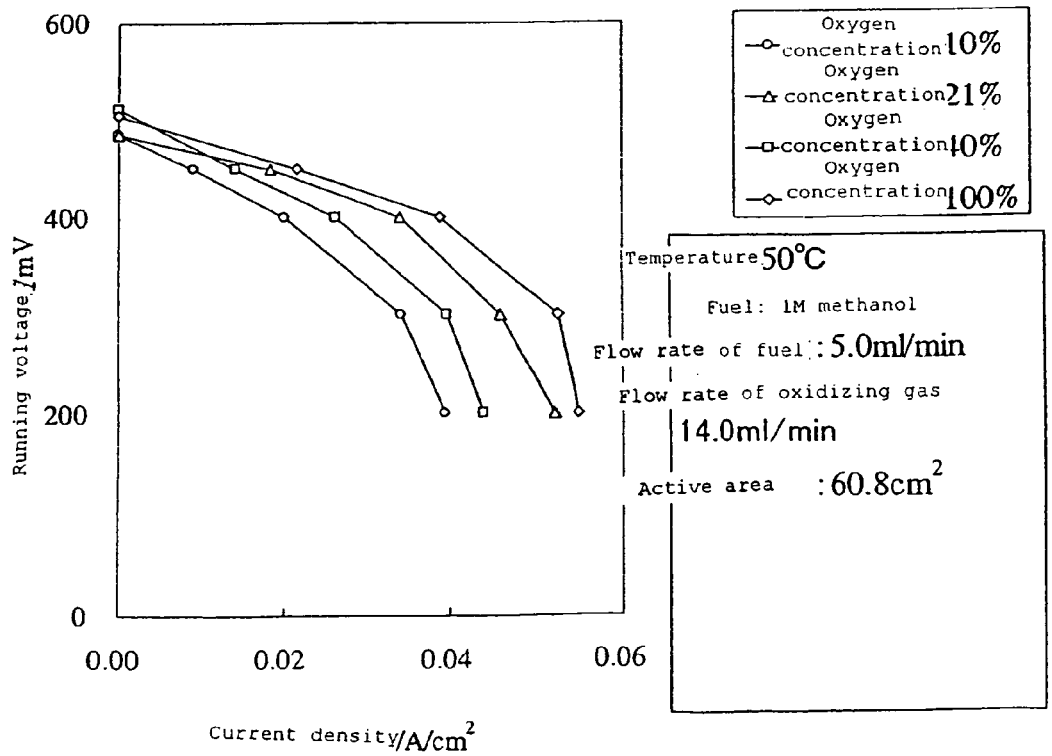
FIG. 38 shows a graph for indicating relation of the running voltage (discharging: temperature at 50° C.) with the current density withdrawn when the concentration of oxygen is varied (hydrogen generating example 2-7).

Relation of the running voltage with the current density withdrawn revealed in the test is shown in FIG. 38.

It was found that the running voltage declines as the concentration of oxygen becomes smaller with the reduction of dischargeable limit current density.

Figure 39:
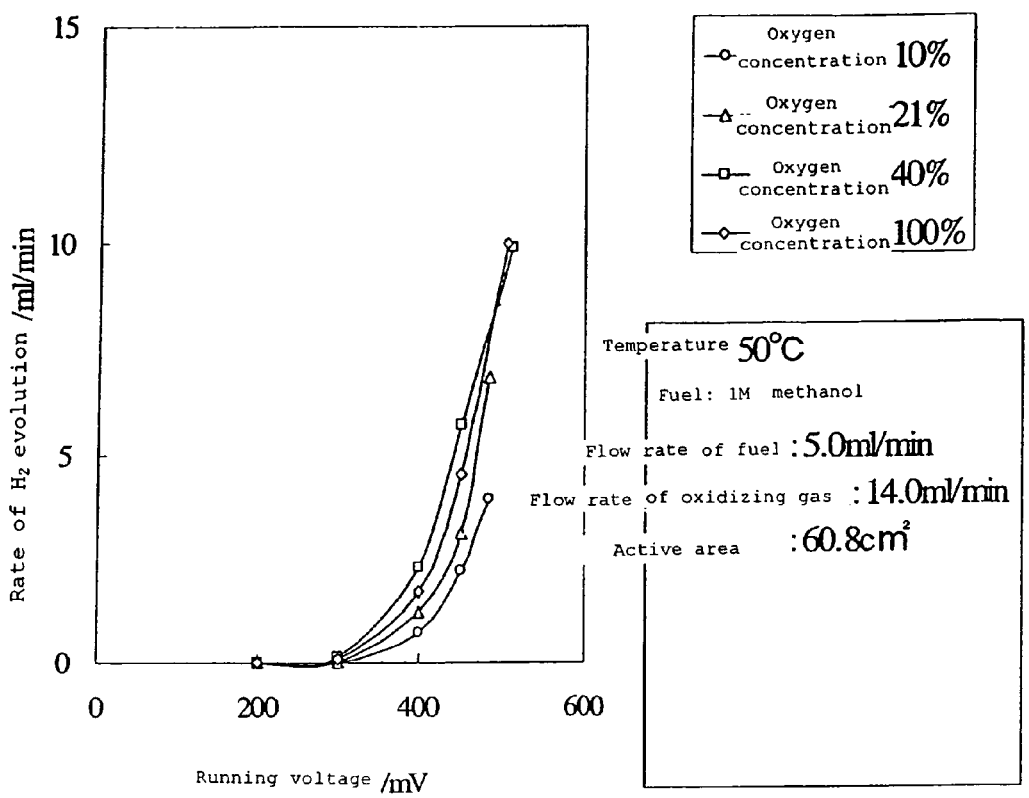
FIG. 39 shows a graph for indicating relation of the rate of hydrogen evolution (discharging: temperature at 50° C.) with the running voltage when the concentration of oxygen is varied (hydrogen generating example 2-7).

FIG. 39 shows a graph for indicating relationship between the rate of hydrogen evolution and the running voltage, both adapted from the results of FIG. 38.

From this it was found that the rate of hydrogen evolution depends on the running voltage, and hydrogen evolves when the running voltage is in the range of 300 to 600 mV.

The rate of hydrogen evolution tends to be high as the concentration of oxygen becomes higher.

HYDROGEN GENERATING EXAMPLE 2-8

The same hydrogen generating cell as that of hydrogen generation example 2-1 was used (except that the air electrode consisted of an oxidizing electrode to which liquid hydrogen peroxide was flowed). The hydrogen generating cell was placed in an electric furnace where hot air was circulated. The cell was operated while the temperature being varied to 30, 50, 70, or 90° C. with the flow of 1M aqueous solution of $H_2O_2$ (hydrogen peroxide) to the oxidizing electrode varied from 2.6 to 5.5 ml/min, and the flow of 1M aqueous solution of methanol (fuel) to the fuel electrode kept at 5 ml/min. Then, while the current flowing between the oxidizing electrode and the fuel electrode being varied, the running voltage between the fuel electrode and the oxidizing electrode, and the rate of hydrogen evolution occurring from the fuel electrode were monitored and analyzed. The flow rate of hydrogen peroxide was adjusted such that the open-circuit voltage was approximately equal to 500 mV for all the temperatures tested.

Figure 40:
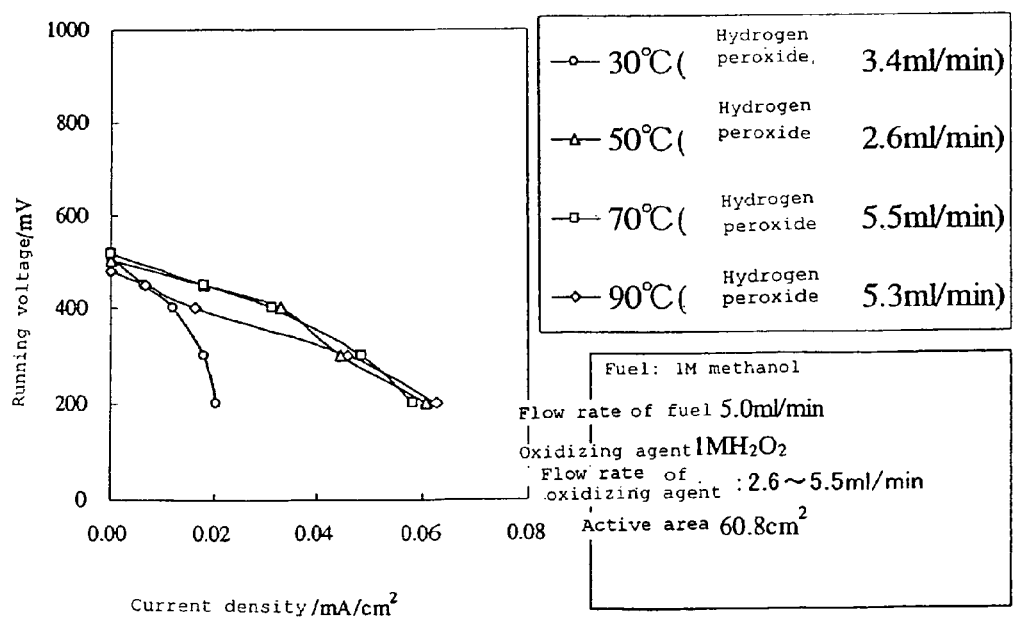
FIG. 40 shows a graph for indicating relation of the running voltage (discharging: oxidizing agent of $H_2O_2$) with the current density withdrawn when the temperature is varied (hydrogen generating example 2-8).

Relation of the running voltage with the current density withdrawn revealed in the test is shown in FIG. 40.

It was found that the decline of running voltage with the increase of current density takes a similar course when the temperature is kept at 70 to 90° C., while running voltage undergoes a sharp fall when the temperature is decreased to 30° C. with the reduction of dischargeable limit current density.

Figure 41:
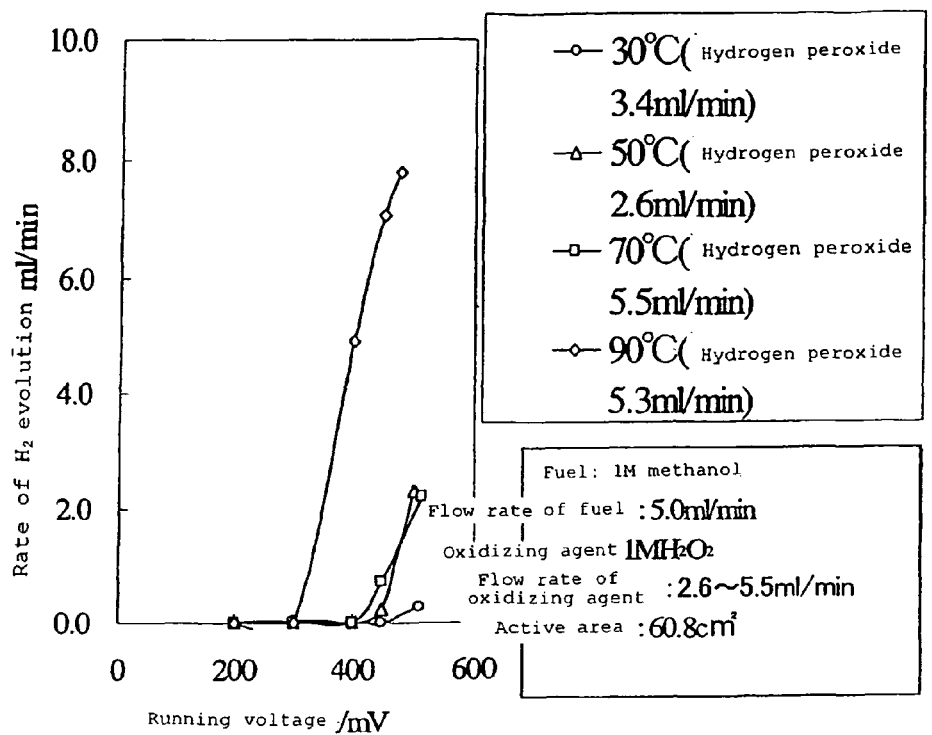
FIG. 41 shows a graph for indicating relation of the rate of hydrogen evolution (discharging: oxidizing agent of $H_2O_2$) with the running voltage when the temperature is varied (hydrogen generating example 2-8).

FIG. 41 shows a graph for indicating relationship between the rate of hydrogen evolution and the running voltage, both adapted from the results of FIG. 40.

From this it was found that the rate of hydrogen evolution tends to depend on the running voltage, and hydrogen evolves when the running voltage is in the range of 300 to 500 mV. Hydrogen is most ready to evolve when the temperature is 90° C. Hydrogen does not evolve unless the running voltage is raised sufficiently high, when the temperature is at the low level tested.

What is important here is that current was withdrawn outside from the hydrogen generating cells of Example 2. In other words, the hydrogen generating cell of Example 2 converted part of fuel into hydrogen while withdrawing electric energy to outside. In addition, conversion of fuel into hydrogen occurred at a surprisingly low temperature of 30 to 90° C. In view of these facts, the hydrogen generating method of the invention and hydrogen generating system based on the method are likely to be novel ones that have never been observed before.

EXAMPLE 3

Illustrative examples of the hydrogen generating method of the fifth aspect of the invention and hydrogen generating system (charging condition) of the sixth aspect of the invention based on the method will be presented below.

HYDROGEN GENERATING EXAMPLE 3-1

Figure 42:
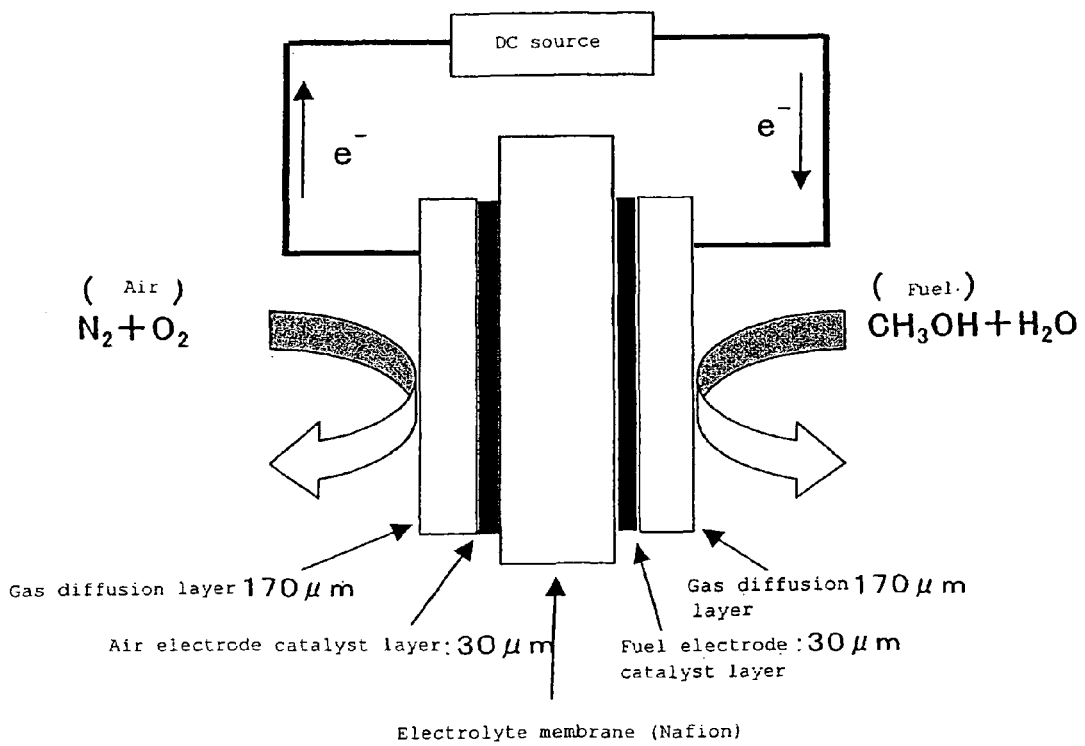
FIG. 42 is a schematic diagram of a hydrogen generating cell (with means for applying external electric energy) described in Example 3.

The structure of hydrogen generating cells described in Example 3 (hydrogen generation examples 3-1 to 3-8) with means for applying electric energy from outside is outlined in FIG. 42.

The hydrogen generating cells are the same in structure as those of hydrogen generation example 1-1 except that the cell comprises a fuel electrode as cathode and an oxidizing electrode as anode with means for applying electric energy from outside.

The hydrogen generating cell was placed in an electric furnace where hot air was circulated. The cell was operated while the temperature (running temperature) being kept at 50° C. with the flow of air to the air electrode kept at 10 to 80 ml/min and the flow of 1M aqueous solution of methanol (fuel) to the fuel electrode kept at 5 ml/min. Then, while the current flowing between the air electrode and the fuel electrode being varied by means of a DC power source from outside, the running voltage between the fuel electrode and the air electrode, the volume of gas evolved from the fuel electrode and gas composition were monitored and analyzed. The energy efficiency of charging condition was defined as a ratio of the chemical energy of hydrogen evolved to the electric energy supplied from outside. The concentration of hydrogen in the generated gas was determined by gas chromatography, and rate of hydrogen evolution also determined.

The energy efficiency of a charging condition was calculated based on the following equation:

Energy efficiency (%)=(combustion heat of $H_2$/electric energy applied)×100

Combustion heat (kJ) of $H_2$ per minute=(rate of $H_2$ evolution ml/min/24.47/1000)×286 kJ/mol [HHV]

Electric energy (kJ) per minute=(voltage mV/1000× current A×60 sec)Wsec/1000

To avoid undue misunderstanding, a few comments are added here. The object of this invention lies in obtaining hydrogen gas having a higher energy content than the electric energy supplied from outside, and the invention does not aim to gain more energy than the sum of paid energy without taking any heed to the law of conservation of energy taught by thermodynamics. When the energy balance of the entire system is taken into view, since part of organic compound-based fuel is oxidized, the energy expenditure includes, in addition to the electric energy supplied from outside, the chemical energy consumed for the oxidization of the fuel, which will amount to a value equal to or less than 100%. To distinguish more clearly the inventive method from conventional methods for obtaining hydrogen via the electrolysis of water, the energy efficiency of a system defined by the ratio of the chemical energy of evolved hydrogen to the electric energy supplied from outside will be used here.

Figure 43:
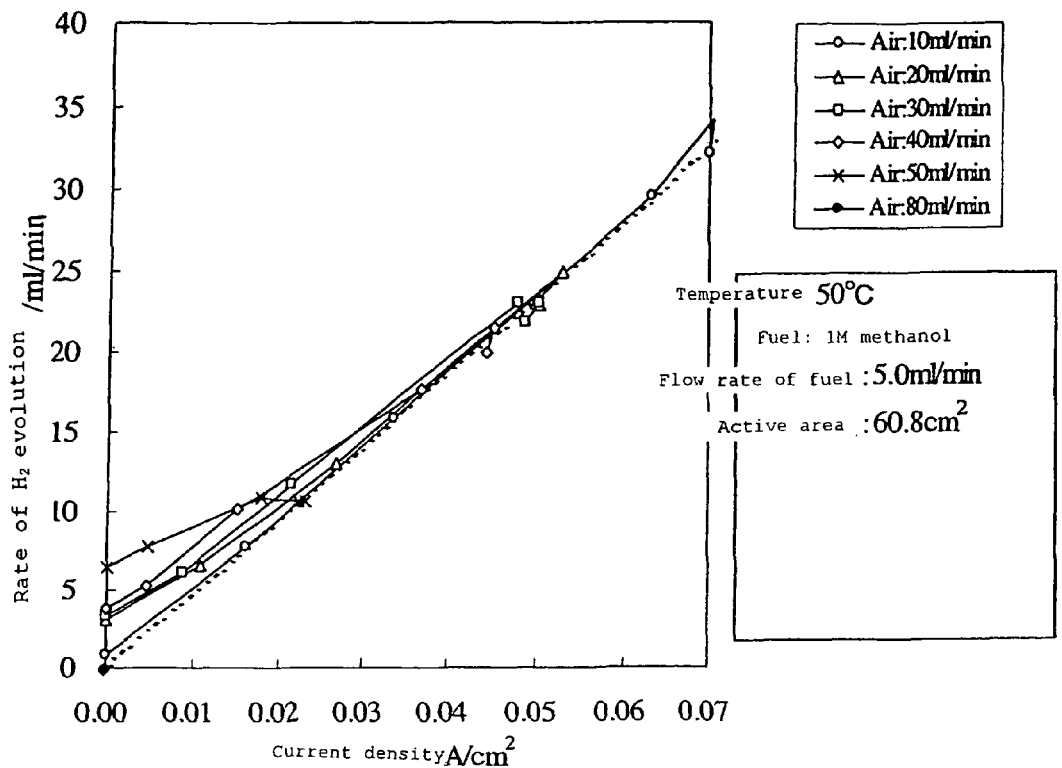
FIG. 43 shows a graph for indicating relation of the rate of hydrogen evolution (charging: temperature at 50° C.) with the current density applied when the flow rate of air is varied (hydrogen generating example 3-1).

Relation of the rate of hydrogen evolution with the current density applied in the test is shown in FIG. 43.

It was found that the efficiency of hydrogen evolution (efficiency of hydrogen evolution relative to electric energy supplied) becomes equal to or more than 100% (100% efficiency of hydrogen evolution is represented by the dashed line in FIG. 43) in certain areas when the current density is kept not more than 40 mA/cm². This suggests that it is possible to obtain hydrogen whose energy content is larger than the electric energy supplied from outside by operating the cell in those areas.

Figure 44:
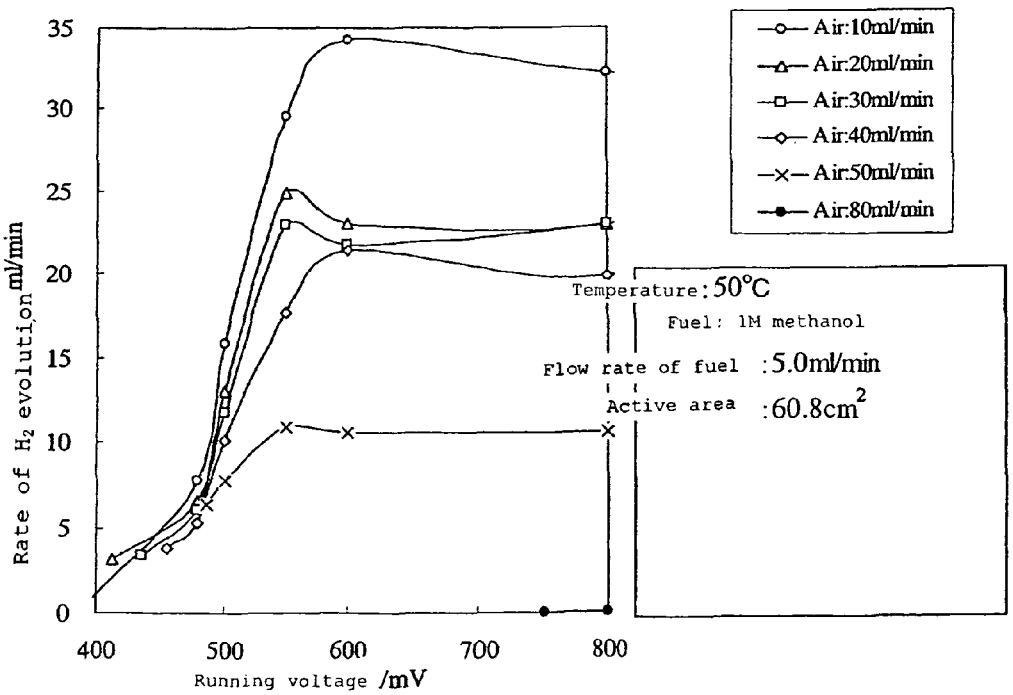
FIG. 44 shows a graph for indicating relation of the rate of hydrogen evolution (charging: temperature at 50° C.) with the running voltage when the flow rate of air is varied (hydrogen generating example 3-1).

FIG. 44 shows a graph for indicating relationship between the rate of hydrogen evolution and the running voltage, both adapted from the results of FIG. 43.

From this it was found that the rate of hydrogen evolution (volume of hydrogen evolution) tends to depend on the running voltage, and hydrogen evolves when the running voltage is equal to or larger than 400 mV, and the rate of hydrogen evolution becomes virtually constant when the running voltage becomes equal to or larger than 600 mV, and the rate of hydrogen evolution becomes larger (hydrogen is readier to evolve) with reduction of the flow rate of air.

Figure 45:
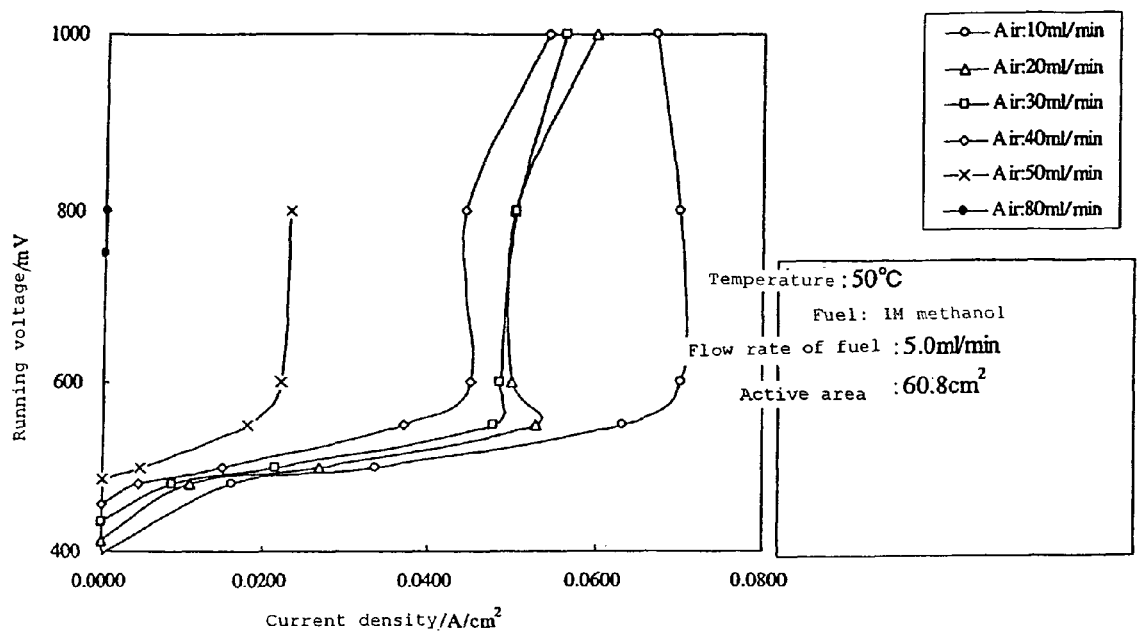
FIG. 45 shows a graph for indicating relation of the running voltage (charging: temperature at 50° C.) with the current density applied when the flow rate of air is varied (hydrogen generating example 3-1).

Relation of the running voltage with the current density applied is shown in FIG. 45.

The areas in FIG. 43 where the efficiency of hydrogen evolution is 100% or more fall below the line defined by the running voltage being equal to or lower than 600 mV in FIG. 45.

Figure 46:
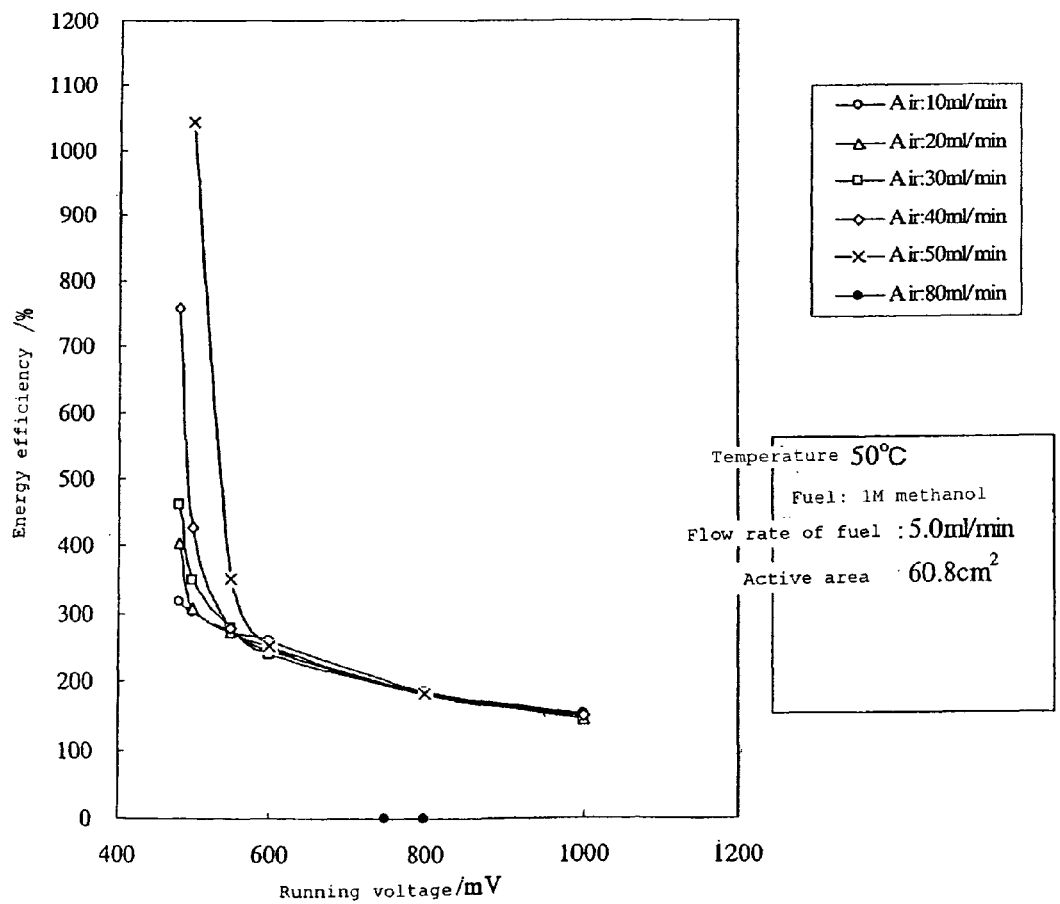
FIG. 46 shows a graph for indicating relation of the energy efficiency (charging: temperature at 50° C.) with the running voltage when the flow rate of air is varied (hydrogen generating example 3-1).

Relation of the energy efficiency with the running voltage is shown in FIG. 46.

From this it was found that the energy efficiency is equal to or larger than 100% even when the running voltage is around 1000 mV, and the energy efficiency is particularly high when the running voltage is kept equal to or smaller than 600 mV, and the flow of air is kept at 30 to 50 ml/min.

Next, the cell was operated under a condition of high energy efficiency (1050%): temperature at 50° C.; rate of fuel flow at 5 ml/min; rate of air flow at 50 ml/min; and current density at 4.8 mA/cm$^2$ to cause gas to evolve. The concentration of hydrogen in the gas was determined by gas chromatography. As a result it was found that the gas contained hydrogen at about 86%, and hydrogen evolved at a rate of 7.8 ml/min. No CO was detected.

HYDROGEN GENERATING EXAMPLE 3-2

The same hydrogen generating cell as that of hydrogen generation example 3-1 was used. The cell was operated while the temperature being kept at 30° C. with the flow of air to the air electrode varied from 10 to 70 ml/min and the flow of 1M aqueous solution of methanol (fuel) to the fuel electrode kept at 5 ml/min. Then, while the current flowing between the air electrode and the fuel electrode being varied by means of a DC power source from outside, the running voltage between the fuel electrode and the air electrode, the rate of hydrogen evolution occurring from the fuel electrode, and the energy efficiency were monitored and analyzed.

Figure 47:
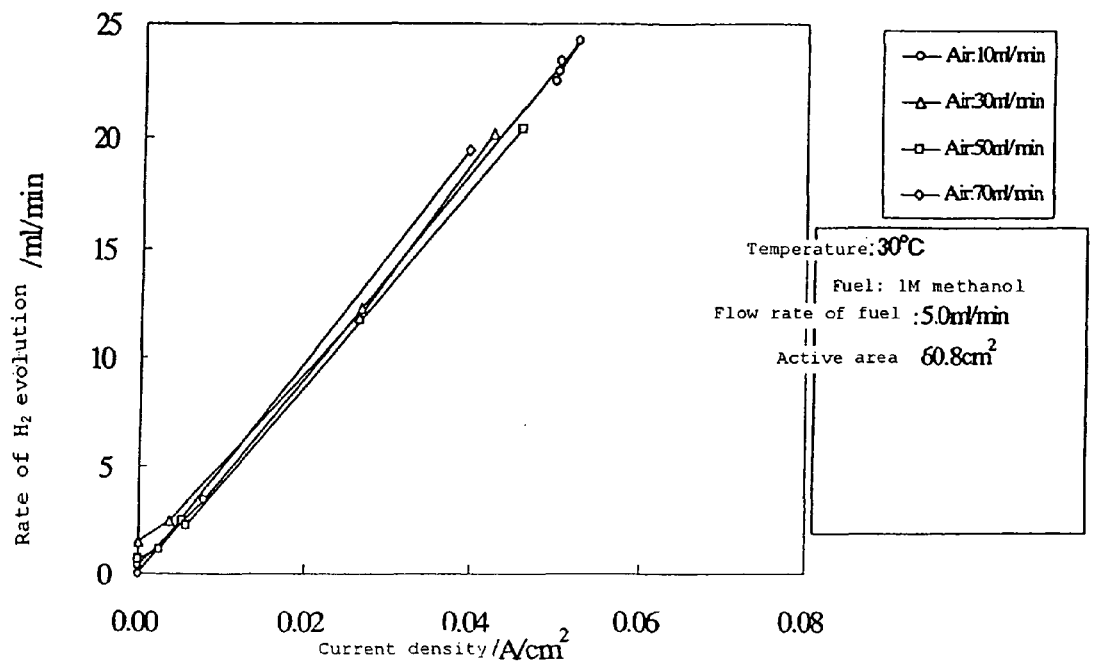
FIG. 47 shows a graph for indicating relation of the rate of hydrogen evolution (charging: temperature at 30° C.) with the current density applied when the flow rate of air is varied (hydrogen generating example 3-2).
Figure 48:
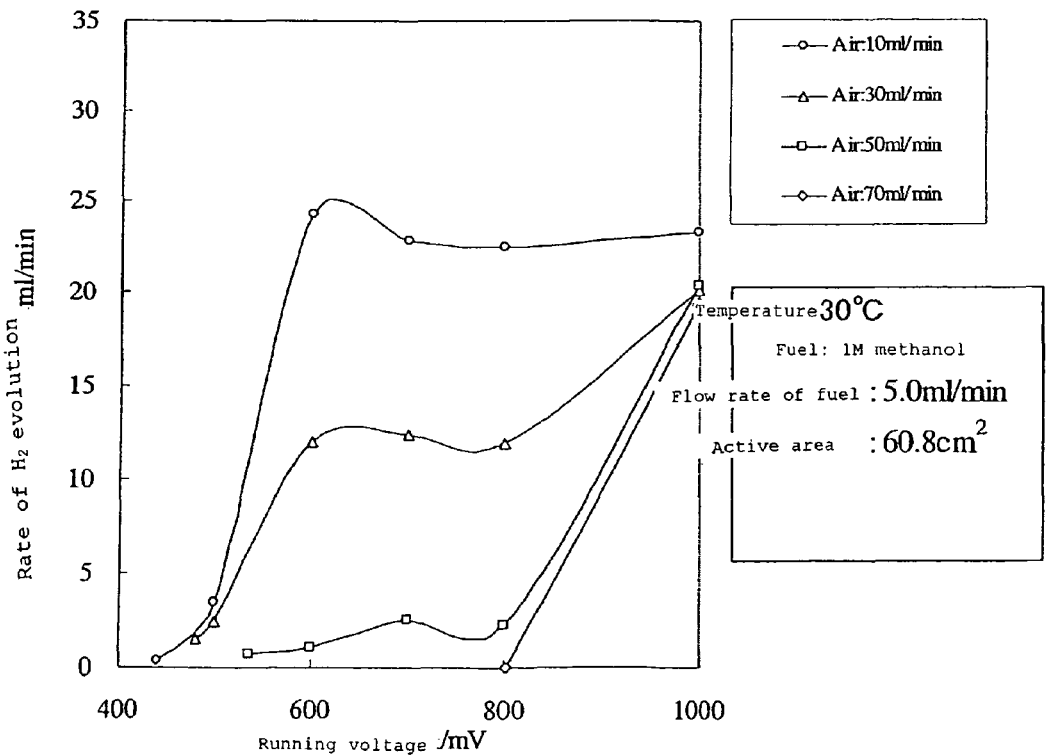
FIG. 48 shows a graph for indicating relation of the rate of hydrogen evolution (charging: temperature at 30° C.) with the running voltage when the flow rate of air is varied (hydrogen generating example 3-2).

In this test, relation of the rate of hydrogen evolution with the current density applied is shown in FIG. 47, and relation of the rate of hydrogen evolution with the running voltage is shown in FIG. 48.

From this it was found that the rate of hydrogen evolution tends to depend on the running voltage, and hydrogen evolves when the running voltage is equal to or larger than 400 mV; hydrogen is readier to evolve with reduction of the flow rate of air; and the rate of hydrogen evolution becomes virtually constant with the air flow of 10 ml/min, when the running voltage becomes equal to or larger than 600 mV, while the rate of hydrogen evolution tends to grow with the air flow of 30 ml/min, when the running voltage becomes equal to or larger than 800 mV, and thus no hydrogen will evolve when air flows at a higher rate unless the running voltage is raised sufficiently high.

Figure 49:
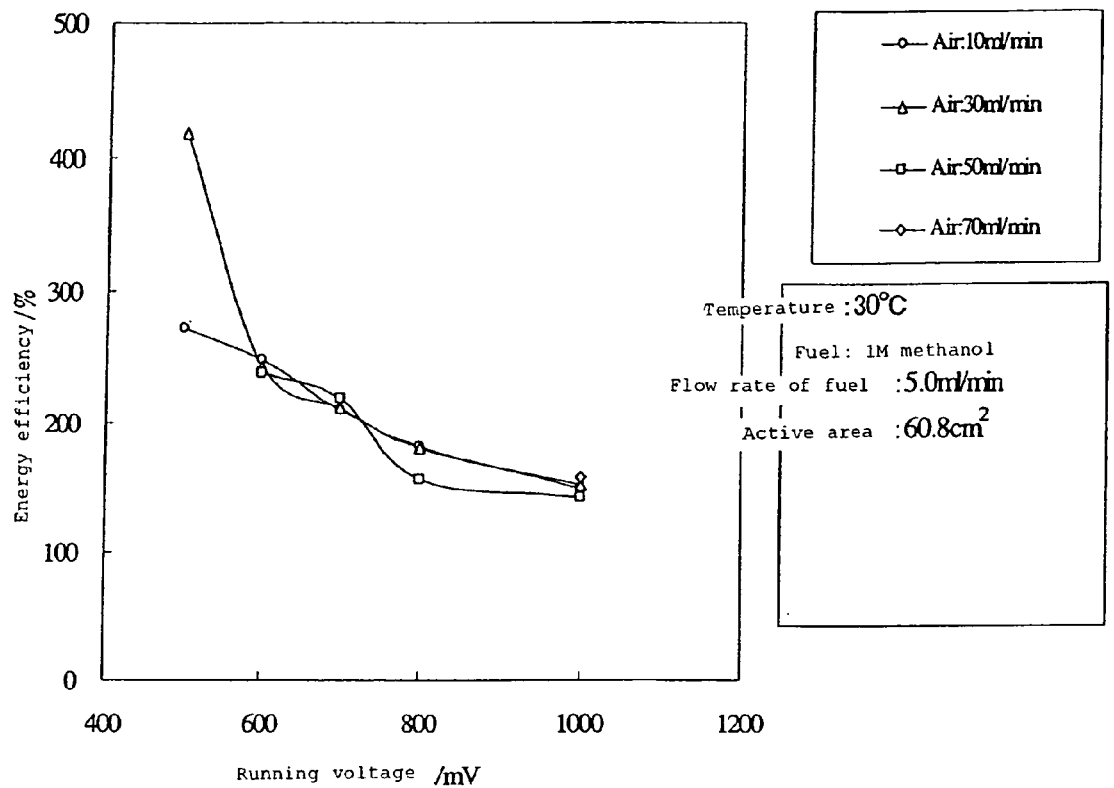
FIG. 49 shows a graph for indicating relation of the energy efficiency (charging: temperature at 30° C.) with the running voltage when the flow rate of air is varied (hydrogen generating example 3-2).

Relation of the energy efficiency with the running voltage is shown in FIG. 49.

From this it was found that the energy efficiency is equal to or larger than 100% even when the running voltage is around 1000 mV, and the energy efficiency is particularly high with the air flow of 30 ml/min when the running voltage is kept equal to or smaller than 600 mV.

HYDROGEN GENERATING EXAMPLE 3-3

The test was performed under the same condition as in hydrogen generation example 3-2 except that the temperature of the cell was kept at 70° C. The running voltage between the fuel electrode and the air electrode, and rate of hydrogen evolution on the fuel electrode and energy efficiency were monitored and analyzed.

Figure 50:
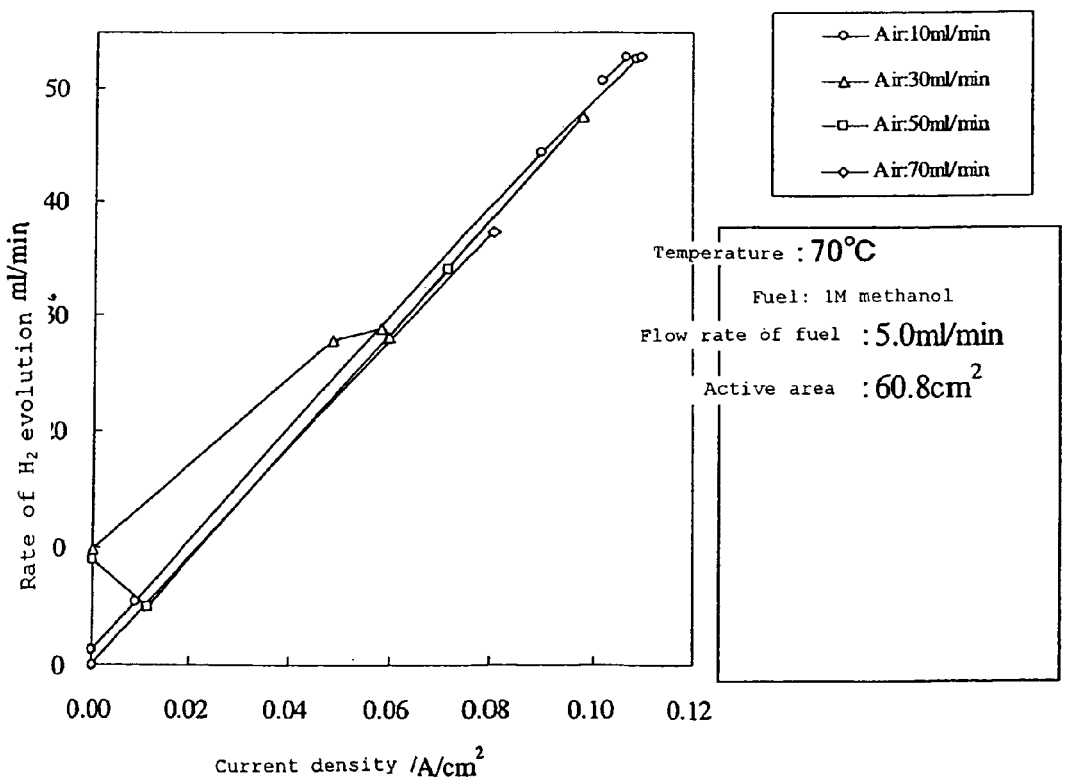
FIG. 50 shows a graph for indicating relation of the rate of hydrogen evolution (charging: temperature at 70° C.) with the current density applied when the flow rate of air is varied (hydrogen generating example 3-3).
Figure 51:
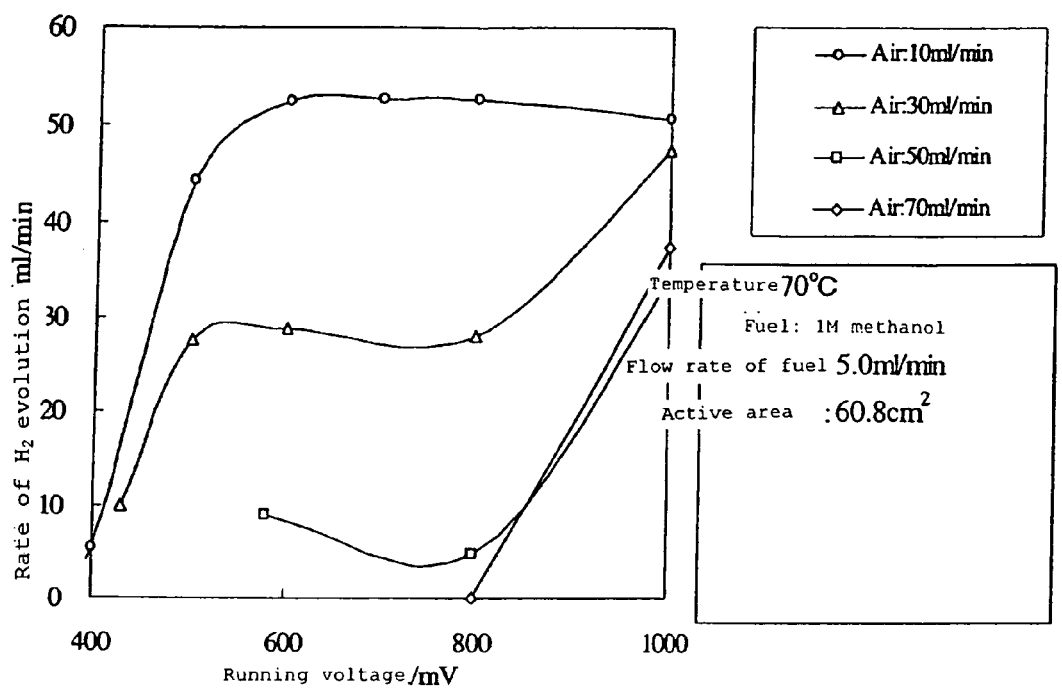
FIG. 51 shows a graph for indicating relation of the rate of hydrogen evolution (charging: temperature at 70° C.) with the running voltage when the flow rate of air is varied (hydrogen generating example 3-3).

Relation of the rate of hydrogen evolution with the current density applied during the test is shown in FIG. 50, and relation of the rate of hydrogen evolution with the running voltage is shown in FIG. 51.

From this it was found that the rate of hydrogen evolution tends to depend on the running voltage, and hydrogen evolves when the running voltage is equal to or larger than 400 mV; hydrogen is readier to evolve with reduction of the flow rate of air; and the rate of hydrogen evolution becomes virtually constant with the air flow of 10 ml/min, when the running voltage becomes equal to or larger than 600 mV, while the rate of hydrogen evolution tends to grow with the air flow of 30 ml/min, when the running voltage becomes equal to or larger than 800 mV, and thus no hydrogen will evolve when air flows at a higher rate unless the running voltage is raised sufficiently high.

Figure 52:
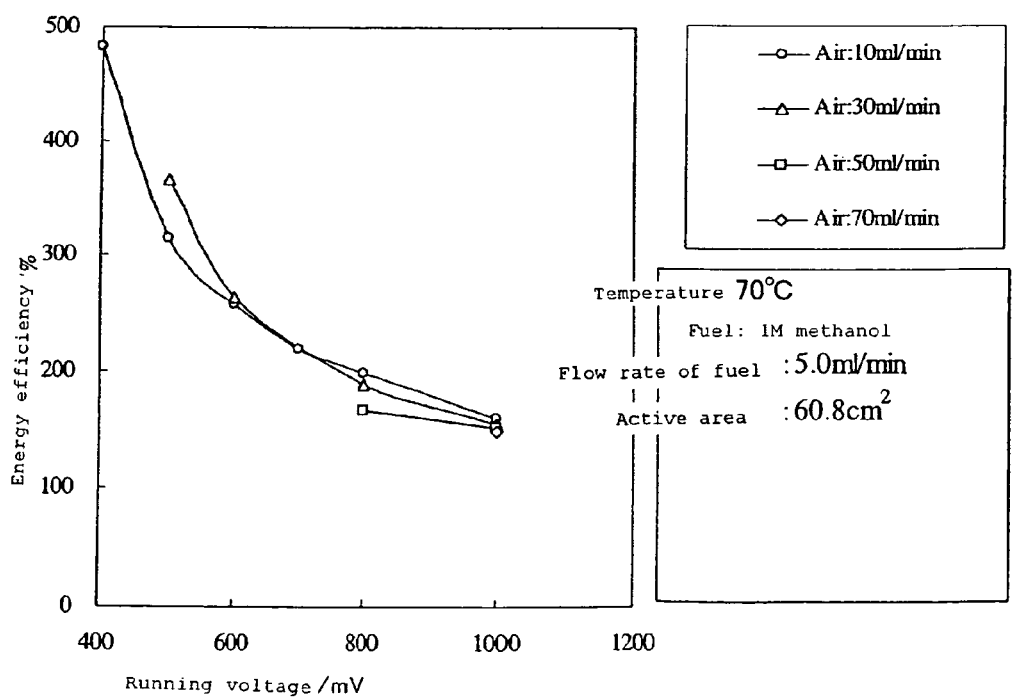
FIG. 52 shows a graph for indicating relation of the energy efficiency (charging: temperature at 70° C.) with the running voltage when the flow rate of air is varied (hydrogen generating example 3-3).

Relation of the energy efficiency with the running voltage is shown in FIG. 52.

It was found that the energy efficiency is equal to or larger than 100% even when the running voltage is around 1000 mV, and the energy efficiency is particularly high with the flow rate of air of 10 to 30 ml/min when the running voltage is kept equal to or smaller than 600 mV.

HYDROGEN GENERATION EXAMPLE 3-4

The same hydrogen generating cell as that of hydrogen generation example 3-1 was used. The cell was operated while the temperature being kept at 90° C. with the flow rate of air to the air electrode varied from 10 to 200 ml/min and the flow of 1M aqueous solution of methanol (fuel) to the fuel electrode kept at 5 ml/min. Then, while the current flowing between the air electrode and the fuel electrode being varied by means of a DC power source from outside, the running voltage between the fuel electrode and the air electrode, the rate of hydrogen evolution occurring from the fuel electrode, and the energy efficiency were monitored and analyzed.

Figure 53:
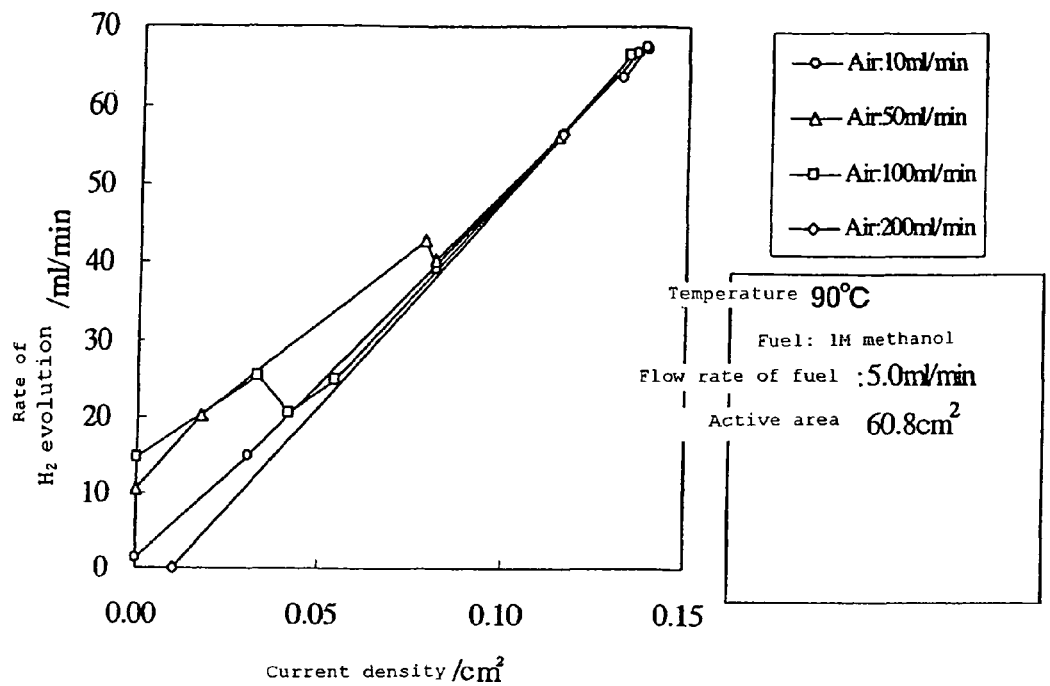
FIG. 53 shows a graph for indicating relation of the rate of hydrogen evolution (charging: temperature at 90° C.) with the current density applied when the flow rate of air is varied (hydrogen generating example 3-4).
Figure 54:
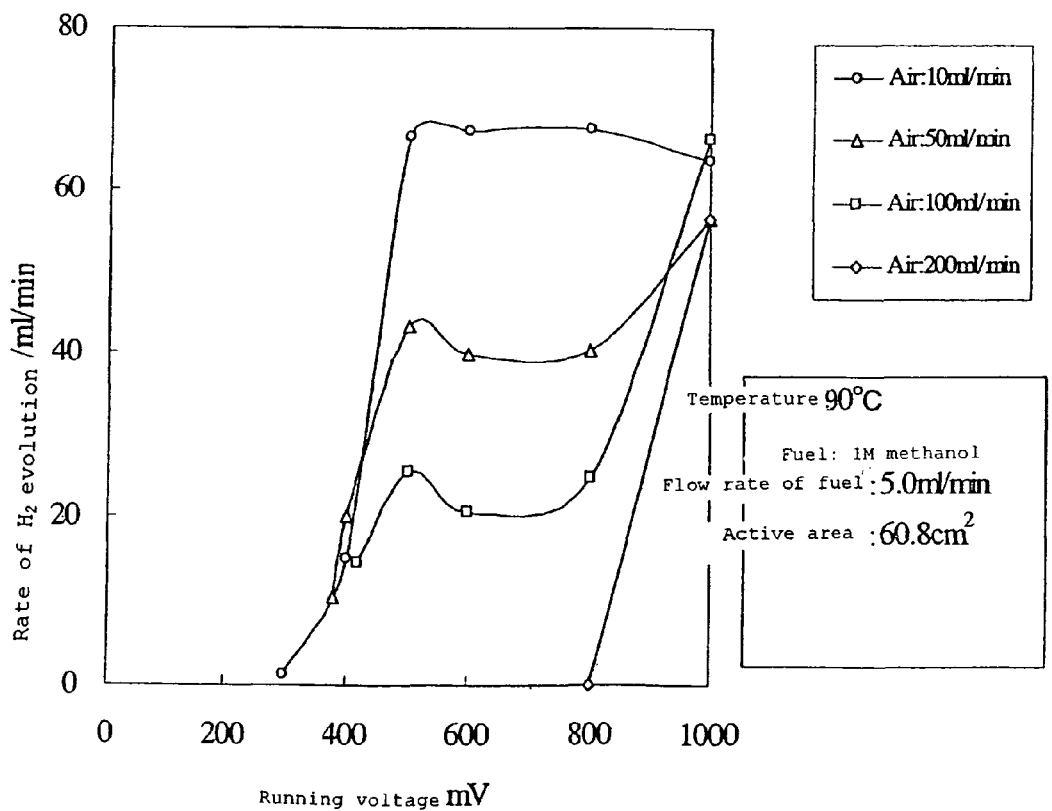
FIG. 54 shows a graph for indicating relation of the rate of hydrogen evolution (charging: temperature at 90° C.) with the running voltage when the flow rate of air is varied (hydrogen generating example 3-4).

Relation of the rate of hydrogen evolution with the current density applied is shown in FIG. 53, and relation of the rate of hydrogen evolution with the running voltage is shown in FIG. 54.

From this it was found that the rate of hydrogen evolution tends to depend on the running voltage, and hydrogen evolves when the running voltage is equal to or larger than 300 mV; hydrogen is readier to evolve with reduction of the flow rate of air; and the rate of hydrogen evolution becomes virtually constant with the air flow of 10 ml/min, when the running voltage becomes equal to or larger than 500 mV, while the rate of hydrogen evolution tends to grow with the air flow of 50 to 100 ml/min, when the running voltage becomes equal to or larger than 800 mV, and thus no hydrogen will evolve when air flows at 200 ml/min unless the running voltage is raised higher than 800 mV.

Figure 55:
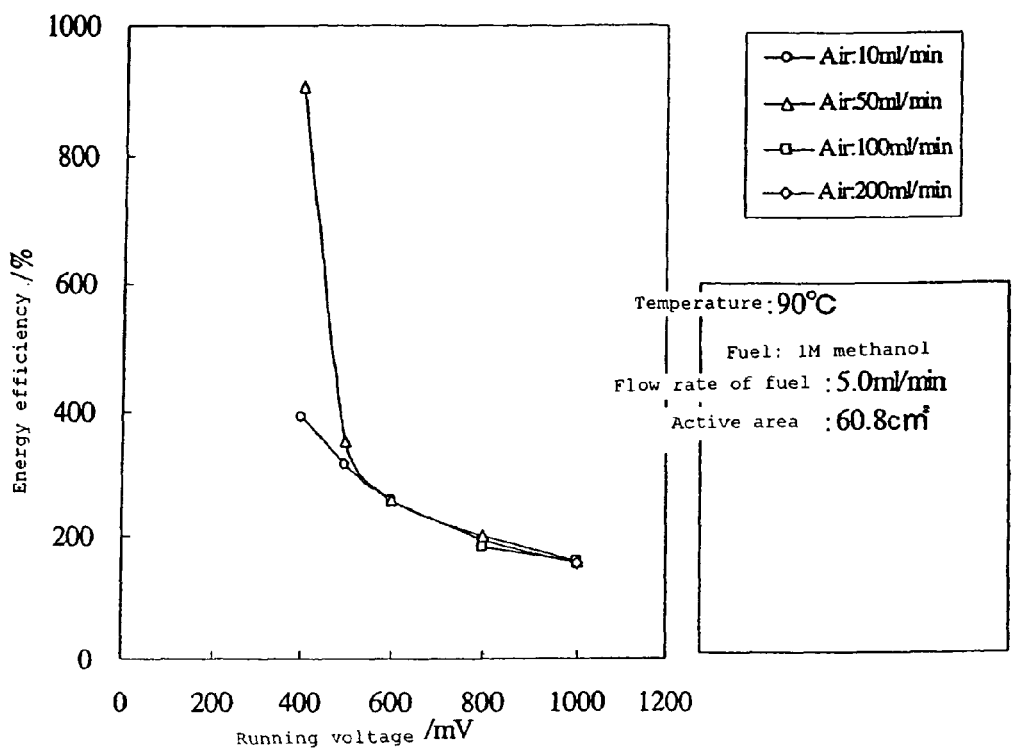
FIG. 55 shows a graph for indicating relation of the energy efficiency (charging: temperature at 90° C.) with the running voltage when the flow rate of air is varied (hydrogen generating example 3-4).

Relation of the energy efficiency with the running voltage is shown in FIG. 55.

From this it was found that the energy efficiency is equal to or larger than 100% even when the running voltage is around 1000 mV, and the energy efficiency is particularly high with the flow of air of 50 ml/min when the running voltage is kept equal to or smaller than 500 mV.

Figure 56:
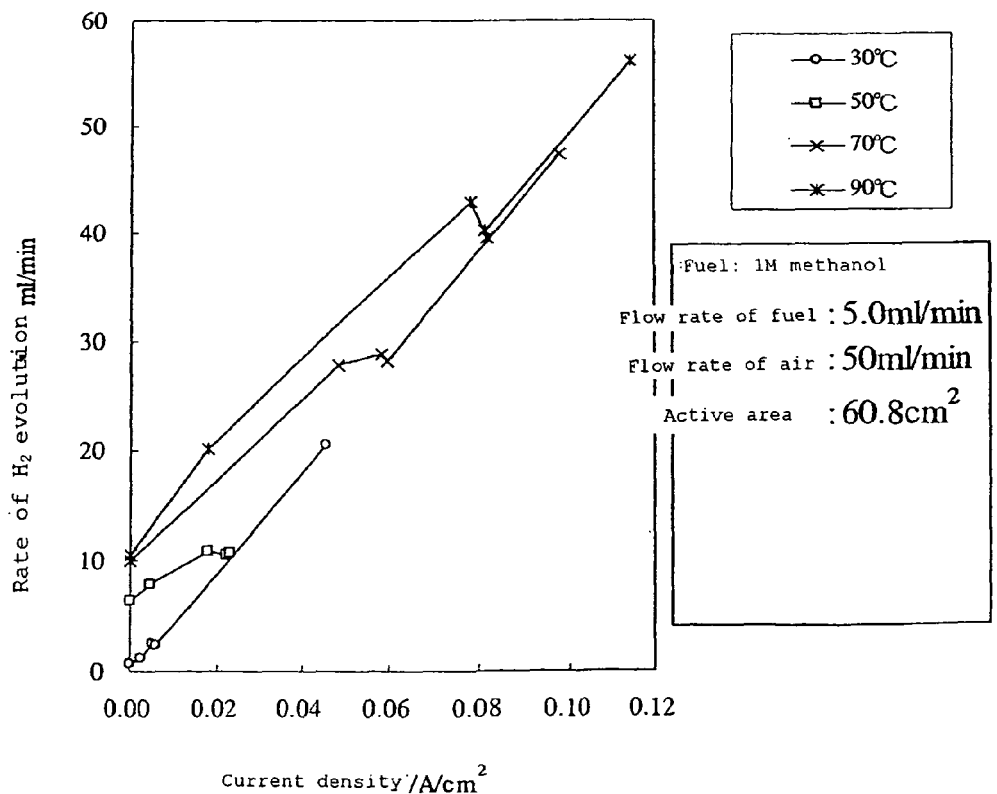
FIG. 56 shows a graph for indicating relation of the rate of hydrogen evolution (charging: flow rate of air at 50 ml/min) with the current density applied when the temperature is varied.
Figure 57:
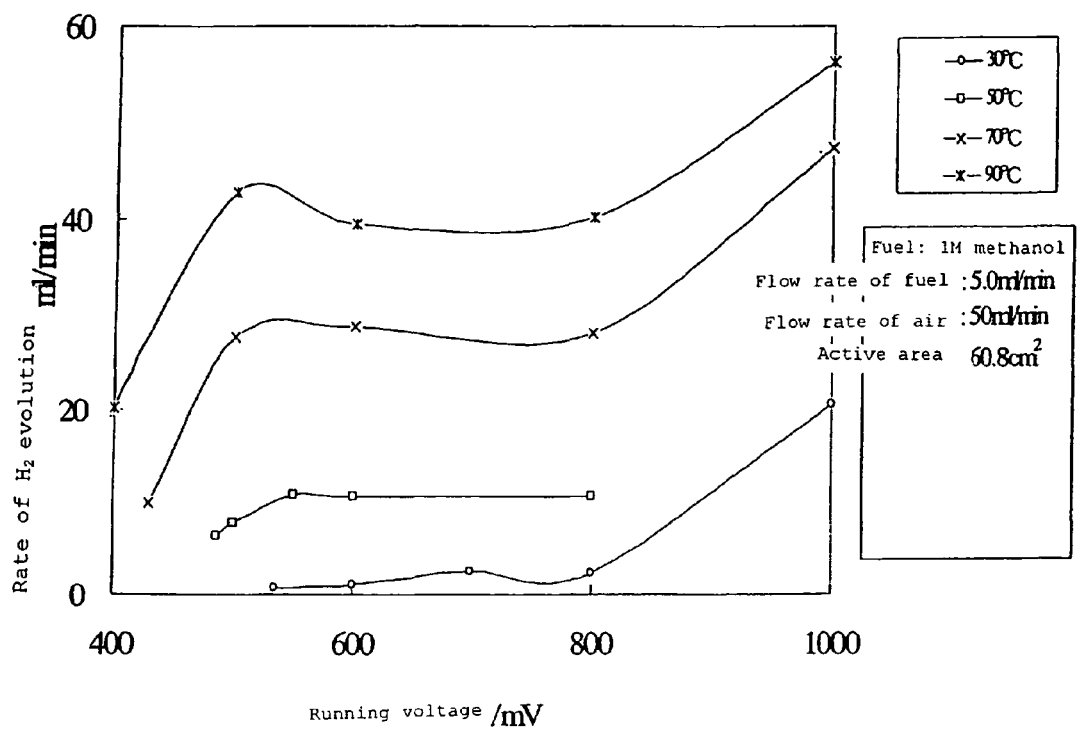
FIG. 57 shows a graph for indicating relation of the rate of hydrogen evolution (charging: flow rate of air at 50 ml/min) with the running voltage when the temperature is varied.

Next, for hydrogen generation examples 3-1 to 3-4 where operation temperature was varied with the flow of air kept at 50 ml/min, relation of the rate of hydrogen evolution with the current density applied is shown in FIG. 56, while relation of the rate of hydrogen evolution with the running voltage is shown in FIG. 57.

From this it was found that the rate of hydrogen evolution tends to depend on the temperature: hydrogen evolves at a low running voltage and the rate of hydrogen evolution becomes higher as the temperature is raised.

Figure 58:
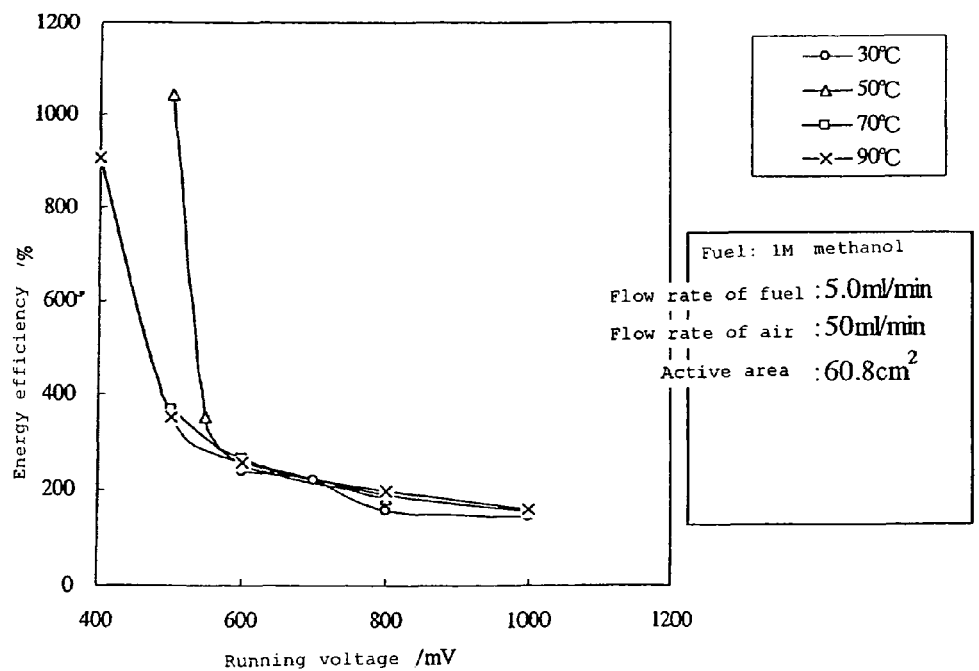
FIG. 58 shows a graph for indicating relation of the energy efficiency (charging: flow rate of air at 50 ml/min) with the running voltage when the temperature is varied.

Relation of the energy efficiency with the running voltage is shown in FIG. 58.

It was found that the energy efficiency is equal to or larger than 100% even when the running voltage is around 1000 mV, and the energy efficiency is particularly high when the running voltage is kept equal to or smaller than 600 mV.

HYDROGEN GENERATING EXAMPLE 3-5

The same hydrogen generating cell with that of hydrogen generation example 3-1 was used. The cell was operated while the temperature being kept at 50° C. with the flow of air to the air electrode kept at 50 ml/min and the flow of fuel to the fuel electrode varied to 1.5, 2.5, 5.0, 7.5, or 10.0 ml/min. Then, while the current flowing between the air electrode and the fuel electrode being varied by means of a DC power source from outside, the running voltage between the fuel electrode and the air electrode, the rate of hydrogen evolution occurring from the fuel electrode, and the energy efficiency were monitored and analyzed.

Figure 59:
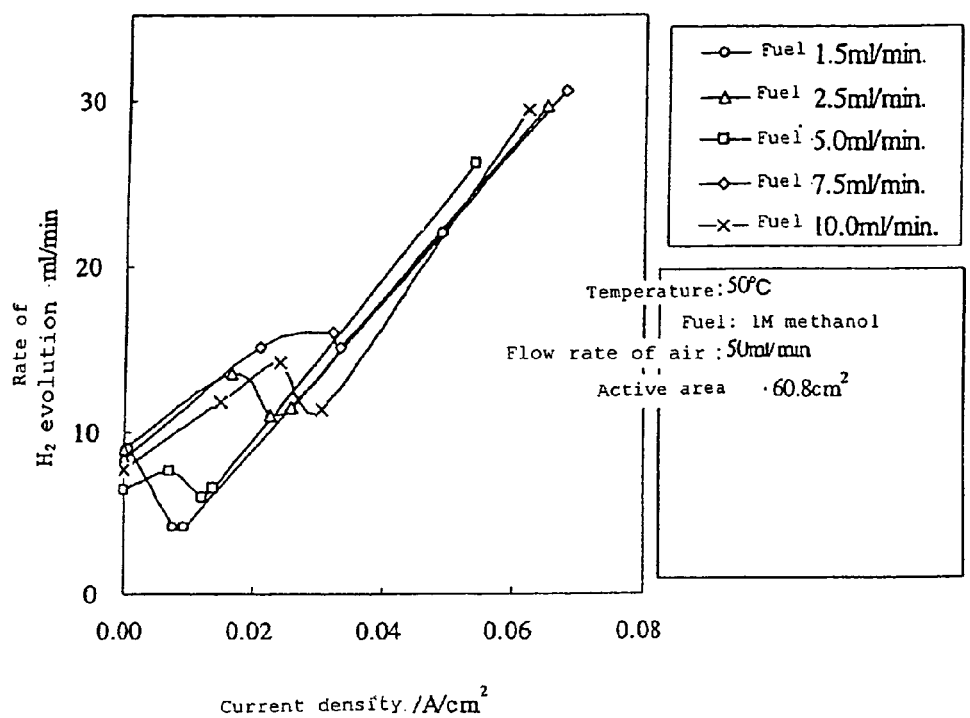
FIG. 59 shows a graph for indicating relation of the rate of hydrogen evolution (charging: temperature at 50° C.) with the current density applied when the flow rate of fuel is varied (hydrogen generating example 3-5).
Figure 60:
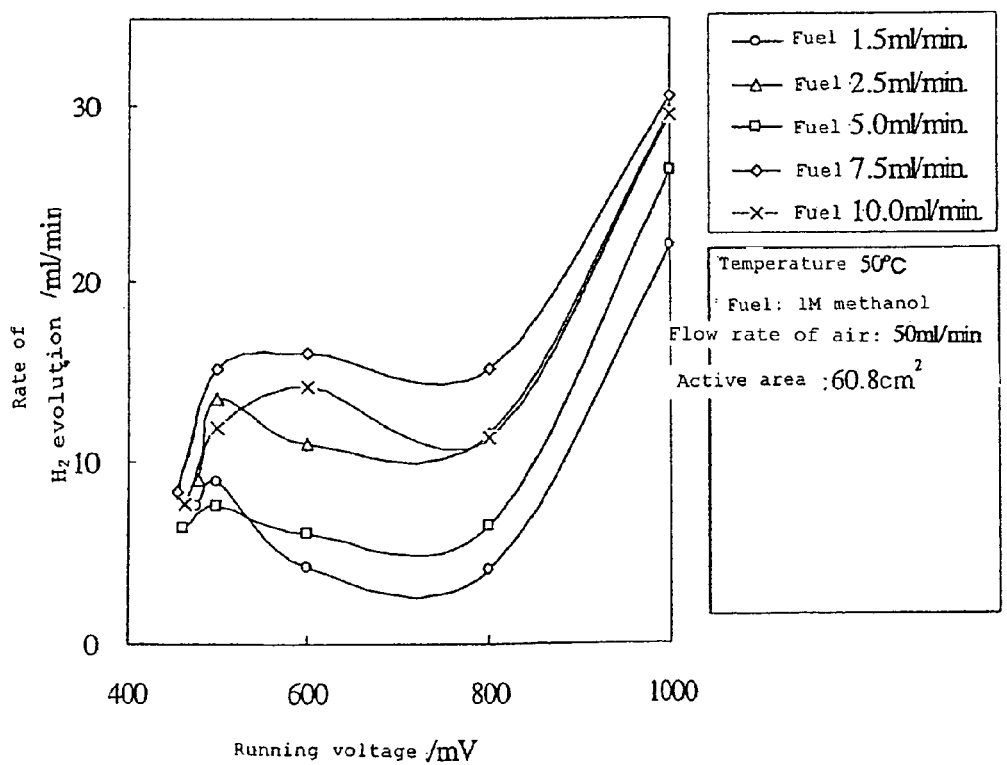
FIG. 60 shows a graph for indicating relation of the rate of hydrogen evolution (charging: temperature at 50° C.) with the running voltage when the flow rate of fuel is varied (hydrogen generating example 3-5).

Relation of the rate of hydrogen evolution with the current density applied is shown in FIG. 59, and relation of the rate of hydrogen evolution with the running voltage is shown in FIG. 60.

It was found that the rate of hydrogen evolution tends to depend on the running voltage, and hydrogen evolves when the running voltage is equal to or larger than 400 mV; hydrogen is readier to evolve with increase of the flow rate of fuel; and the rate of hydrogen evolution tends to grow when the running voltage is equal to or larger than 800 mV for all the flow rates of fuel tested.

Figure 61:
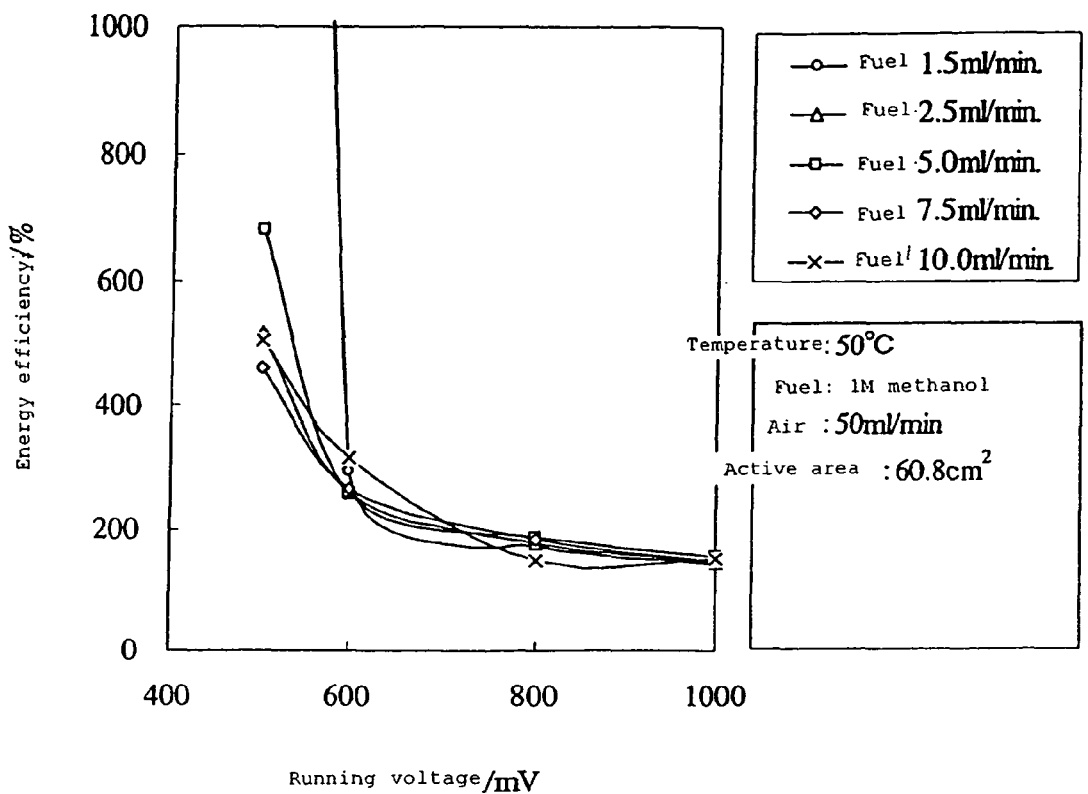
FIG. 61 shows a graph for indicating relation of the energy efficiency (charging: temperature at 50° C.) with the running voltage when the flow rate of fuel is varied (hydrogen generating example 3-5).

Relation of the energy efficiency with the running voltage is shown in FIG. 61.

It was found that the energy efficiency is equal to or larger than 100% even when the running voltage is around 1000 mV, and the energy efficiency is particularly high when the running voltage is kept equal to or smaller than 600 mV.

HYDROGEN GENERATING EXAMPLE 3-6

The same hydrogen generating cell as that of hydrogen generation example 3-1 was used. The cell was operated while the temperature being kept at 50° C. with the flow of air to the air electrode kept at 50 ml/min and the constant flow of fuel to the fuel electrode kept at 5 ml/min while fuel concentration being varied to 0.5, 1, 2, or 3M. Then, while the external current flowing between the air electrode and the fuel electrode being varied by means of a DC power source from outside, the running voltage between the fuel electrode and the air electrode, the rate of hydrogen evolution occurring from the fuel electrode, and the energy efficiency were monitored and analyzed.

Figure 62:
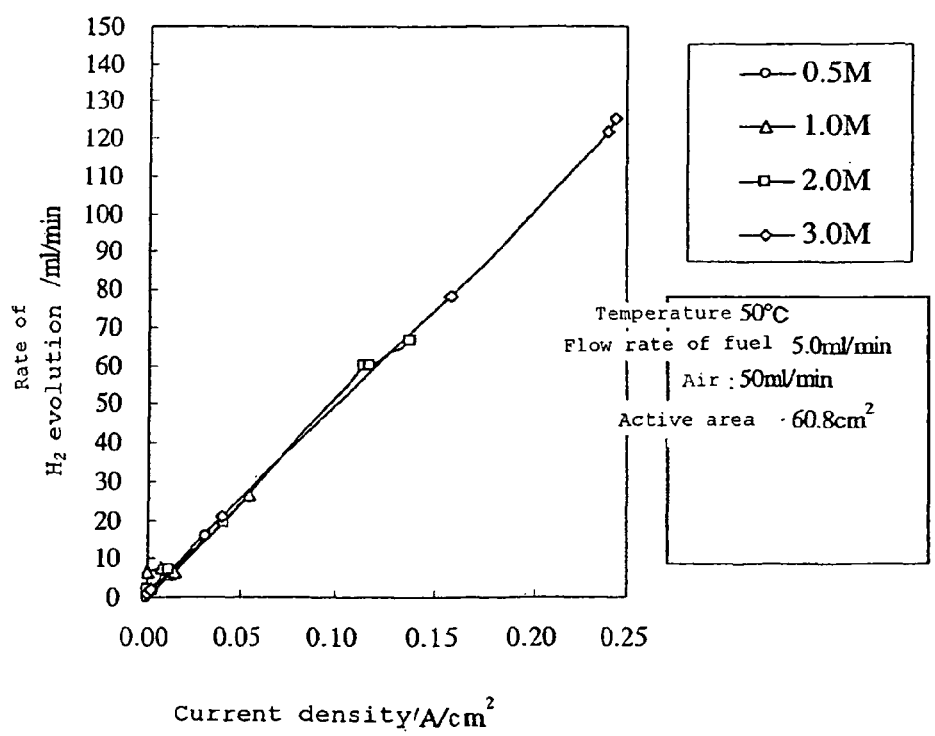
FIG. 62 shows a graph for indicating relation of the rate of hydrogen evolution (charging: temperature at 50° C.) with the current density applied when the concentration of fuel is varied (hydrogen generating example 3-6).
Figure 63:
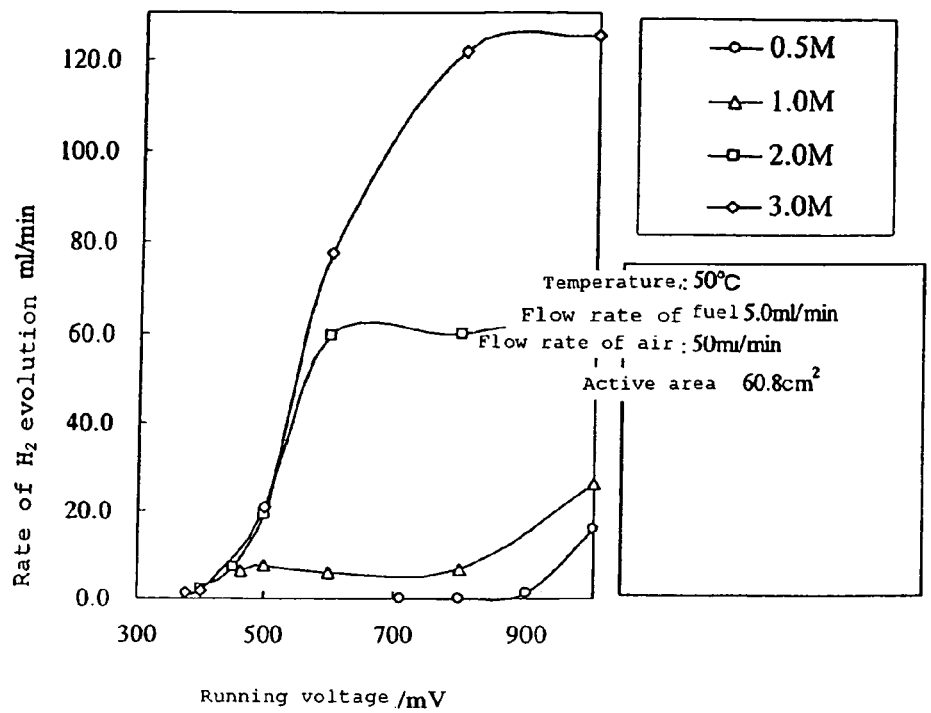
FIG. 63 shows a graph for indicating relation of the rate of hydrogen evolution (charging: temperature at 50° C.) with the running voltage when the concentration of fuel is varied (hydrogen generating example 3-6).

Relation of the rate of hydrogen evolution with the current density applied is shown in FIG. 62, and relation of the rate of hydrogen evolution with the running voltage is shown in FIG. 63.

From this it was found that the rate of hydrogen evolution grows almost linearly with the increase of current density provided that the current density is equal to or higher than 0.02 A/cm$^2$.

It was also found that the rate of hydrogen evolution tends to depend on the running voltage, and hydrogen evolves when the running voltage is equal to or larger than 400 mV; hydrogen is readier to evolve with increase of the concentration of fuel, and the rate of hydrogen evolution grows sharply under the fuel concentration of 2M or 3M, when the running voltage approaches 400 to 500 mV; and the rate of hydrogen evolution becomes virtually constant under the fuel concentration of 1M when the running voltage is in the range of 400 to 800 mV, while the rate of hydrogen evolution tends to grow when the running voltage becomes equal to or larger than 800 mV, and no hydrogen will evolve when the fuel concentration is lower than this level (1M) unless the running voltage is raised sufficiently high.

Figure 64:
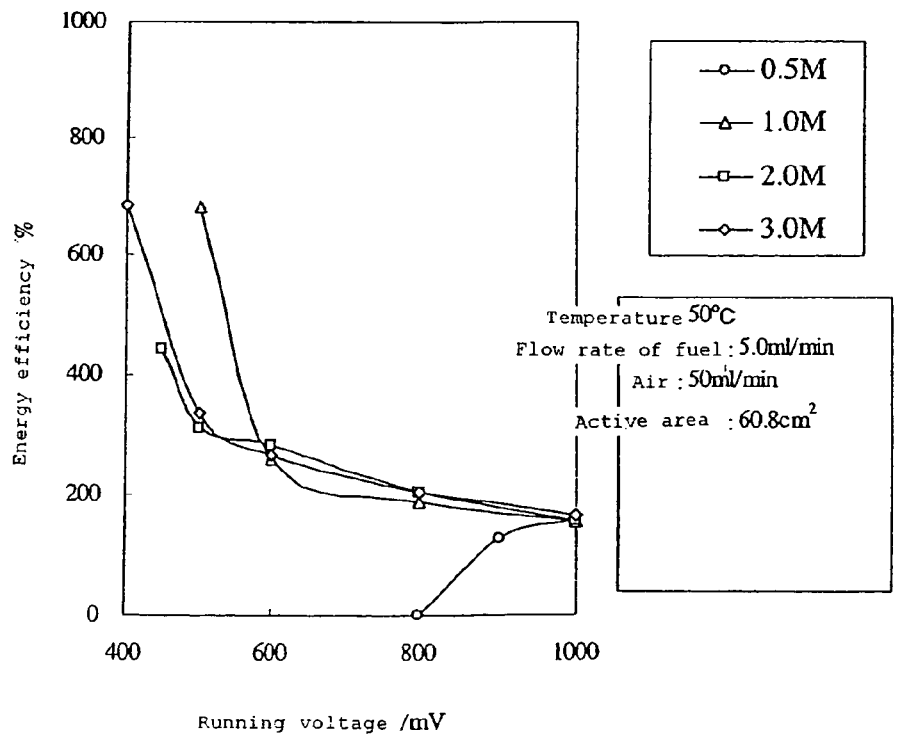
FIG. 64 shows a graph for indicating relation of the energy efficiency (charging: temperature at 50° C.) with the running voltage when the concentration of fuel is varied (hydrogen generating example 3-6).

Relation of the energy efficiency with the running voltage is shown in FIG. 64.

It was found that the energy efficiency is equal to or larger than 100% even when the running voltage is around 1000 mV except for a case where the fuel concentration is kept at 0.5M, and the energy efficiency is particularly high with the concentration of the fuel being 1, 2 or 3M when the running voltage is kept equal to or smaller than 600 mV. When the concentration of fuel was 0.5M, no hydrogen evolved when the running voltage was low. Under this condition, the cell behaved quite differently in terms of energy efficiency.

HYDROGEN GENERATING EXAMPLE 3-7

The same hydrogen generating cell with that of hydrogen generation example 3-1 was used (except that the air electrode consisted of an oxidizing electrode to which oxidizing gas was flowed). The cell was operated while the temperature being kept at 50° C. with the constant flow of 1M fuel to the fuel electrode kept at 5 ml/min and the flow of oxidizing gas to the oxidizing electrode kept at 14.0 ml/min while oxygen concentration being varied to 10, 21, 40, or 100%. Then, while the current flowing between the oxidizing electrode and the fuel electrode being varied by means of a DC power source from outside, the running voltage between the fuel electrode and the oxidizing electrode, the rate of hydrogen evolution occurring from the fuel electrode, and the energy efficiency were monitored and analyzed. The oxidizing gas containing 21% oxygen was represented by air, and the oxidizing gas containing 10% oxygen was obtained by mixing air with nitrogen. The oxidizing gas containing 40% oxygen was obtained by adding oxygen (100% oxygen) to air.

Figure 65:
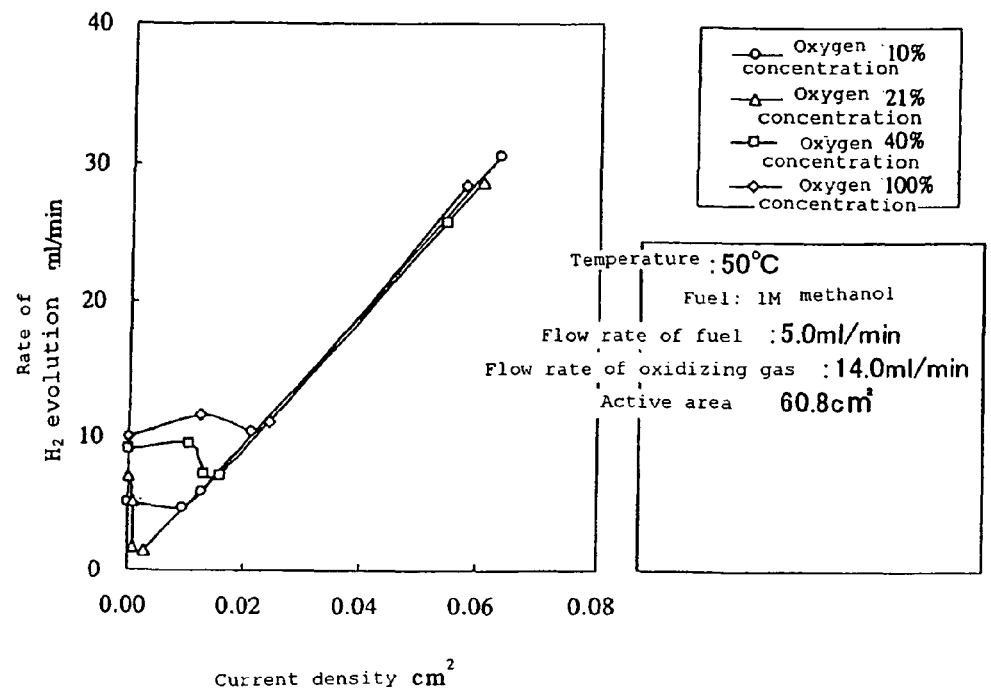
FIG. 65 shows a graph for indicating relation of the rate of hydrogen evolution (charging: temperature at 50° C.) with the current density applied when the concentration of oxygen is varied (hydrogen generating example 3-7).
Figure 66:
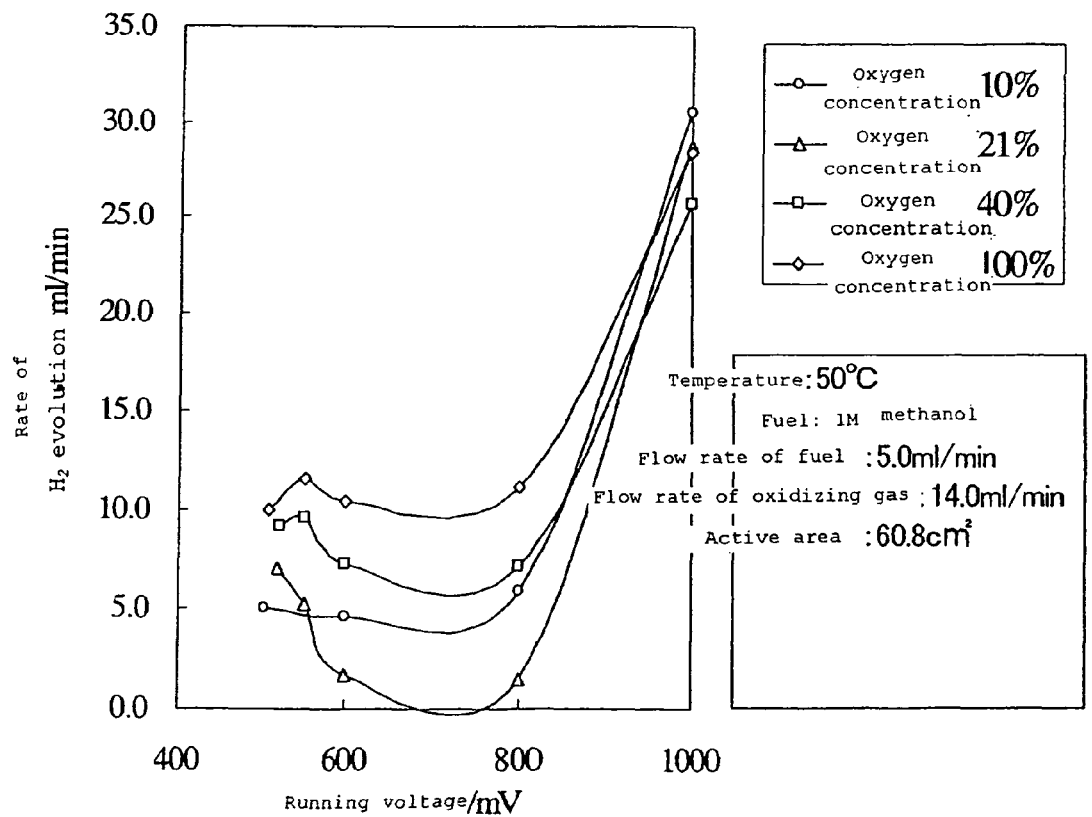
FIG. 66 shows a graph for indicating relation of the rate of hydrogen evolution (charging: temperature at 50° C.) with the running voltage when the concentration of oxygen is varied (hydrogen generating example 3-7).

Relation of the rate of hydrogen evolution with the current density applied is shown in FIG. 65, and relation of the rate of hydrogen evolution with the running voltage is shown in FIG. 66.

From this it was found that the rate of hydrogen evolution grows almost linearly with the increase of current density provided that the current density is equal to or higher than 0.03 A/cm$^2$.

It was also found that the rate of hydrogen evolution tends to depend on the running voltage, and hydrogen evolves when the running voltage is equal to or larger than 400 mV; hydrogen is readier to evolve with increase of the concentration of oxygen; and the rate of hydrogen evolution becomes virtually constant under when the running voltage is in the range of 400 to 800 mV, while it tends to grow when the running voltage becomes equal to or larger than 800 mV.

Figure 67:
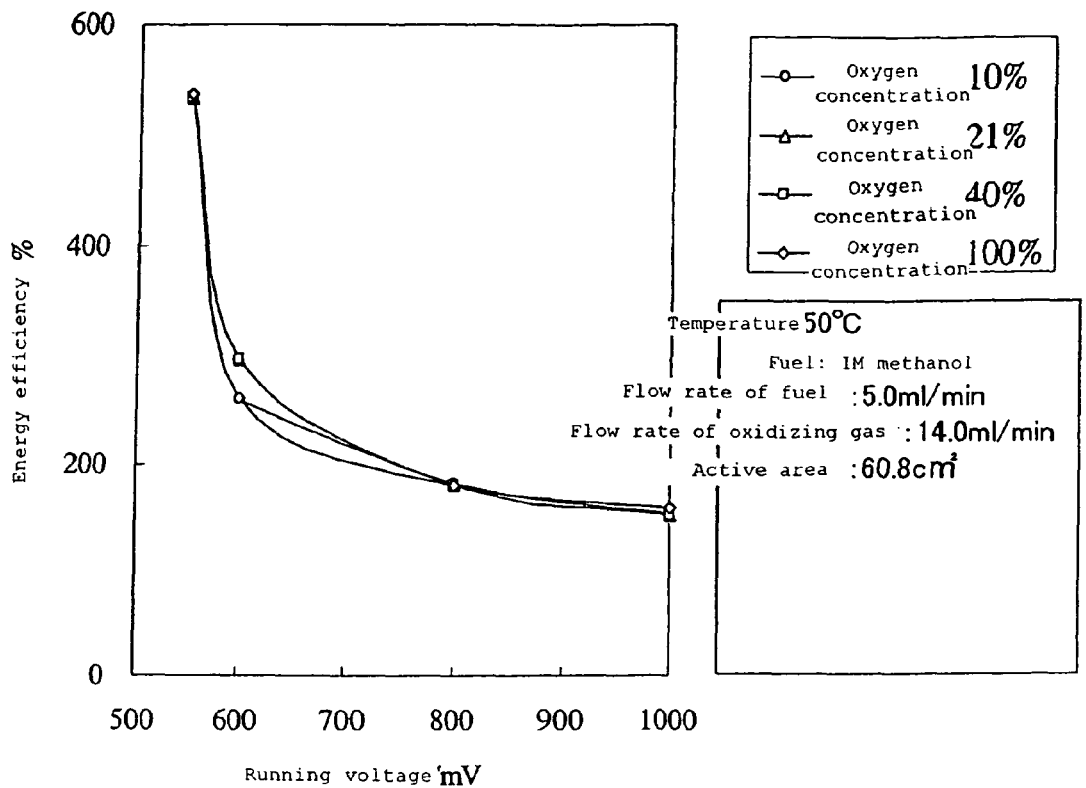
FIG. 67 shows a graph for indicating relation of the energy efficiency (charging: temperature at 50° C.) with the running voltage when the concentration of oxygen is varied (hydrogen generating example 3-7).

Relation of the energy efficiency with the running voltage is shown in FIG. 67.

It was found that the energy efficiency is equal to or larger than 100% even when the applied voltage is around 1000 mV, and the energy efficiency is particularly high with the concentration of oxygen being high when the applied voltage is kept equal to or smaller than 600 mV.

HYDROGEN GENERATING EXAMPLE 3-8

The same hydrogen generating cell as that of hydrogen generation example 3-1 was used (except that the air electrode consisted of an oxidizing electrode to which liquid hydrogen peroxide was flowed). The hydrogen generating cell was placed in an electric furnace where hot air was circulated. The cell was operated while the temperature being varied to 30, 50, 70, or 90° C. with the flow of 1M aqueous solution of methanol to the fuel electrode kept at 5 ml/min and the flow of 1M $H_2O_2$ (hydrogen peroxide) to the oxidizing electrode varied from 2.6 to 5.5 ml/min. Then, while the current flowing between the oxidizing electrode and the fuel electrode being varied by means of a DC power source from outside, the running voltage between the fuel electrode and the oxidizing electrode, the rate of hydrogen evolution occurring from the fuel electrode, and the energy efficiency were monitored and analyzed.

The flow rate of hydrogen peroxide was adjusted such that the open-circuit voltage was approximately equal to 500 mV for all the temperatures tested.

Figure 68:
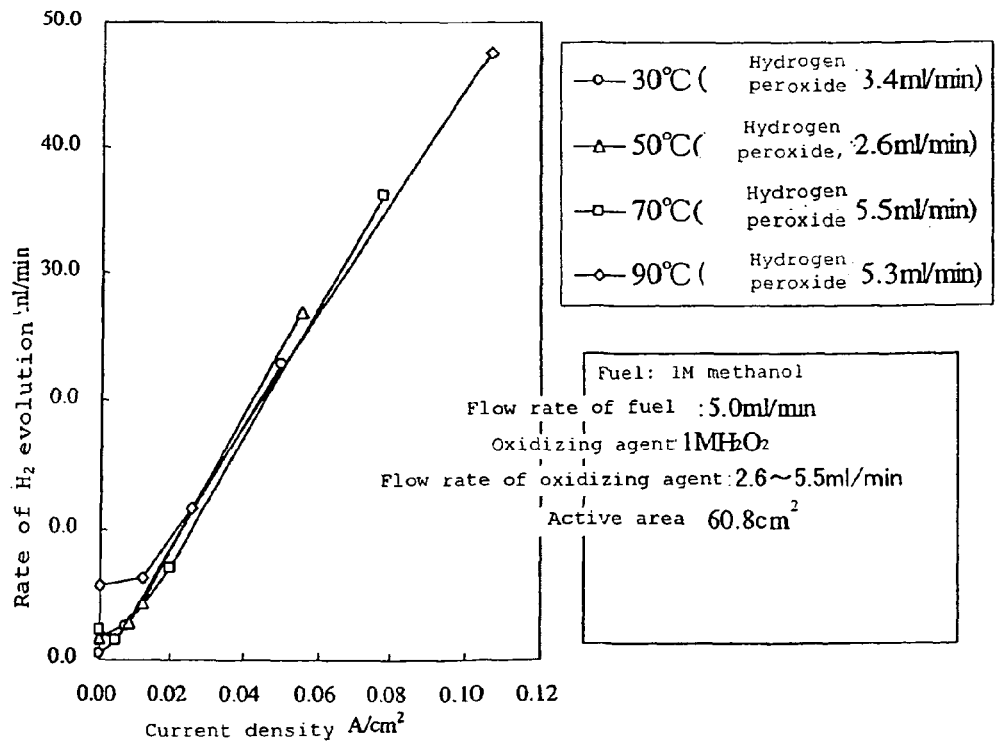
FIG. 68 shows a graph for indicating relation of the rate of hydrogen evolution (charging: oxidizing agent of $H_2O_2$) with the current density applied when the temperature is varied (hydrogen generating example 3-8).
Figure 69:
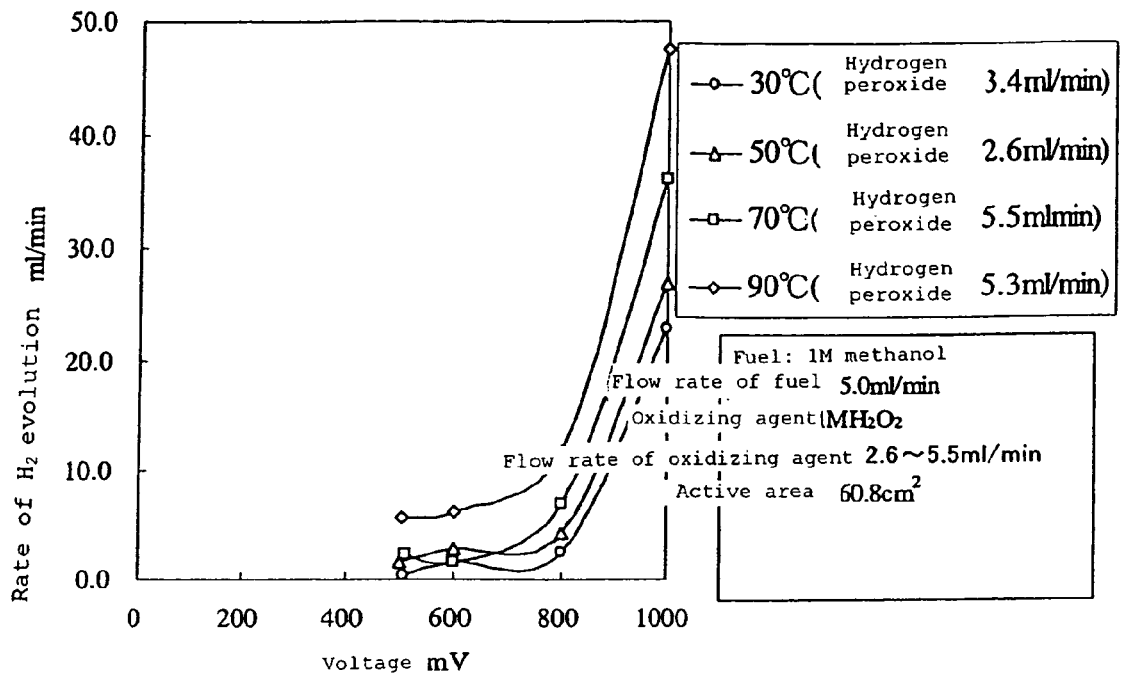
FIG. 69 shows a graph for indicating relation of the rate of hydrogen evolution (charging: oxidizing agent of $H_2O_2$) with the running voltage when the temperature is varied (hydrogen generating example 3-8).

Relation of the rate of hydrogen evolution with the current density applied is shown in FIG. 68, and relation of the rate of hydrogen evolution with the running voltage is shown in FIG. 69.

From this it was found that the rate of hydrogen evolution tends to depend on the running voltage, and hydrogen evolves when the running voltage is equal to or larger than 500 mV, and tends to grow when the running voltage is equal to or larger than 800 mV; and hydrogen is readier to evolve with increase of the operation temperature.

Figure 70:
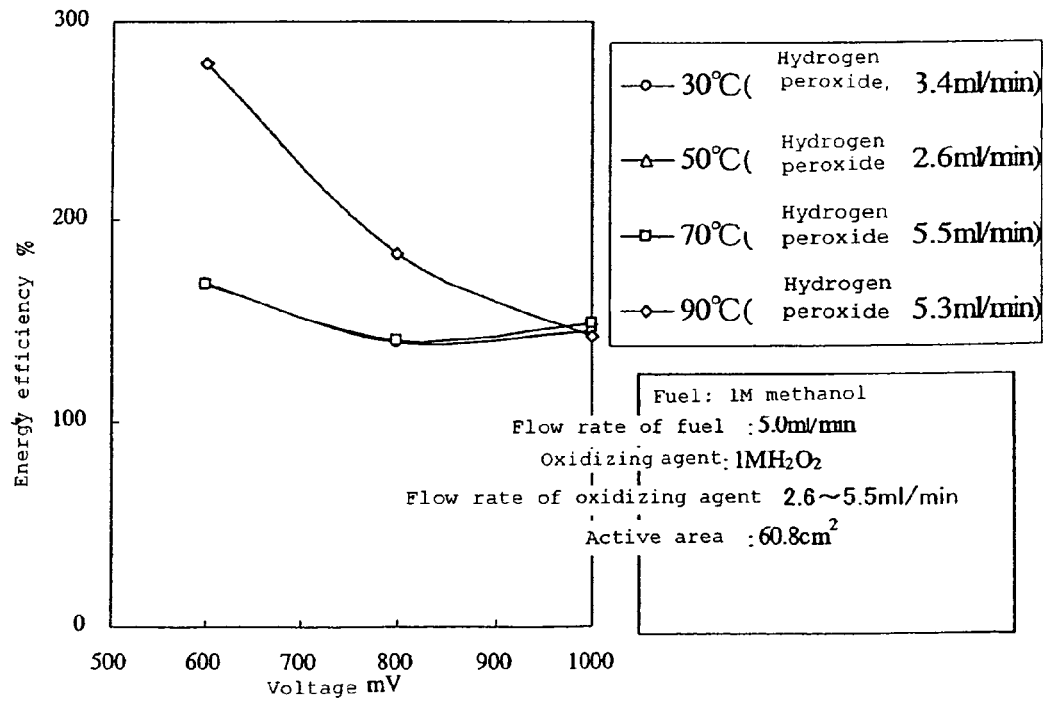
FIG. 70 shows a graph for indicating relation of the energy efficiency (charging: oxidizing agent of $H_2O_2$) with the running voltage when the temperature is varied (hydrogen generating example 3-8).

Relation of the energy efficiency with the running voltage is shown in FIG. 70.

It was found that the energy efficiency is equal to or larger than 100% even when the running voltage is around 1000 mV, and the energy efficiency is particularly high with the temperature of 90° C. when the running voltage is kept equal to or smaller than 800 mV.

What is important here is that hydrogen was withdrawn from the hydrogen generating cells of Example 3 whose energy content exceeded the electric current supplied from outside. In other words, the hydrogen generating cell of Example 3 generates more hydrogen than is explained by the consumption of supplied electric energy. In addition, conversion of fuel into hydrogen occurred at a surprisingly low temperature of 30 to 90° C. In view of these facts, the hydrogen generating method of the invention and hydrogen generating system based on the method are likely to be novel ones that have never been observed before.

INDUSTRIAL APPLICABILITY

As seen from above, since the hydrogen generating method of the invention and hydrogen generating system based on the method can convert fuel containing an organic compound into hydrogen-containing gas at 100° C. or lower, it can easily provide hydrogen to a fuel cell, hydrogen storage container, or the like. Thus, the method and system are quite effective for the construction of electric cars, submarines, hydrogen supply systems, package-type fuel cell electric generators, etc.

The invention claimed is:

1. A hydrogen generating system for generating hydrogen-containing gas by decomposing fuel containing an organic compound, the system comprising:
   a partition membrane,
   a fuel electrode provided on one surface of the partition membrane,
   means for supplying fuel containing an organic compound and water to the fuel electrode,
   an oxidizing electrode provided on the other surface of the partition membrane,
   means for supplying an oxidizing agent to the oxidizing electrode,
   means for collecting hydrogen-containing gas generated on the fuel electrode, and
   a carbon dioxide absorbing portion for absorbing carbon dioxide contained in the hydrogen-containing gas and wherein the system is configured to operate in a plurality of configurations wherein one of said configurations comprises an open circuit configuration wherein no current is supplied to either the fuel electrode or the oxidizing electrode,
   wherein, in a first closed circuit configuration the oxidizing electrode and the fuel electrode are connected to means for withdrawing electric energy from the hydrogen generating cell with the fuel electrode serving as a negative electrode and the oxidizing electrode as a positive electrode, and
   voltage between the fuel electrode and the oxidizing electrode is adjusted to 200 to 600 mV by varying volume of electric energy withdrawn from the hydrogen generating unit so that evolution volume of the hydrogen-containing gas from the fuel electrode is adjusted.

2. A hydrogen generating system for generating hydrogen-containing gas by decomposing fuel containing an organic compound, the system comprising:
   a partition membrane,
   a fuel electrode provided on one surface of the partition membrane,
   means for supplying fuel containing an organic compound and water to the fuel electrode,
   an oxidizing electrode provided on the other surface of the partition membrane,
   means for supplying an oxidizing agent to the oxidizing electrode,
   means for collecting hydrogen-containing gas generated on the fuel electrode, and
   a carbon dioxide absorbing portion for absorbing carbon dioxide contained in the hydrogen-containing gas and wherein the system is configured to operate in a plurality of configurations wherein one of said configurations comprises an open circuit configuration wherein no current is supplied to either the fuel electrode or the oxidizing electrode,
   wherein in a second closed circuit configuration the oxidizing electrode and the fuel electrode are connected to means for providing external electric energy with the fuel electrode serving as cathode and the oxidizing electrode as anode, and voltage between the fuel electrode and the oxidizing electrode is adjusted to 300 to 1000 mV by varying volume of electric energy provided so that evolution volume of the hydrogen-containing gas from the fuel electrode is adjusted.

* * * * *